US 9,555,489 B2

(12) United States Patent
Takahashi

(10) Patent No.: US 9,555,489 B2
(45) Date of Patent: Jan. 31, 2017

(54) CUTTING INSERT AND INDEXABLE CUTTING TOOL

(71) Applicant: MITSUBISHI MATERIALS CORPORATION, Tokyo (JP)

(72) Inventor: Hidebumi Takahashi, Joso (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 289 days.

(21) Appl. No.: 14/363,963

(22) PCT Filed: Oct. 31, 2012

(86) PCT No.: PCT/JP2012/078171
§ 371 (c)(1),
(2) Date: Jun. 9, 2014

(87) PCT Pub. No.: WO2013/088851
PCT Pub. Date: Jun. 20, 2013

(65) Prior Publication Data
US 2014/0334890 A1 Nov. 13, 2014

(30) Foreign Application Priority Data

Dec. 12, 2011 (JP) ................. 2011-271369
Feb. 3, 2012 (JP) ................. 2012-022187
Oct. 16, 2012 (JP) ................. 2012-229181

(51) Int. Cl.
*B23C 5/20* (2006.01)
*B23C 5/10* (2006.01)
*B23C 5/22* (2006.01)

(52) U.S. Cl.
CPC .............. *B23C 5/207* (2013.01); *B23C 5/109* (2013.01); *B23C 5/205* (2013.01); *B23C 5/2213* (2013.01);
(Continued)

(58) Field of Classification Search
CPC ...... B23C 5/207; B23C 5/2213; B23C 5/2221; B23C 2200/0461; B23C 2200/0483; B23C 2200/203; Y10T 407/23
See application file for complete search history.

(56) References Cited

U.S. PATENT DOCUMENTS 5,071,292 A  12/1991  Satran
5,904,450 A   5/1999  Satran et al.
(Continued)

FOREIGN PATENT DOCUMENTS

CN  1445038 A  10/2003
CN  1775436 A   5/2006
(Continued)

OTHER PUBLICATIONS

Extended European Search Report mailed Sep. 17, 2015 for the corresponding European Application No. 12858671.6.
(Continued)

*Primary Examiner* — Sunil K Singh
*Assistant Examiner* — Ryan Rufo
(74) *Attorney, Agent, or Firm* — Leason Ellis LLP

(57) ABSTRACT

A cutting insert includes an insert body having a polygonal plate shape. Rake faces are formed on polygonal surfaces of the insert body, and flank faces are formed on lateral faces of the insert body arranged around the polygonal surfaces. Main cutting edges are formed on side ridges of the polygonal surfaces at intersecting ridgelines between the rake faces and the flank faces. Each main cutting edge extends between two corners adjacent to each other in a circumferential direction of the polygonal surface among corners of the polygonal surface. When seen from a direction opposing the rake face, one end portion of the main cutting edge that stretches to one corner of the two corners has a convexly curved shape, and the other end portion of the main cutting
(Continued)

edge that stretches to the other corner of the two corners has a concavely curved shape.

19 Claims, 41 Drawing Sheets

(52) U.S. Cl.
CPC .............. *B23C 2200/0461* (2013.01); *B23C 2200/0483* (2013.01); *B23C 2200/08* (2013.01); *B23C 2200/081* (2013.01); *B23C 2200/125* (2013.01); *B23C 2200/161* (2013.01); *B23C 2200/203* (2013.01); *B23C 2200/286* (2013.01); *B23C 2210/168* (2013.01); *B23C 2210/50* (2013.01); *Y10T 407/192* (2015.01); *Y10T 407/235* (2015.01)

(56) References Cited

U.S. PATENT DOCUMENTS

| | | | |
|---|---|---|---|
| 6,733,212 B2 * | 5/2004 | Nagaya | B23C 5/207 407/113 |
| 8,057,132 B2 * | 11/2011 | Johansson | B23C 5/202 407/113 |
| 2005/0111928 A1 * | 5/2005 | Stanarius | B23C 5/207 409/132 |
| 2007/0059111 A1 | 3/2007 | Deitert | |
| 2008/0304924 A1 * | 12/2008 | Engstrom | B23C 5/202 407/114 |
| 2009/0238649 A1 * | 9/2009 | Kruszynski | B23B 27/141 407/40 |
| 2011/0135406 A1 * | 6/2011 | Ishida | B23C 5/06 407/40 |
| 2013/0115022 A1 * | 5/2013 | Ishi | B23C 5/109 409/132 |

FOREIGN PATENT DOCUMENTS

| | | | | |
|---|---|---|---|---|
| CN | 101262973 A | | 9/2008 | |
| EP | 0577011 A1 * | | 1/1994 | ............ B23C 5/006 |
| EP | 1163077 B | | 4/2003 | |
| EP | 1346789 A | | 9/2003 | |
| EP | 1716953 A | | 11/2006 | |
| JP | 62130107 A | * | 6/1987 | ............. B23B 27/16 |
| JP | 05285708 A | * | 11/1993 | ............. B23B 27/14 |
| JP | 09-207007 A | * | 8/1997 | ............. B23B 27/14 |
| JP | 2002-046002 A | | 2/2002 | |
| JP | 2006-082168 A | | 3/2006 | |
| JP | 2006-075913 A | * | 5/2006 | ............... B23C 5/20 |
| JP | 3951766 B | | 8/2007 | |
| JP | 2008-229744 A | | 10/2008 | |
| JP | 2009-541074 A | | 11/2009 | |
| JP | 2010-517802 A | | 5/2010 | |
| WO | WO-2007/149242 A | | 12/2007 | |
| WO | WO-2008/099984 A | | 8/2008 | |

OTHER PUBLICATIONS

International Search Report mailed Jan. 22, 2013 for the corresponding PCT Application No. PCT/JP2012/078171.
Office Action mailed Jun. 25, 2015 for the corresponding Chinese Application No. 201280057706.0.

* cited by examiner

CUTTING INSERT AND INDEXABLE CUTTING TOOL

CROSS-REFERENCE TO RELATED PATENT APPLICATIONS

This application is a U.S. National Phase Application under 35 U.S.C. §371 of International Patent Application No. PCT/JP2012/078171, filed Oct. 31, 2012, and claims the benefit of Japanese Patent Applications No. 2011-271369, filed on Dec. 12, 2011, No. 2012-022187, filed Feb. 3, 2012, and No. 2012-229181, filed Oct. 16, 2012, all of which are incorporated by reference in their entirety herein. The International Application was published in Japanese on Jun. 20, 2013 as International Publication No. WO/2013/088851, under PCT Article 21(2).

FIELD OF THE INVENTION

The present invention relates to a cutting insert detachably attached to an indexable cutting tool to be used for milling, and an indexable cutting tool to which the cutting inserts are attached.

BACKGROUND ART OF THE INVENTION

As an indexable cutting tool, high-feed cutting of feeding an end mill body serving as a tool body at a high feed rate to cut a workpiece is known. As a cutting insert attached to the indexable end mill for such high-feed cutting, Patent Citations 1 and 2 suggest: a negative type cutting insert having a substantially equilateral triangular plate shape in which front and back surfaces having an equilateral triangular shape selectively serve as rake faces; corner edges having a circular arc shape are formed on corners of the front and back surfaces; and the main cutting edges are formed on side ridges of the front and back surfaces that stretch to the corner edges.

This type of cutting insert is attached to a tip of an end mill body to be rotated around an axis in a manner such that one of the front and back surfaces is directed to an end mill rotational direction as a rake face, one of the main cutting edges of the rake face is directed to a tip side of the end mill body, and a relatively small cutting edge angle, a negative axial rake angle, and a radial rake angle are given to the main cutting edge. The cutting tool is usually fed at high feed in a direction orthogonal to the axis and is used for cutting. Since the cutting edge angle of the main cutting edge is relatively small, the thickness of a chip created decreases even though the feeding is high as above, and efficient cutting can be performed.

Incidentally, in Patent Citations 1 and 2, Patent Citation 1 describes that the main cutting edge is formed in a polygonal line shape including straight lines intersecting each other at an obtuse angle, and the cutting insert described in Patent Citation 2 is formed so that the main cutting edge is convexly curved. However, if high-feed cutting is performed by such cutting inserts, the cutting edge angle becomes larger toward the outer peripheral side of the end mill body (as moving outward in the radius direction of the end mill body). Therefore, the thickness of chips created increases toward the outer peripheral side.

Since the thickness of the chip becomes maximum on a cutting boundary of an outermost periphery of the main cutting edge, there is a concern that the main cutting edge of the cutting insert may cause abnormal damage, such as chipping and breakage, on the cutting boundary. For this reason, the feed rate per one edge is suppressed to prevent the thickness of a chip from becoming excessively thick, and it is difficult to increase the feed rate to perform more efficient high-feed cutting.

CITATION LIST

[Patent Citation 1] Japanese Patent No. 3951766
[Patent Citation 2] Published Japanese Translation No. 2010-517802 of the PCT International Publication

SUMMARY OF THE INVENTION

The invention has been made with the above specified background in consideration, and an object of the invention is to provide a cutting insert that can prevent the thickness of a chip from becoming excessively large to prevent abnormal damage to a main cutting edge during high-feed cutting, and that can further increase the feed rate to perform more efficient high-feed cutting, and an indexable cutting tool to which the cutting insert is detachably attached.

A cutting insert of one aspect of the invention is detachably attached to an insert mounting seat of an indexable cutting tool, and includes any one of the following configurations.

(1) A cutting insert detachably attached to an insert mounting seat of an indexable cutting tool includes an insert body having a polygonal plate shape,
rake faces are formed on polygonal surfaces of the insert body, flank faces are formed on lateral faces of the insert body arranged around the polygonal surfaces,
main cutting edges are formed on side ridges of the polygonal surfaces at intersecting ridgelines between the rake faces and the flank faces,
each of the main cutting edges extends between two corners adjacent to each other in a circumferential direction of the polygonal surfaces among corners of the polygonal surfaces, and
when seen from a direction opposing each of the rake faces, one end portion of each main cutting edge that stretches to one corner of the two corners has a convexly curved shape, and the other end portion of the each main cutting edge that stretches to the other corner of the two corners has a concavely curved shape.

That is, the cutting insert of one aspect of the invention is a cutting insert for an indexable cutting tool, and the cutting insert includes an insert body having a polygonal plate shape. The insert body includes rake faces formed on polygonal surfaces of the insert body, flank faces are formed on lateral faces of the insert body arranged around the polygonal surfaces, and main cutting edges are formed on side ridges of the polygonal surfaces that are intersecting ridgelines between the rake faces and the flank faces. Each of the main cutting edges extends between two corners adjacent to each other in a circumferential direction of the polygonal surface among corners of the polygonal surface. When seen from a direction opposing the rake face, a first end portion (the one end portion) of the main cutting edge that stretches to a first corner (the one corner) of the two corners has a convexly curved shape, and a second end portion (the other end portion) of the main cutting edge that stretches to a second corner (the other corner) of the two corners has a concavely curved shape.

(2) In the above (1), rake faces are formed on respective front and back polygonal surfaces of the insert body, a main cutting edge is formed on each of the intersecting ridgelines between the rake faces and the flank faces formed on at least one lateral face of the insert body, and the main cutting edges have an inverted symmetrical shape with respect to the front and back polygonal surfaces.

That is, the insert body includes a first polygonal surface, and a second polygonal surface opposite in a front and back relationship to the first polygonal surface, and at least one first lateral face (at least one lateral face) arranged around the first and second polygonal surfaces (front and back polygonal surfaces).

A first main cutting edge is formed on an intersecting ridgeline between a first rake face formed on the first polygonal surface and a first flank face formed on the first lateral face, a second main cutting edge is formed on an intersecting ridgeline between a second rake face formed on the second polygonal surface and a second flank face formed on the first lateral face, and when the insert body is rotated and inverted by 180° in a direction around the first lateral face, the first main cutting edge coincides with the second main cutting edge at an original position before the inversion, the second main cutting edge coincides with the first main cutting edge at an original position before the inversion, and the first and second main cutting edges (the main cutting edges each located on each polygonal surface) have an inverted symmetrical shape with respect to the front and back (first and second) polygonal surfaces.

(3) In the above (1) or (2), the curvature radius of a concave curve formed by the other end portion of the main cutting edge is made larger than the curvature radius of a convex curve formed by the one end portion of the main cutting edge.

(4) In any one of the above (1) to (3), a convex curve formed by the one end portion of the main cutting edge and a concave curve formed by the other end portion of the main cutting edge are in contact with each other. That is, the convexly curved cutting edge and the concavely curved cutting edge are smoothly connected without having an inflection point.

(5) In any one of the above (1) to (4), a convex curve formed by the one end portion (convexly curved cutting edge) of the main cutting edge is made longer than a concave curve formed by the other end portion (concavely curved cutting edge) of the main cutting edge.

(6) In any one of the above (1) to (5), the insert body has a regular polygonal plate shape, the main cutting edges are formed on respective side ridges of the front and back polygonal surfaces having a regular polygonal shape, the front and back polygonal surfaces are arranged so as to be twisted around an insert centerline passing through the centers of the polygonal surfaces, and the insert body has a front-and-back inverted symmetrical shape with respect to the front and back polygonal surfaces.

(7) In any one of the above (1) to (6), the clearance angle of the main cutting edge is made larger on a positive angle side at the one end portion of the main cutting edge than at the other end portion of the main cutting edge.

(8) In the above (7), the clearance angle of the main cutting edge is made to increase gradually to the positive angle side as moving away from the other end portion of the main cutting edge at the one end portion of the main cutting edge on the other end portion side of the main cutting edge.

(9) In the above (7) or (8), the clearance angle of the main cutting edge is made constant at the portion of the one end portion of the main cutting edge opposite the other end portion of the main cutting edge.

(10) In any one of the above (7) to (9), the clearance angle of the main cutting edge is a positive angle of 20° or less at the one end portion of the main cutting edge.

(11) In any one of the above (7) to (10), the clearance angle of the main cutting edge is made constant at the other end portion of the main cutting edge.

(12) In any one of the above (7) to (11), the clearance angle of the main cutting edge is 0° or more at the other end portion of the main cutting edge.

(13) In any one of the above (7) to (12), a corner edge stretching to the one end portion of the main cutting edge and having a convexly curved shape when seen from the direction opposing the rake face is formed on the one corner of the polygonal surface, and the clearance angle of the corner edge is made larger on a negative angle side as moving closer to the other end portion of the corner edge from the one end portion of the corner edge that stretches to the one end portion of the main cutting edge.

(14) In any one of the above (7) to (13), the insert body has an equilateral triangular plate shape, main cutting edges are formed on respective side ridges of front and back polygonal surfaces having an equilateral triangular shape, the front and back polygonal surfaces are arranged so as to be twisted around an insert centerline passing through the centers of the polygonal surfaces, and the insert body has a front-and-back inverted symmetrical shape with respect to the front and back polygonal surfaces.

(15) In any one of the above (1) to (6), a honing is formed on the main cutting edge, and the size of the honing is made larger toward the one end portion of the main cutting edge at the other end portion of the main cutting edge.

(16) In the above (15), the size of the honing is constant at the one end portion of the main cutting edge.

(17) In the above (15), the size of the honing is made larger toward the other end portion of the main cutting edge at the one end portion of the main cutting edge.

(18) In any one of the above (15) to (17), the honing is a round honing, and the size of the honing is the radius of the round honing.

(19) In any one of the above (15) to (18), the clearance angle of the main cutting edge is made larger on a negative angle side at the one end portion of the main cutting edge than at the other end portion of the main cutting edge.

Additionally, an indexable cutting tool of another aspect of the invention includes the following configuration.

(20) An indexable cutting tool includes a tool body that is rotated in a tool rotational direction around an axis; and the cutting insert according to any one of the above (1) to (19) that is detachably mounted to a tip of the tool body, wherein one or two or more insert mounting seats to which the cutting insert is attached are formed on the tool body, the cutting insert is attached to the insert mounting seat so that the rake face is directed to the tool rotational direction, the main cutting edge is directed to the tip side of the tool body, the one end portion of the main cutting edge is located on an inner peripheral side of a tip of the tool body, the other end portion of the main cutting edge is located on an outer peripheral side of a rear end of the tool body, and the other end portion of the main cutting edge extends gradually to a rear end side of the tool body as moving closer to the outer peripheral side of the tool body.

In the cutting insert of the above configuration, the main cutting edge extends between the two corners adjacent to each other in the circumferential direction of the polygonal surface among the corners of the polygonal surface of the insert body, and when seen from the direction opposing the rake face formed on the polygonal surface, the one end portion of the main cutting edge that stretches to the one corner of the two corners has the convexly curved shape, and the other end portion of the main cutting edge that stretches to the other corner of the two corners has the concavely curved shape. By attaching the above-described cutting insert to the insert mounting seat of the indexable cutting tool as described above, the main cutting edge directed to the tip side of the tool body is used for cutting at the time of the high-feed cutting of feeding the tool body at a high feed rate in the direction orthogonal to the axis.

Since this main cutting edge has the concavo-convex curve (gentle S shape) with the convex curve of the one end portion on the inner peripheral side of the tip of the tool body and the concave curve of the other end portion on the outer peripheral side of the rear end of the tool body, the cutting edge angle of the main cutting edge first becomes large and then becomes small toward the outer peripheral side of the tool body. Accordingly, in the high-feed cutting of the present invention, a chip can be prevented from being excessively thick at a cutting boundary of the main cutting edge on the outer peripheral side of the tool body, abnormal damage, such as chipping or breakage, can be prevented, and the maximum thickness of a chip itself can be suppressed to be small. It is thus possible to further increase the feed rate to perform more efficient high-feed cutting.

Additionally, the rake faces are formed on the front and back polygonal surfaces of the insert body, the main cutting edges are formed on the intersecting ridgelines between the rake faces and the flank faces formed on at least one lateral face of the insert body, and the main cutting edges have the inverted symmetrical shape with respect to the front and back polygonal surfaces. Accordingly, between the front and back polygonal surfaces, the concavely curved other end portion of the main cutting edge is located opposite the convexly curved one end portion of the main cutting edge in a front and back relationship. For this reason, in the polygonal surface opposite to the polygonal surface on which the main cutting edge to be used for cutting is formed, since a sufficient clearance can be ensured at the other end portion of the main cutting edge directed to the tip side of the tool body, it is unnecessary to set the axial rake angle of the main cutting edge to be used for cutting to be larger on the negative angle side, and a reduction in cutting resistance and an improvement in chip discharge performance can be achieved.

Moreover, in recent years, in addition to feeding the tool body in the direction orthogonal to the axis of the tool body to perform high-feed cutting, by using the cutting tool, such as the above-described indexable end mill, ramping of slightly feeding the tool body in the direction of the axis to drill down a workpiece is often performed. Even in this case, in order to prevent interference of the main cutting edge directed toward the tip side of the tool body of the polygonal surface opposite to the polygonal surface on which the main cutting edge to be used for cutting is formed, for example, the ramping angle should be set to be small. However, by making the main cutting edges of the front and back polygonal surfaces have the front-and-back inverted symmetrical shape as described above, such interference can be prevented, and thus, the ramping angle can be set large, and an improvement in machining efficiency can also be achieved.

Meanwhile, the position where the thickness of a chip becomes maximum during high-feed cutting can be a position nearer to the central portion of the main cutting edge by making the curvature radius of the concave curve formed by the other end portion of the main cutting edge larger than the curvature radius of the convex curve formed by the one end portion of the main cutting edge. Therefore, abnormal damage to the main cutting edge at the cutting boundary can be more reliably prevented. Additionally, since the main cutting edge has the smoothly continuous concavo-convex curve (gentle S-shaped curve) such that the convex curve formed by the one end portion of the main cutting edge and the concave curve formed by the other end portion of the main cutting edge are in contact with each other, the fluctuation amount of the thickness of a chip during high-feed cutting becomes smooth, and the burden on the main cutting edge can be reduced.

Moreover, since the convex curve formed by the one end portion of the main cutting edge is made longer than the concave curve formed by the other end portion of the main cutting edge, during the above-described ramping, more efficient cutting can also be performed by relatively largely ensuring the ramping amount at the convexly curved one end portion of the main cutting edge. Additionally, the insert body has the regular polygonal plate shape, the main cutting edges are formed on the respective side ridges of the front and back polygonal surfaces having the regular polygonal shape, the front and back polygonal surfaces are arranged so as to be twisted around the insert centerline passing through the centers of the polygonal surfaces, and the insert body has the front-and-back inverted symmetrical shape with respect to the front and back polygonal surfaces. Accordingly, the main cutting edges formed on the side ridges can be uniformly used for cutting without causing interference of the front and back polygonal surfaces at one insert body.

Incidentally, when the above-described ramping is performed, in the negative type cutting inserts described in Patent Citations 1 and 2, particularly the flank face that stretches to the portion of the inner peripheral side of the end mill body of the main cutting edge to be used for cutting interferes with a workpiece. Therefore, it is necessary to make the axial rake angle large to the negative angle side or to set the ramping angle to be small, and thus, chip disposal performance or the sharpness of the cutting edge is impaired, or machining efficiency degrades. On the other hand, in the positive type cutting insert in which the clearance angle that is a positive angle is given to the main cutting edge and the corner edge also including the inner peripheral side of the end mill body as a whole, the relief of the cutting edges can be ensured, but the wedge angle becomes small as a whole. Therefore, abnormal damage, such as chipping or breakage of the main cutting edge becomes significant in the portion where the thickness of a chip becomes maximum during usual high-feed cutting.

Thus, in order to achieve further improvements in chip disposal performance, the sharpness of the cutting edges, and machining efficiency during the ramping while reliably preventing abnormal damage during such high-feed cutting, it is desirable that the clearance angle of the main cutting edge be made larger on the positive angle side at the one end portion of the main cutting edge than at the other end portion of the main cutting edge. Accordingly, the clearance angle at the one end portion of the main cutting edge located on the inner peripheral side of the tip of the tool body becomes larger on the positive angle side than the clearance angle at the other end portion of the main cutting edge located on the outer peripheral side. Thus, it is not necessary that the axial rake angle be made larger on the negative angle side more than needed or the ramping angle be made small, to prevent interference between a workpiece and the flank face of the main cutting edge. In addition, on the outer peripheral side of the tip of the tool body where the thickness of a chip becomes large during the high-feed cutting, the clearance angle of the main cutting edge becomes relatively larger on the negative angle side, and the wedge angle can be ensured. For this reason, it is possible to perform stable cutting during the ramping and the high-feed cutting.

Additionally, the clearance angle of the main cutting edge that becomes larger on the positive angle side at the one end portion of the main cutting edge than the other end portion in this way is made gradually larger on the positive angle side as moving away from the other end portion of the main cutting edge at the one end portion of the main cutting edge on the other end portion side of the main cutting edge. Accordingly, more stable cutting can be performed by avoiding the clearance angle changing abruptly between the one end portion and the other end portion of the main cutting edge. Moreover, the clearance angle of the main cutting edge is made constant at the portion of the one end portion of the main cutting edge opposite to the other end portion of the main cutting edge. Accordingly, it is possible to prevent the wedge angle of the main cutting edge becoming smaller than required at the one end portion and breakage or chipping is likely to occur. On the other hand, if the clearance angle is made constant also at the other end portion of the main cutting edge, it is also possible to prevent the flank face of the main cutting edge at the other end portion interfering with a workpiece.

It is desirable that the clearance angle at the one end portion of the main cutting edge be a positive angle of 20° or less. If this clearance angle is larger on the positive angle side than this value, the wedge angle of the main cutting edge at the one end portion becomes small, and damage, is likely to occur. Additionally, it is desirable that the clearance angle of the main cutting edge at the other end portion be 0° or more. If the clearance angle is larger on the negative angle side than this value, there is a concern that the flank face of the main cutting edge may interfere with a workpiece at the other end portion during the ramping, and therefore, the axial rake angle should be made large.

Moreover, for example, in a case where the corner edge stretching toward the one end portion of the main cutting edge and having the convexly curved shape when seen from the direction opposing the rake face is formed on the one corner of the polygonal surface, and the clearance angle of the corner edge is made larger on the negative angle side as moving closer to the other end portion of the corner edge from the one end portion of the corner edge that stretches to the one end portion of the main cutting edge, while interference with a workpiece can be prevented by making the clearance angle of the corner edge larger on the positive angle side similar to the one end portion of the main cutting edge at the one end portion of the corner edge that stretches toward the one end portion of the main cutting edge, it is possible to increase the wedge angle of the corner edge toward the other end portion of the corner edge to prevent breakage or the like.

Additionally, among cases where the insert body is formed in the regular polygonal plate shape as described above, in a case where the insert body has the equilateral triangular plate shape, the main cutting edges are formed on the respective side ridges of the front and back polygonal surfaces having the equilateral triangular shape, the front and back polygonal surfaces are arranged so as to be twisted around the insert centerline passing through the centers of the polygonal surfaces, and the insert body has the front-and-back inverted symmetrical shape with respect to the front and back polygonal surfaces, the main cutting edge to be used for cutting can be adapted so as to approach the rear end side after protruding to the tip side of the tool body at the one end portion of the main cutting edge being closer to the outer peripheral side of the tool body from the inner peripheral side of the tool body so as to extend gradually toward the rear end side of the tool body at the other end portion of the main cutting edge.

Accordingly, when the ramping is performed, even if the ramping amount is relatively large, it is possible to prevent the other main cutting edges interfering with a workpiece. For this reason, a total of six main cutting edges formed on the respective side ridges of the front and, back polygonal surfaces having the equilateral triangular shape can be more reliably used.

On the other hand, in the cutting insert of the above configuration, even if the honing is formed on the main cutting edge, and the size of the honing is made larger toward the one end portion of the main cutting edge at the other end portion of the main cutting edge, it is possible to prevent abnormal damage to the main cutting edge at the portion where a chip becomes thicker as described above during the high-feed cutting.

That is, as described above, the cutting edge angle first becomes large and then becomes small toward the outer peripheral side of the tool body. Accordingly, the position where the thickness of a chip becomes maximum is displaced from the cutting boundary of the main cutting edge on the outer peripheral side of the tool body to the central portion near the inner peripheral side of the tool body. By adopting such a configuration, the honing becomes larger toward the one end portion of the main cutting edge located on the inner peripheral side of the tool body, at the other end portion of the main cutting edge located on the outer peripheral side of the tool body. For this reason, the cutting edge strength can be ensured at the central portion where the thickness of a chip increases, and it is possible to further increase the feed rate to perform more efficient high-feed cutting.

Additionally, when the ramping is performed using the cutting insert in which the size of such a honing is made larger toward the one end portion of the main cutting edge at the other end portion of the main cutting edge, the main cutting edge cuts a workpiece with the one end portion that protrudes to the tip side of the tool body as described above. Therefore, the size of the honing is not changed from the size made large at the other end portion when making the size of the honing constant at one end portion of the main cutting edge. Thus, chipping or breakage when the main cutting edge cuts the workpiece can also be prevented.

Additionally, when the size of the honing is made larger toward the one end portion at the other end portion of the main cutting edge in the above described way, and the size of the honing at the one end portion of the main cutting edge is also made large toward the other end portion of the main cutting edge, as described above, while ensuring the cutting edge strength at the central portion between the one end portion and the other end portion of the main cutting edge, an improvement in the sharpness of the main cutting edge can be achieved by making the size of the honing small at both ends of the main cutting edge. For this reason, a reduction in cutting resistance during high-feed cutting can be achieved, and more efficient cutting can be achieved.

When the honing is the round honing having the convex curve, such as a circular arc, in the cross-section orthogonal to the main cutting edge, the size of this honing becomes the curvature radius of the convex curve formed by the round honing in the cross-section. Additionally, when the honing is a chamfered honing having a straight line in the cross-section orthogonal to the main cutting edge, or a composite honing in which an intersecting portion formed between the straight line and a line formed by the rake face or the flank face in this cross-section is rounded, the size of the honing is the radius of a circle inscribed on the straight line and the line formed by the rake face or the flank face.

Moreover, when the size of the honing of the main cutting edge is made larger toward the one end portion of the main cutting edge at the other end portion of the main cutting edge in this way, the clearance angle of the main cutting edge may be made larger on the positive angle side at the other end portion than at the one end portion. By adopting such a configuration, the clearance angle becomes larger on the negative angle side at the one end portion than the other end portion of the main cutting edge. Thus, chipping or breakage during the above-described ramping can be more reliably prevented, and a reduction in cutting resistance can be achieved at the other end portion of the main cutting edge.

The configurations of the above (7) to (14) and the configurations of the above (15) to (19) can be combined with each other, except for combining the configuration of the above (7) and the configuration of the above (19).

ADVANTAGEOUS EFFECTS OF THE INVENTION

As described above, according to the invention, in high-feed cutting, abnormal damage to the main cutting edge can be prevented by preventing a chip from having the largest thickness at the cutting boundary of the main cutting edge and preventing the thickness of a chip itself from becoming excessively large, and the feed rate can be further increased to perform more efficient high-feed cutting.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Embodiments for Carrying Out the Invention

Figure 1:
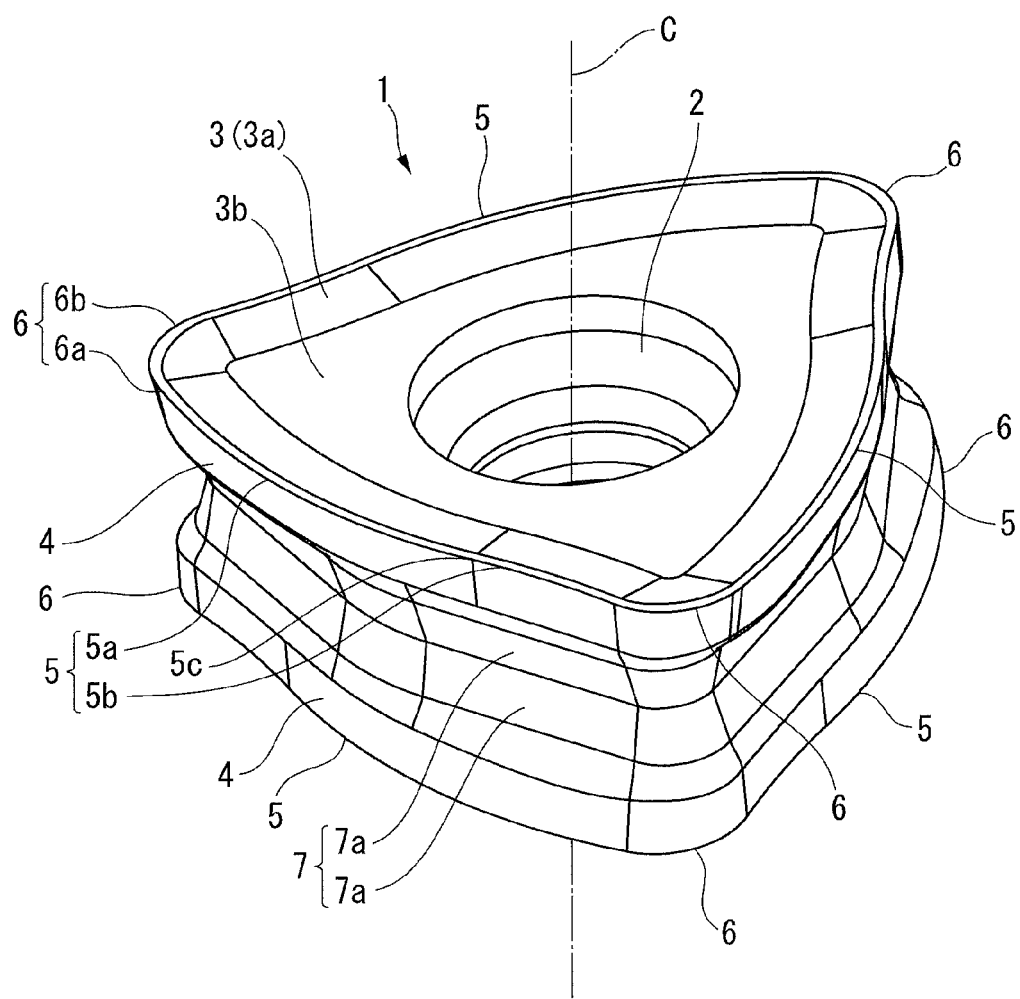
FIG. 1 is a perspective view showing a first embodiment of a cutting insert of the invention.

FIGS. 1 to 4C show a first embodiment of a cutting insert of the invention, and FIGS. 5 to 10C show an indexable end mill as a first embodiment of an indexable cutting tool of the invention to which the cutting insert of this embodiment is attached. In the cutting insert of the present embodiment, an insert body 1 of the cutting insert is formed in a polygonal plate shape, specifically, a regular polygonal plate shape, and is formed in an equilateral triangular plate shape in the present embodiment, using a hard material selected from cemented carbide, cermet, surface-coated cemented carbide, surface-coated cermet, or the like. An attachment hole 2, which penetrates the insert body 1 in a thickness direction (a direction orthogonal to the drawing of FIG. 2; an up-and-down direction in FIGS. 3A to 3E and FIGS. 4A to 4C) of the insert body 1 and allows the insert body 1 to be attached to an end mill body 11 of an indexable end mill, is open at the centers of a pair of front and back polygonal surfaces (first and second polygonal surfaces) of the insert body 1 having an equilateral triangular shape.

Figure 2:
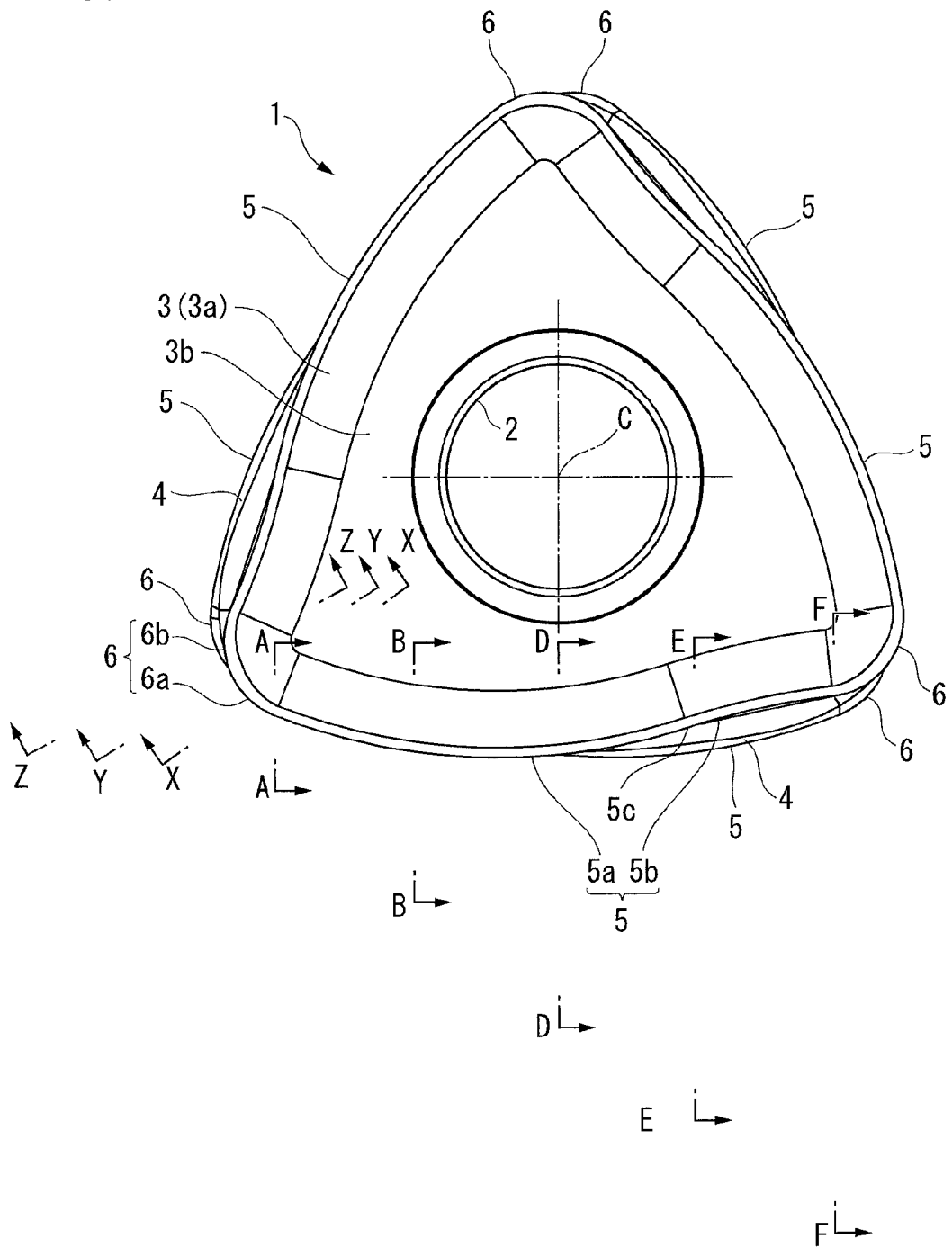
FIG. 2 is a plan view of the embodiment shown in FIG. 1.
Figure 3A:
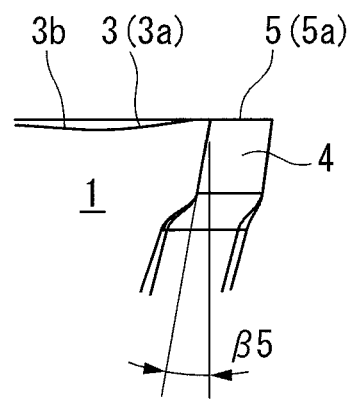
FIG. 3A is an enlarged cross-sectional view along line AA in FIG. 2.
Figure 3B:
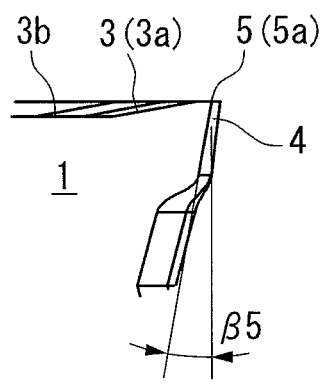
FIG. 3B is an enlarged cross-sectional view along line BB in FIG. 2.
Figure 3C:
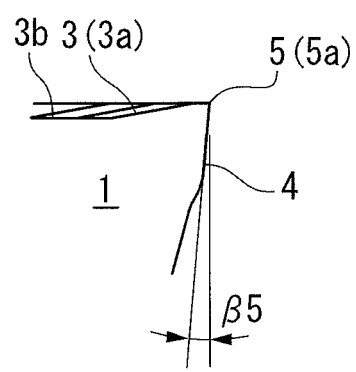
FIG. 3C is an enlarged cross-sectional view along line DD in FIG. 2.
Figure 3D:
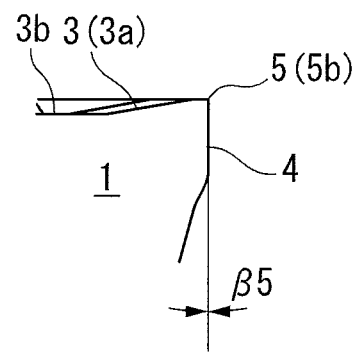
FIG. 3D is an enlarged cross-sectional view along line EE in FIG. 2.
Figure 3E:
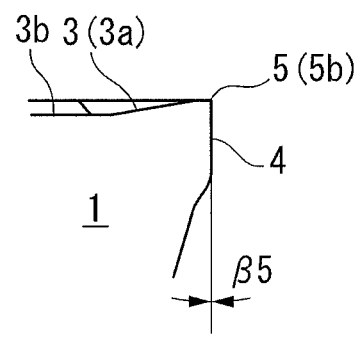
FIG. 3E is an enlarged cross-sectional view along line FF in FIG. 2.

In the present embodiment, the front and back polygonal surfaces of the insert body 1, as shown in FIG. 2, are arranged so as to be slightly twisted around an insert centerline C extending in the thickness direction of the insert body 1 through the center (the centers of the front and back polygonal surfaces) of the attachment hole 2. Additionally, the insert body 1 of the present embodiment having the equilateral triangular plate shape has a rotational symmetrical shape at every 120° around the insert centerline C, and has a front-and-back inverted symmetrical shape with respect to three imaginary straight lines passing through respective centers of three lateral faces of the insert body 1 arranged around the front and back equilateral triangular surfaces so as to be orthogonal to the insert centerline C.

Rake faces 3 are formed on the front and back polygonal surfaces of this insert body 1, and flank faces 4 are formed on the lateral faces of the insert body 1 arranged around the polygonal surfaces. Moreover, at intersecting ridgelines between the rake faces 3 and the flank faces 4, main cutting edges 5 are formed on respective side ridges of both the polygonal surfaces, and corner edges 6 are formed on respective corners of the polygonal surfaces. The corner edges 6 have a convexly curved shape, such as a ⅓ circular arc, when seen from a direction opposing the rake face 3 in the direction of the insert centerline C. In the present embodiment, the main cutting edges 5 and the corner edges 6 are located on one plane perpendicular to the insert centerline C in each of the front and back polygonal surfaces.

In the rake faces 3 formed on the front and back polygonal surfaces, outer peripheral portions running along the main cutting edges 5 and the corner edges 6 serve as positive rake faces 3a that incline so as to recede in the thickness direction toward an opposite polygonal surface side as and being apart from the main cutting edges 5 and the corner edges 6 and being closer to the inner sides of the polygonal surfaces. Additionally, peripheries of openings of the attachment hole 2 at the centers of the polygonal surfaces serve as planar binding faces 3b perpendicular to the insert centerline C. In the present embodiment, the inclination angle of the positive rake faces 3a is made constant over the whole circumferences of the rake faces 3. Additionally, the main cutting edges 5 and the corner edges 6 may be provided with lands or round honings. In the respective drawings, boundary lines are shown at the positive rake faces 3a, the flank faces 4, or the like for explanation, but the boundary lines may not appear in practice.

Figure 10A:
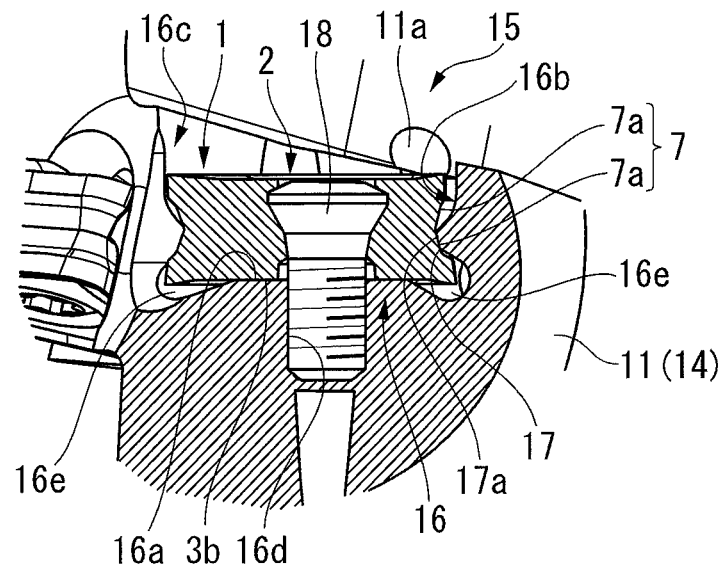
FIG. 10A is a cross-sectional view along line AA in FIG. 9.
Figure 10B:
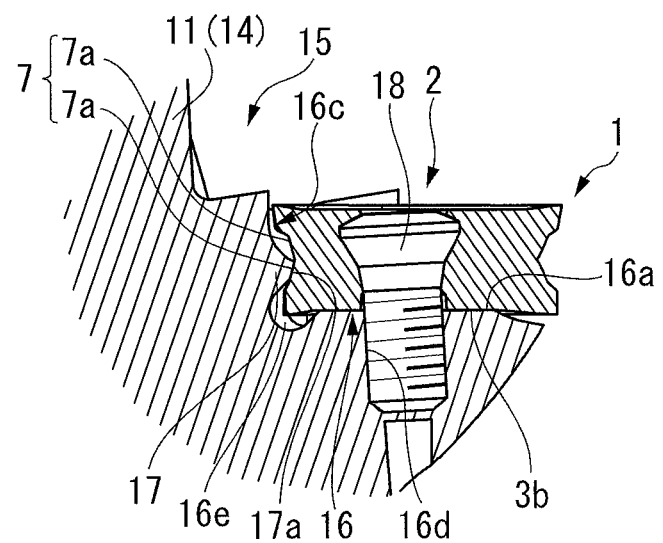
FIG. 10B is a cross-sectional view along line BB in FIG. 9.
Figure 10C:
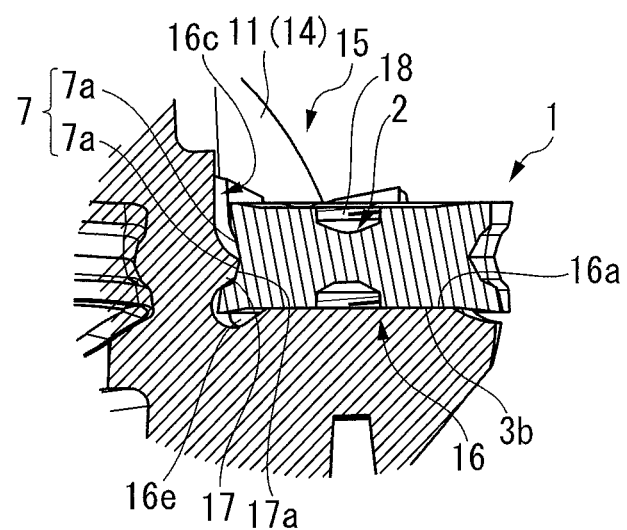
FIG. 10C is a cross-sectional view along line DD in FIG. 9.

Additionally, as shown in FIG. 1, recesses 7 recessed inwardly are formed over the whole circumference of the insert body 1 at a central portion of the insert body 1 in the thickness direction, in the three lateral faces arranged around front and back quadrangular surfaces of the insert body 1. In the present embodiment, the respective recesses 7 of the three lateral faces are formed in a concave V shape by a pair of inclined surfaces 7a further recessed to the inner side of the insert body 1, as moving closer to the center in the thickness direction, as shown in FIGS. 10A to 10C, in a cross-section parallel to the insert centerline C.

The opening angle of the concave V shape formed by the pair of inclined surfaces 7a is, for example, an obtuse angle (about 170° to 140°). Additionally, the width, in the direction of the insert centerline C, of the recess 7 formed by the pair of inclined surfaces 7a is ⅓ or more of the thickness of the insert body 1 itself, and the flank faces 4 of the main cutting edge 5 and the corner edge 6 are formed on portions located on both outer sides of each lateral face in the thickness direction and become convex to the outer side of the insert body 1 with respect to the recess 7.

Figure 8:
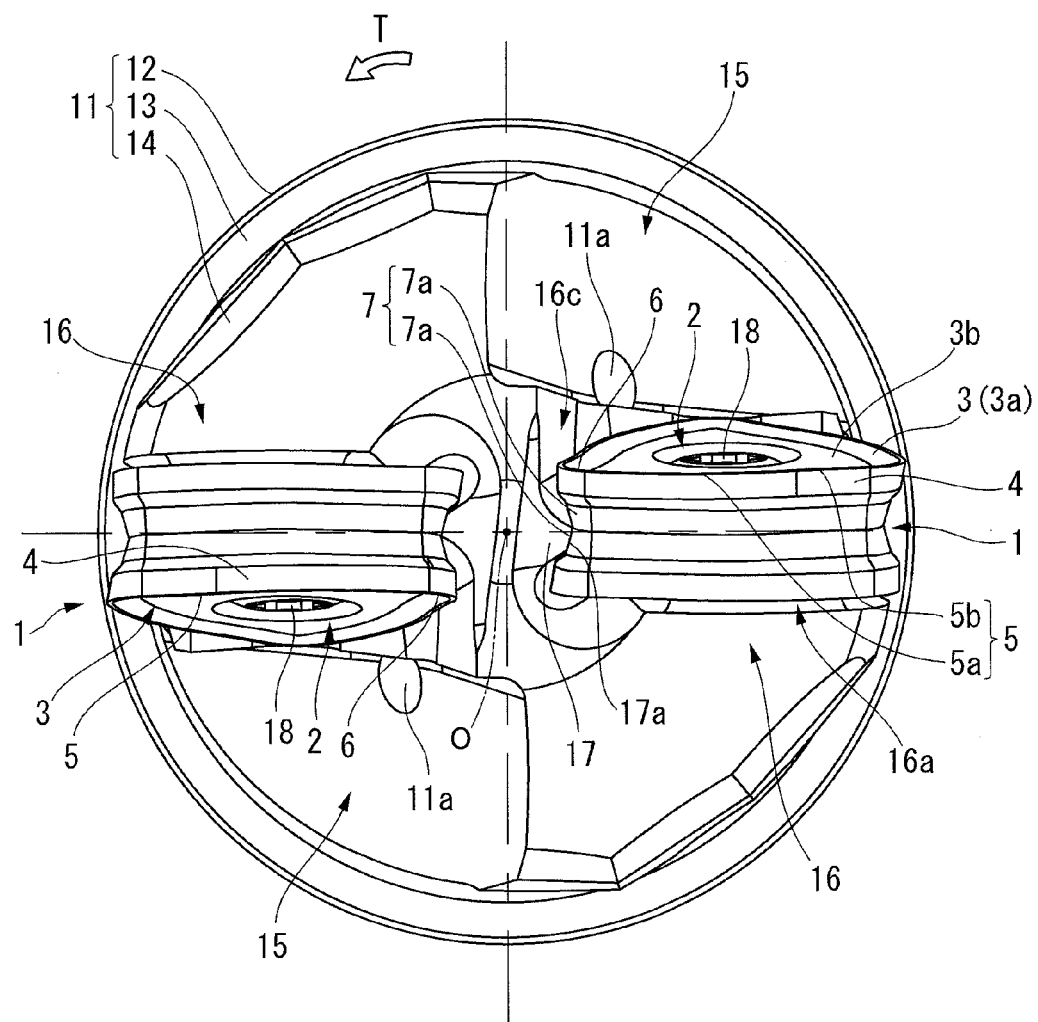
FIG. 8 is an enlarged front view of the indexable end mill shown in FIG. 5.
Figure 9:
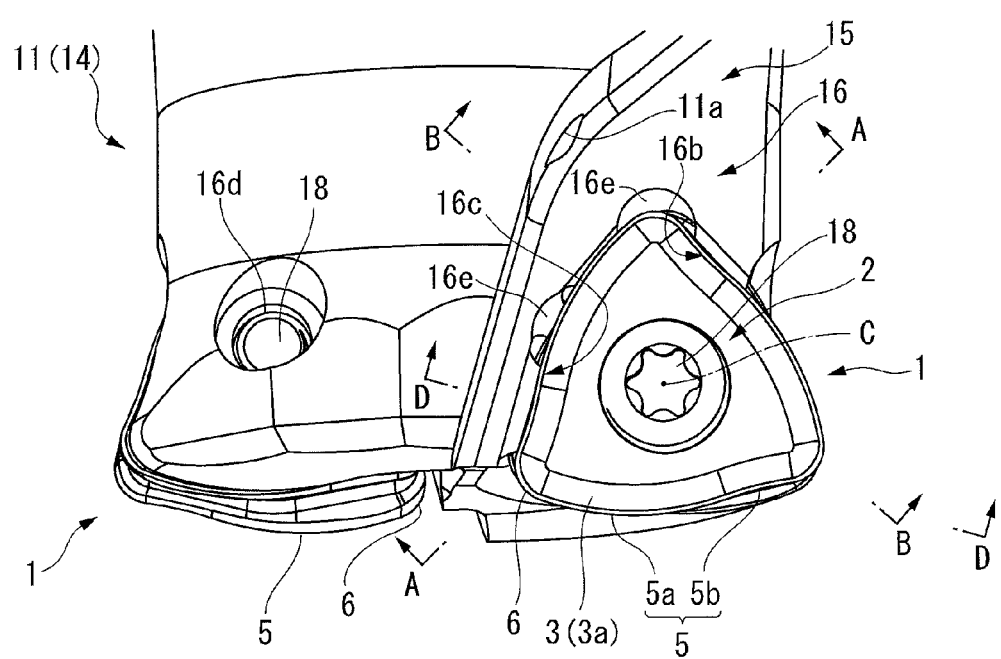
FIG. 9 is a perspective view when the end mill body tip portion of the indexable end mill shown in FIG. 5 is seen from an insert centerline direction.

Moreover, the cutting insert of the present embodiment is a right-handed cutting insert adapted such that a main cutting edges 5 and a corner edges 6 to be used during cutting serve as right-handed edges rotated in the counterclockwise direction when the indexable end mill is seen from the front side as shown in FIG. 8. When seen from the direction opposing the polygonal surface on which the rake face 3 of the main cutting edge 5 and the corner edge 6 is formed, one end portion 6a of the corner edge 6, which stretches to one end portion 5a (convexly curved cutting edge) of the main cutting edge 5 located on a clockwise side on the circumference of the polygonal surface, is located at the one end portion 5a of the main cutting edge 5, and the other end portion 6b of the other corner edge 6 stretches to the other end portion 5b (concavely curved cutting edge) of the main cutting edge 5 located on a counterclockwise side. When seen from one polygonal surface side, the other polygonal surface, as shown in FIG. 2, is slightly twisted toward the clockwise side.

Figure 4A:
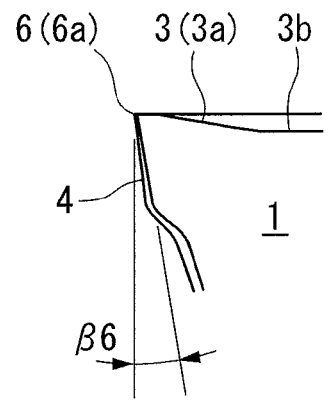
FIG. 4A is an enlarged cross-sectional view along line XX in FIG. 2.
Figure 4B:
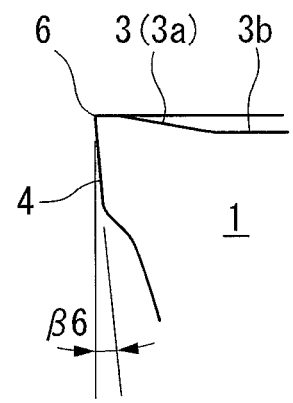
FIG. 4B is an enlarged cross-sectional view along line YY in FIG. 2.
Figure 4C:
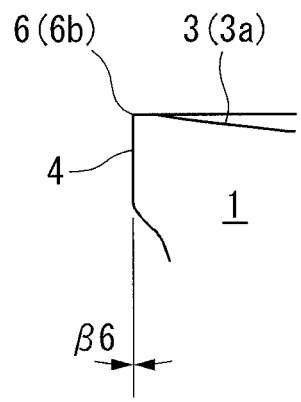
FIG. 4C is an enlarged cross-sectional view along line ZZ in FIG. 2.
Figure 5:
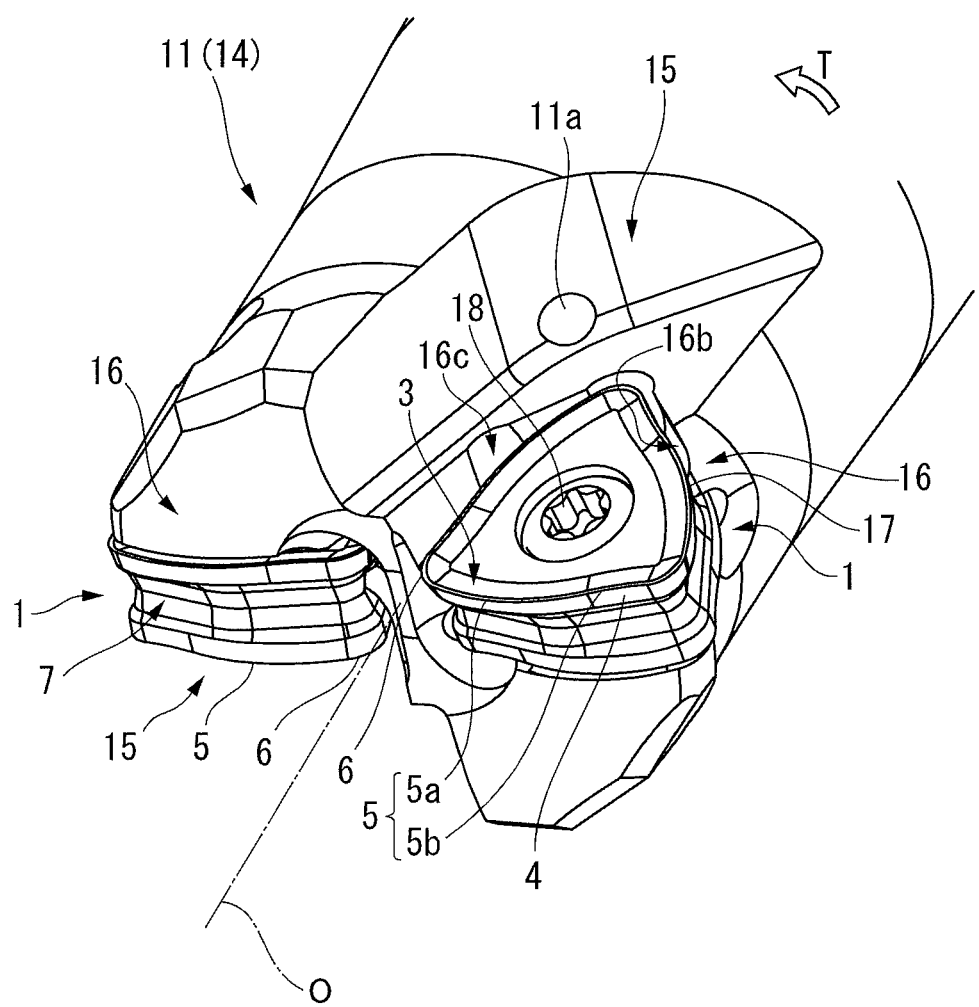
FIG. 5 is a perspective view of an end mill body tip showing an indexable end mill as a first embodiment of an indexable cutting tool of the invention to which the cutting insert of the embodiment shown in FIG. 1 is attached.
Figure 6:
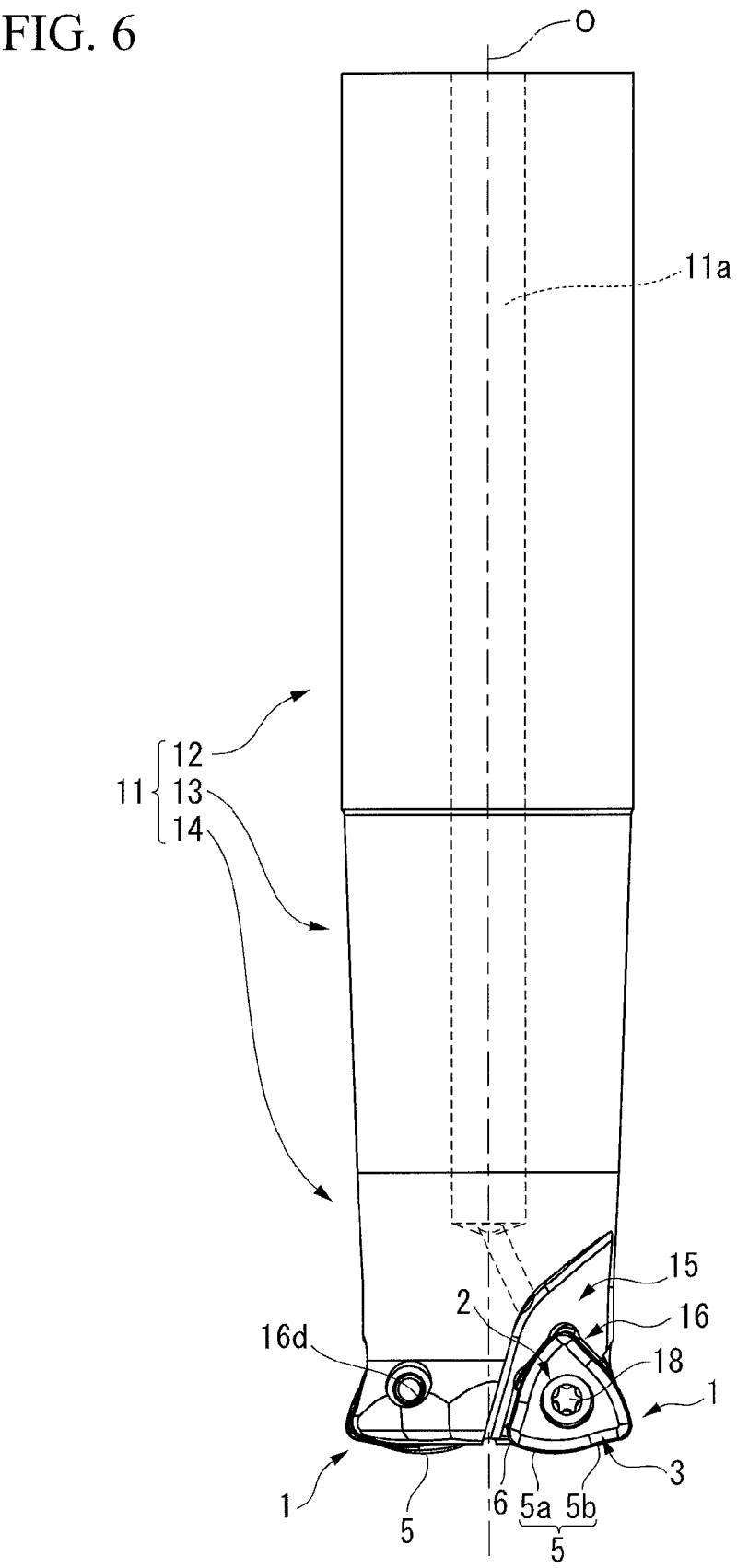
FIG. 6 is a plan view of the indexable end mill shown in FIG. 5.

The clearance angle β6 of the corner edge 6, that is, the angle at which the flank face 4 that stretches to the corner edge 6 is formed with respect to a straight line parallel to the insert centerline C in the cross-section running along the insert centerline C, as shown in FIGS. 4A to 4C, becomes larger on a negative angle side as moving closer to the other end portion 6b of the corner edge 6 from the one end portion 6a of the corner edge 6 that stretches to the one end portion 5a of the main cutting edge 5. That is, the flank face 4 recedes from the other end portion 6b toward the one end portion 6a so as to be more largely recessed to the inner side of the insert body 1 as being further away in the thickness direction from the corner edge 6 in the cross-section. The clearance angle β6 of the corner edge 6 in the present embodiment is a positive angle of 20° or less at the one end portion 6a of the corner edge 6, is 0° at the other end portion 6b, and is made gradually larger on the negative angle side.

As for the main cutting edge 5 that stretches to the corner edge 6, as shown in FIG. 2, when seen from the direction opposing the rake face 3 in the direction of the insert centerline C, the one end portion 5a of the main cutting edge 5 that stretches to one end portion 6a of the corner edge 6 has a convexly curved shape with a larger curvature radius than a convex curve formed by the corner edge 6, and the other end portion 5b of the main cutting edge 5 has a concavely curved shape. That is, the one end portion 5a of the main cutting edge 5 serves as a convexly curved cutting edge, and the other end portion 5b of the main cutting edge 5 serves as a concavely curved cutting edge. As for the concavo-convex curve formed by the main cutting edge 5, the curvature radius of a concave curve formed by the other end portion 5b is larger than the curvature radius of a convex curve formed by the one end portion 5a, and the length of the convex curve formed by the one end portion 5a is larger than the length of the concave curve formed by the other end portion 5b.

Accordingly, in one main cutting edge 5 formed on one side ridge extending between two corners adjacent to each other in the circumferential direction of the polygonal surface among the corners of the polygonal surface, when seen from the direction opposing the rake face 3, the one end portion (first end portion) 5a of the main cutting edge 5, which stretches to one corner (first corner; the corner on the clockwise side of the side ridge in the present embodiment having the right-handed cutting insert) of the two corners, has a convexly curved shape, and the other end portion (second end portion) 5b of the main cutting edge 5, which stretches to the other corner (second corner; the corner on the counterclockwise side of the side ridge in the present embodiment) has a concavely curved shape.

The insert body 1 has a rotational symmetrical shape at every predetermined angle (120° in the present embodiment) around the insert centerline C. Thus, in the right-handed cutting insert of the present embodiment, when seen from the direction opposing the rake face 3, the one corner with respect one main cutting edge 5 is the other corner with respect to another main cutting edge 5 adjacent to the one main cutting edge 5 in the clockwise direction via the one corner.

Additionally, since the insert body 1 has the front-and-back inverted symmetrical shape with respect to the three imaginary straight lines passing through the respective centers of the lateral faces, two main cutting edges 5 formed at intersecting ridgelines between two flank faces 4 formed on one lateral face of the insert body 1 and the rake faces 3 of the front and back polygonal surfaces also have an inverted symmetrical shape with respect to the front and back polygonal surfaces. That is, when one polygonal surface out of the pair of front and back polygonal surfaces of the insert body 1 is defined as a first polygonal surface, the other polygonal surface is defined as a second polygonal surface, one lateral face of the insert body 1 is defined as a first lateral face, a flank face 4 on a first polygonal surface side out of two flank faces 4 formed on the first lateral face is defined as a first flank face 4, a main cutting edge 5 formed on an intersecting ridgeline between the first flank face 4 and a rake face (first rake face) 3 of the first polygonal surface is defined as a first main cutting edge 5, a flank face 4 on a second polygonal surface side of the first lateral face is defined as a second flank face 4, and a main cutting edge 5 formed on an intersecting ridgeline between the second flank face 4 and a rake face (second rake face) 3 of the second polygonal surface is defined as a second main cutting edge 5, if the insert body 1 is rotated and inverted by 180° in a direction around the imaginary straight line of the first lateral face, the first main cutting edge 5 coincides with the second main cutting edge at an original position before the inversion, the second main cutting edge coincides with the first main cutting edge at an original position before the inversion, and the first and second main cutting edges 5 have an inverted symmetrical shape with respect to the front and back first and second polygonal surfaces.

Accordingly, as for a total of two main cutting edges (first and second main cutting edges) 5 formed on both sides in the insert thickness direction of one lateral face (first lateral face) of the insert body 1, the other end portion (second end portion) 5b of the other main cutting edge 5 is located opposite to one end portion (first end portion) 5a of one main cutting edge 5 in the insert thickness direction, and one end portion (first end portion) 5a of the other main cutting edge 5 is located opposite to the other end portion (second end portion) 5b of the one main cutting edge 5 in the insert thickness direction. Additionally, as for the corners of the polygonal surfaces on which the corner edges 6 that stretch to the two main cutting edges 5 are formed, the other corner (second corner) is located opposite to one corner (first corner) in the insert thickness direction, in one polygonal surface (first polygonal surface) and the other polygonal surface (second polygonal surface).

Additionally, in the present embodiment, a convex curve formed by the one end portion 5a of the main cutting edge 5 and a concave curve formed by the other end portion 5b are in contact with each other at a contact point 5c (boundary). That is, the convexly curved cutting edge 5a and the concavely curved cutting edge 5b are smoothly connected without an inflection point at the contact point 5c. The curvature of the main cutting edge 5 at the contact point 5c is zero. The one end portion 5a of the main cutting edge 5 and the one end portion 6a of the corner edge 6 that stretches thereto, and the other end portion 5b of the main cutting edge 5 and the other end portion 6b of the other corner edge 6 that stretches thereto are also in contact with each other. Accordingly, the contact point 5c is located further toward the other corner side than a middle point of the side ridge of the polygonal surface on which the main cutting edge 5 is formed. In the present embodiment, a portion from a contact point between the one end portion 5a of the main cutting edge 5 and the one end portion 6a of the corner edge 6 that stretches thereto to the contact point 5c between the one end portion 5a of the main cutting edge 5 and the other end portion 5b is the range of the one end portion 5a of the main cutting edge 5 serving as the convexly curved cutting edge, and a portion from the contact point 5c to a contact pint between the other end portion 5b of the main cutting edge 5 and the other end portion 6b of the other corner edge 6 that stretches thereto is the range of the other end portion 5b of the main cutting edge 5 serving as the concavely curved cutting edge. Accordingly, in the present embodiment, the main cutting edges 5 and the corner edges 6 formed on the respective side ridges and corners of the front and back polygonal surfaces serving as the rake faces 3 go round while drawing the concavo-convex curve that is smoothly continuous.

Moreover, the clearance angle β5 of such a main cutting edge 5, as shown in FIGS. 3A to 3E, is made larger on the positive angle side at the one end portion 5a of the main cutting edge 5 than at the other end portion 5b of the main cutting edge 5. In other words, the clearance angle β5 is made larger on the negative angle side at the other end portion 5b of the main cutting edge 5 than at the one end portion 5a. In the present embodiment, the clearance angle β5 of the main cutting edge 5, as shown in FIG. 2, is an angle at which the flank face 4 that stretches to the main cutting edge 5 is formed with respect to the straight line passing through the main cutting edge 5 and parallel to the insert centerline C, in a cross-section (DD cross-section in FIG. 2) obtained by a plane including the insert centerline C and a straight line passing through the center of a lateral face of the insert body 1 and a cross-section parallel to this cross-section, and is 0° when the flank face 4 is parallel to the insert centerline C. Additionally, the clearance angle β5 is a positive angle when the flank face 4 recedes to the inner side of the insert body 1 with respect to the straight line parallel to the insert centerline C as moving away from the main cutting edge 5, and on the contrary, the clearance angle β5 is a negative angle when the flank face 4 protrudes to the outer side of the insert body 1.

In the present embodiment, the clearance angle β5 of the main cutting edge 5 is a positive angle of 20° or less equally to the clearance angle β6 at the one end portion 6a of the corner edge 6 at a point (one end portion of the main cutting edge 5 and one end portion the corner edge 6) in contact with the corner edge 6 that stretches to the one end portion 5a at the one end portion 5a of the main cutting edge 5, remains constant at the clearance angle β5 on the corner edge 6 side of the one end portion 5a toward the other end portion 5b side of the main cutting edge 5, and becomes gradually larger on the negative angle side as moving closer to the contact point 5c, that is, as moving closer to the other end portion 5b side, at a portion approaching the contact point 5c of the one end portion 5a opposite to the corner edge 6. In other words, the clearance angle β5 of the main cutting edge 5 becomes larger on the positive angle side as moving away from the contact point 5c, that is, as moving away from the other end portion 5b, in the portion of the one end portion 5a adjacent to the contact point 5c, that is, on the other end portion 5b side of the one end portion 5a of the main cutting edge 5.

Moreover, the clearance angle β5 of the main cutting edge 5 at the one end portion 5a made larger on the negative angle side toward the other end portion 5b side in this way is a negative value of 0° in the present embodiment at the contact point 5c between the one end portion 5a and the other end portion 5b of the main cutting edge 5, and remains constant at the clearance angle β5 of 0° at the other end portion 5b. Accordingly, in the present embodiment, the clearance angles β5 and β6 are made equal to each other in respective contact points including the contact point between the one end portion 5a of the main cutting edge 5 and the one end portion 6a of the corner edge 6 that stretches thereto, the contact point between the other end portion 5b of the main cutting edge 5 and the other end portion 6b of other corner edges 6 that stretches thereto, and the contact point 5c between the one end portion 5a and the other end portion 5b of the main cutting edge 5, and the flank face 4 of the main cutting edge 5 and the corner edge 6 have concavo-convex curved surfaces smoothly continuous over the whole circumference of the insert body 1.

In this way, as the flank face 4 that stretches to the main cutting edge 5 and the corner edge 6 has a concavo-convex curved surface shape, the recess 7 formed between the flank faces 4 on the front and back polygonal surface (equilateral triangular surface) sides in the lateral faces of the insert body 1 is formed such that a cross-section orthogonal to the insert centerline C of the inclined surface 7a has an eccentric hexagonal shape in which portions running along the main cutting edge 5 have a convex V-shaped polygonal line shape extending in directions intersecting each other at an obtuse angle, and portions running along the one end portion 5a and the other end portion 5b of each of a pair of main cutting edges 5 adjacent to each other via the corner edge 6 in the circumferential direction have a convex V-shaped polygonal line shape extending in directions intersecting each other at an acute angle.

In the indexable end mill, which is the indexable cutting tool of the first embodiment to which the cutting insert configured in this way is detachably attached, an end mill body 11 that is the tool body of the end mill has a substantially columnar shape being centered on the axis O. A rear end side (upper side in FIGS. 6 and 7) of the end mill body 11 serves as a shank part 12 having the columnar shape, and a cutting part 14 to which the cutting insert is attached is formed via a neck part 13 further toward a tip side (lower side in FIGS. 6 and 7) than the shank part 12. Such an indexable end mill is usually fed in the direction perpendicular to the axis O while the shank part 12 is gripped by a spindle of a machine tool and is rotated in an end mill rotational direction T around the axis O, and performs cutting on a workpiece, using the cutting insert of the first embodiment attached to the cutting part 14.

A plurality of (two in the present embodiment) chip pockets 15 are formed in the cutting part 14 so as to be open to a tip outer periphery of the end mill body 11, and insert mounting seats 16 to which cutting inserts are attached are formed in tips of wall surfaces of the chip pockets 15 that face the end mill rotational direction T side. A coolant hole 11a is bored along the axis O from a rear end surface of the shank part 12 toward the tip side in the end mill body 11, and the coolant hole 11a branches to a plurality of holes in the cutting part 14, and is open toward the insert mounting seats 16 in the wall surfaces of the respective chip pockets 15 that faces a backward side in the end mill rotational direction T.

The insert mounting seat 16 has a flat bottom surface 16a that is first recessed to the backward side in the end mill rotational direction T from the wall surface of the chip pocket 15 and faces the end mill rotational direction T, a wall surface 16b that extends toward the end mill rotational direction T from the bottom surface 16a and faces a tip inner peripheral side of the end mill body 11, and a wall surface 16c that faces a tip outer peripheral side, and is a recess of the cutting part 14 that is open to the projecting end surface and outer peripheral surface of the end mill body 11. The bottom surface 16a has a dimension and a shape slightly smaller than the binding face 3b of a central portion of the rake face 3 of the insert body 1, a screw hole 16d is formed perpendicularly to the bottom surface 16a at a central portion of the bottom surface 16a, and projecting strip portions 17 that protrude to the inner side of the insert mounting seat 16 are formed on the wall surfaces 16b and 16c so as to extend in the circumferential direction of the bottom surface 16a.

Among these, two projecting strip portions 17 are formed on an interval on the wall surface 16c that face the outer peripheral side of the tip of the end mill body 11 so as to extend from the tip side of the end mill body toward the rear end side thereof, and the projecting end surfaces 17a of the projecting strip portions 17 on the inner side of the insert mounting seat 16 are formed to have, in a cross-section orthogonal to a centerline of the screw hole 16d, an obtuse angle equal to an angle of the convex V shape formed by the inclined surfaces 7a of the recess 7 in the portion running along the main cutting edge 5 of the insert body 1 in the cross-section orthogonal to the insert centerline C, and have a polygonal line shape extending in directions intersecting each other in a concave V shape.

Additionally, one projecting strip portion 17 is formed on the wall surface 16b that faces the tip inner peripheral side of the end mill body 11, and similar to the above, the projecting end surface 17a of the projecting strip portion 17, together with the projecting end surface 17a of the projecting strip portion 17 on the rear end side of the wall surface 16c, is formed to have, in the cross-section orthogonal to the centerline of screw hole 16d, a convex V-shaped polygonal line shape extending in directions intersecting each other at an angle equal to the acute angle of the convex V shape formed by the inclined surfaces 7a of the recess 7 in portions running along the one end portion 5a and the other end portion 5b of each of a pair of main cutting edges 5 adjacent to each other via the corner edge 6 in the circumferential direction of the insert body 1 in the cross-section orthogonal to the insert centerline C. Recesses 16e are formed between the projecting end surface 17a of each projecting strip portion 17 and the bottom surface 16a and between the adjacent projecting strip portions 17.

Moreover, the projecting end surfaces 17a are formed as inclined surfaces that bulges to the inner side of the insert mounting seat 16 as moving away from the bottom surface 16a in the direction of the centerline of the screw hole 16d and as moving closer to the forward side in the end mill rotational direction T, and the inclination angle thereof with respect to the bottom surface 16a is made equal to an inclination angle at which each of the pair of inclined surfaces 7a of the recess 7 of the insert body 1 having a concave V-shaped cross-section is formed with respect to the planar binding face 3b of the center of the rake face 3 located on the same side with the center of the insert body 1 in the thickness direction as a border. Furthermore, the height of the projecting end surfaces 17a from the bottom surface 16a in the direction of the centerline of the screw hole 16d is within a range of the width, in the thickness direction, of the inclined surface 7a located on the same side from the binding face 3b of the insert body 1.

The cutting insert 1 is seated on such an insert mounting seat 16 so that the rake face 3 of one polygonal surface on which the main cutting edge 5 to be used for cutting is formed out of the front and back polygonal surfaces of the insert body 1 is directed to the end mill rotational direction T, the main cutting edge 5 is made to protrude toward the tip side of the end mill body 11, the one end portion 5a of the main cutting edge 5 is located on the inner peripheral side of the end mill body 11, the other end portion 5b is located on outer peripheral side, the other polygonal surface opposite to the one polygonal surface is used as a seating surface, and the binding face 3b of the center of the other polygonal surface is brought into close contact with the bottom surface 16a.

Additionally, in a state where the insert body 1 is seated in this way, the lateral face of the insert body 1 on which the flank face 4 of the other main cutting edge 5 opposite to the corner edge 6 that stretches to one end portion 5a of the main cutting edge 5 to be used for cutting is formed is made to face the wall surface 16b of the insert mounting seat 16 that faces the tip inner peripheral side of the end mill body 11, and the inclined surface 7a on the polygonal surface side serving as the seating surface out of the pair of inclined surfaces 7a of the recess 7 formed in the lateral face, is made to abut against the inclined projecting end surfaces 17a of the projecting strip portions 17 formed on the wall surface 16b.

Meanwhile, the lateral face of the insert body 1 on which the flank face 4 of the remaining main cutting edge 5 adjacent to the main cutting edge 5 via the corner edge 6 on the one end portion 5a side of the main cutting edge 5 to be used for cutting is formed is made to face the wall surface 16c of the insert mounting seat 16 that faces the outer peripheral side of the tip of the end mill body 11, and the inclined surface 7a on the polygonal surface side also serving as the seating surface out of the pair of inclined surfaces 7a of the recess 7 formed in the lateral face, is made to abut against the projecting end surfaces 17a of the two projecting strip portions 17 formed on the wall surface 16c.

By screwing a clamp screw 18 inserted through the attachment hole 2 of the insert body 1 into the screw hole 16d, the cutting insert 1 is fixed and attached to the insert mounting seat 16 such that the binding face 3b of the polygonal surface serving as the seating surface is pressed against the bottom surface 16a, and the inclined surface 7a on the polygonal surface side serving as the seating surface of the recess 7 of the two lateral faces that face the wall surfaces 16b and 16c is pressed against the projecting end surfaces 17a of the projecting strip portions 17 that have abutted as described above. At this time, in the lateral face of the insert body 1, only the inclined surface 7a is made to abut against and is pressed against the projecting end surface 17a, and the inclined surface 7a on the polygonal surface side serving as the rake face 3 out of the pair of inclined surfaces 7a or other portions do not abut against the wall surfaces 16b and 16c of the insert mounting seat 16.

The main cutting edge 5, to be used for the cutting, of the cutting insert attached in this way is arranged so as to approach the rear end side after protruding to the tip side of the end mill body 11 at the convexly curved one end portion 5a as moving closer to the outer peripheral side of the end mill body 11 from the inner peripheral side thereof and so as to extend gradually to the rear end side of the end mill body 11 at the concavely curved other end portion 5b, and a substantially central portion of the one end portion 5a is formed as a projecting end that protrudes most to the tip side of the end mill body. Additionally, the main cutting edge 5 is slightly inclined so that the whole one end portion 5a is located further toward the tip side of the end mill body 11 than the other end portion 5b and the side ridge of the polygonal surface on which the main cutting edge 5 is formed approaches the rear end side as moving closer to the outer peripheral side of the end mill body 11 with respect to a plane orthogonal to the axis O.

Figure 7:
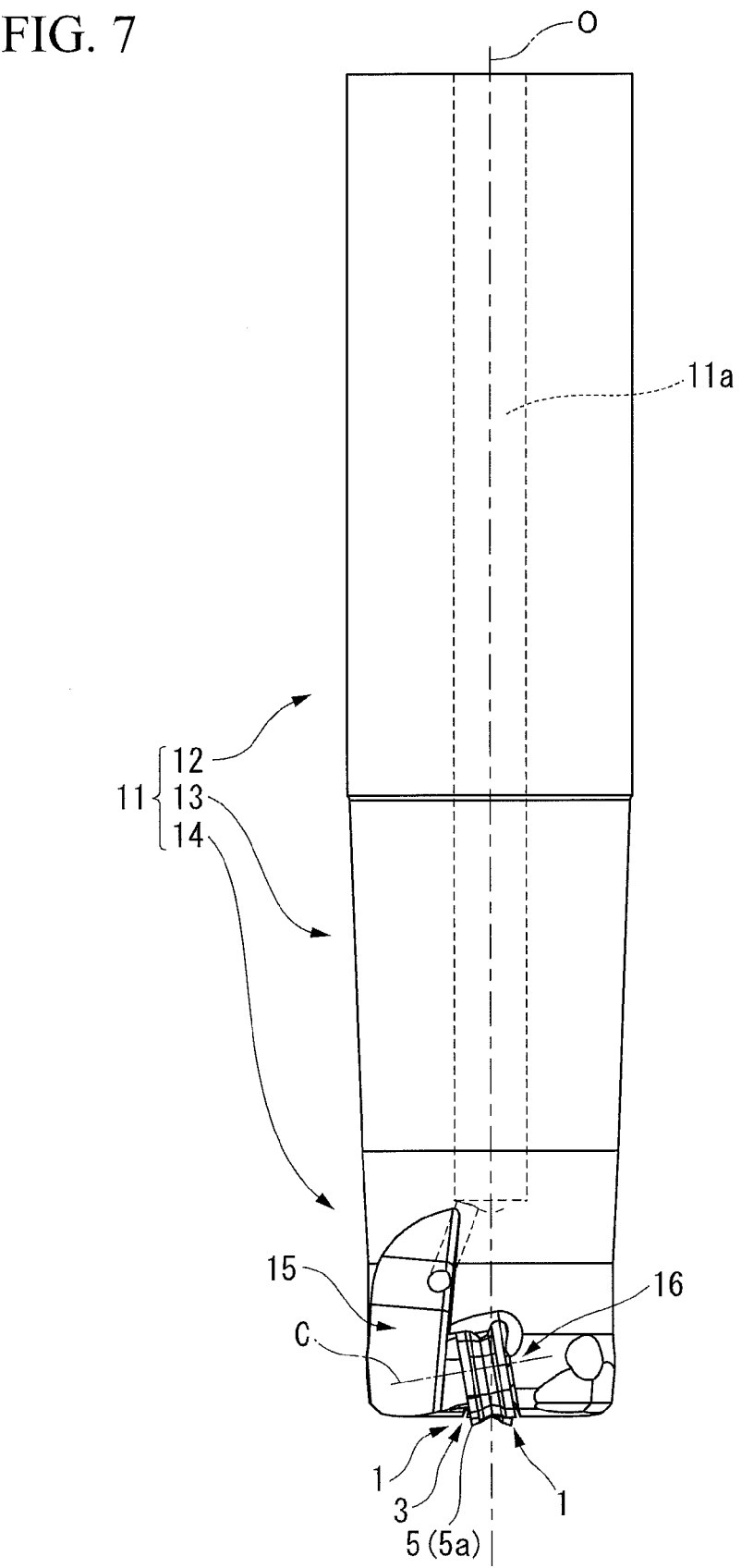
FIG. 7 is a side view of the indexable end mill shown in FIG. 5.

Moreover, the cutting insert 1 is attached so as to be slightly inclined so that, as shown in FIG. 7, the insert centerline C approaches the rear end side in the direction of the axis O of the end mill body 11 as moving closer to the rear side of the end mill rotational direction T, and a negative axial rake angle is set at the main cutting edge 5 to be used for cutting. However, since the rake face 3 that stretches to the main cutting edge 5 serves as the above-described positive rake face 3a, the actual axial rake angle of the main cutting edge 5 does not become excessively large to the negative angle side. By giving the negative axial rake angle in this way, the rake face 3 of the other polygonal surface serving as the seating surface of the insert body 1 is arranged so as to be twisted around the insert centerline C with respect to one polygonal surface, and is also located further toward the rear end side of the end mill body 11 than the main cutting edge 5 to be used for cutting.

Additionally, when seen from the tip side in the direction of the axis O of the end mill body 11, as shown in FIG. 8, the main cutting edge 5 to be used for cutting is located further toward the end mill rotational direction T side than a straight line parallel to the main cutting edge 5 and intersecting the axis O, and is formed as a so-called raised center height. Accordingly, a negative radial rake angle is given to the main cutting edge 5. By giving the negative radial rake angle to the main cutting edge 5 to be used for cutting in this way, the other corner edge 6 that stretches to the outer peripheral side of the end mill body 11 on the other end portion 5b of the main cutting edge 5 protrudes to an outermost periphery of the end mill body 11 in the cutting part 14, and as shown in FIG. 8, the rake face 3 of the other polygonal surface of the insert body 1 is located further toward the inner peripheral side rather than the rotation track of the protruding end of the outermost periphery of the other corner edge 6 around the axis O.

Accordingly, in the cutting insert and the indexable end mill of the above configurations, by attaching the insert body 1 such that, when the main cutting edge 5 is seen from the direction opposing the rake face 3, the one end portion 5a arranged on the inner peripheral side of end mill body 11 has a convexly curved shape with a larger curvature radius than the corner edge 6, the other end portion 5b arranged on the outer peripheral side of the end mill body 11 has a concavely curved shape, and the main cutting edge 5 extends to the rear end side of the end mill body 11 as moving closer to the other end portion 5b from the projecting end of the one end portion 5a, the cutting edge angle of the main cutting edge 5 when the high-feed cutting of feeding the end mill body 11 in the direction orthogonal to the axis O to perform cutting becomes gradually larger at the one end portion 5a from the projecting end to the outer peripheral side of the end mill body 11, whereas the cutting edge angle becomes gradually smaller at the other end portion 5b.

Figure 11A:
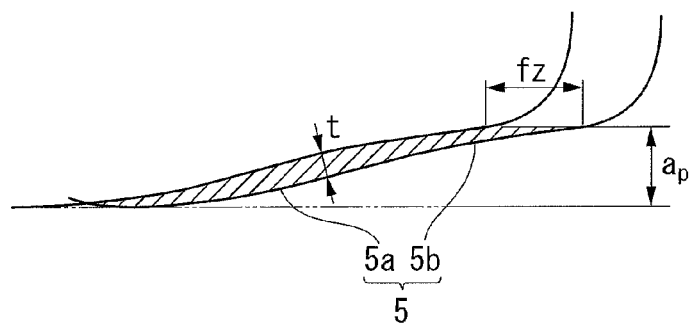
FIG. 11A is a view showing a cross-section of a chip created by the indexable end mill shown in FIG. 5 when high-feed cutting is performed.
Figure 11B:
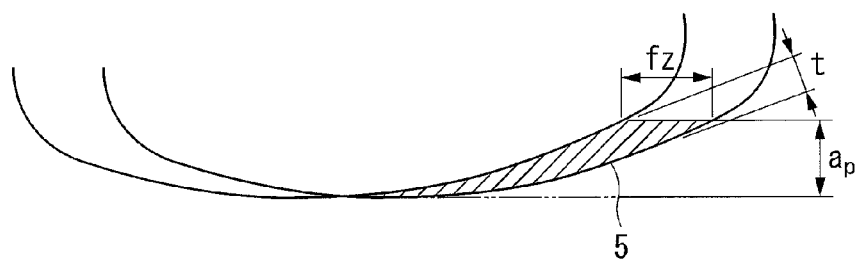
FIG. 11B is a view showing a cross-section of a chip created by an indexable end mill to which a related-art cutting insert is attached.
Figure 12:
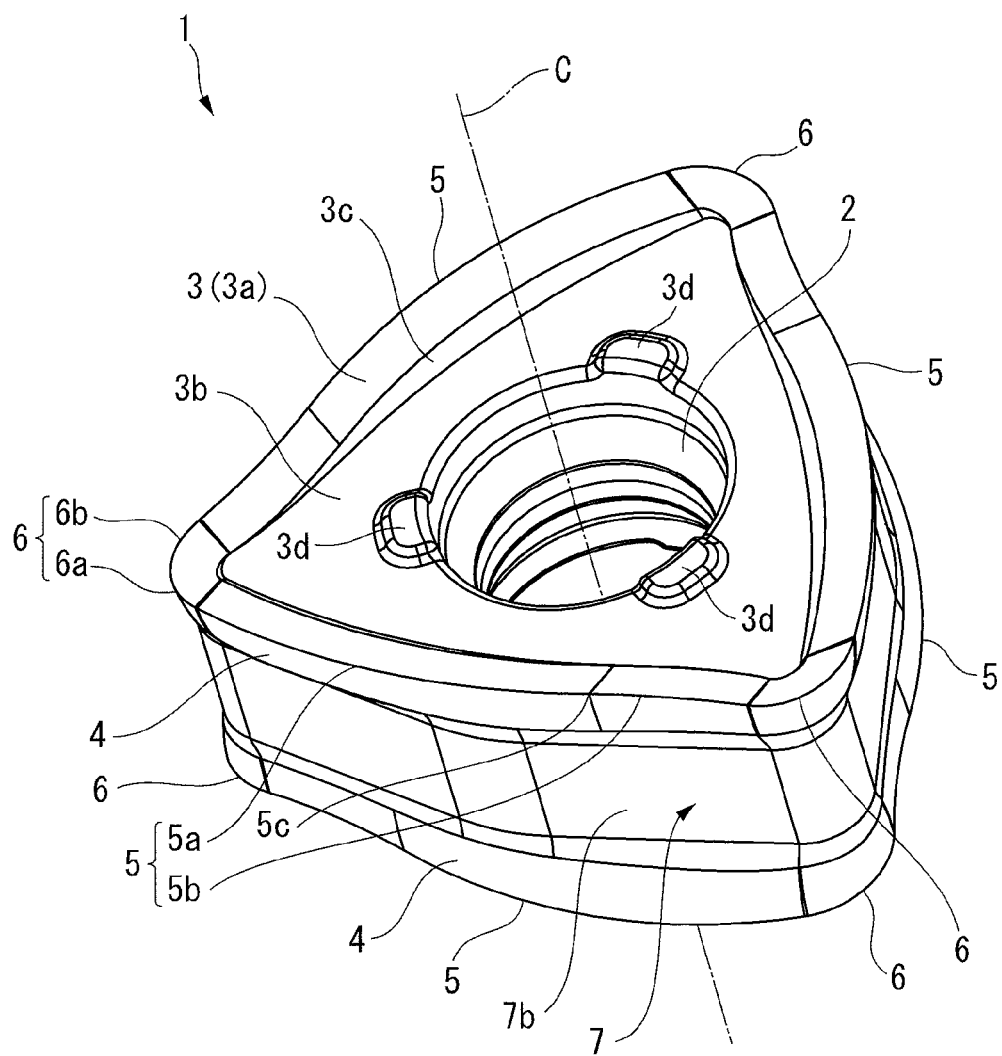
FIG. 12 is a perspective view showing a second embodiment of the cutting insert of the invention.
Figure 13:
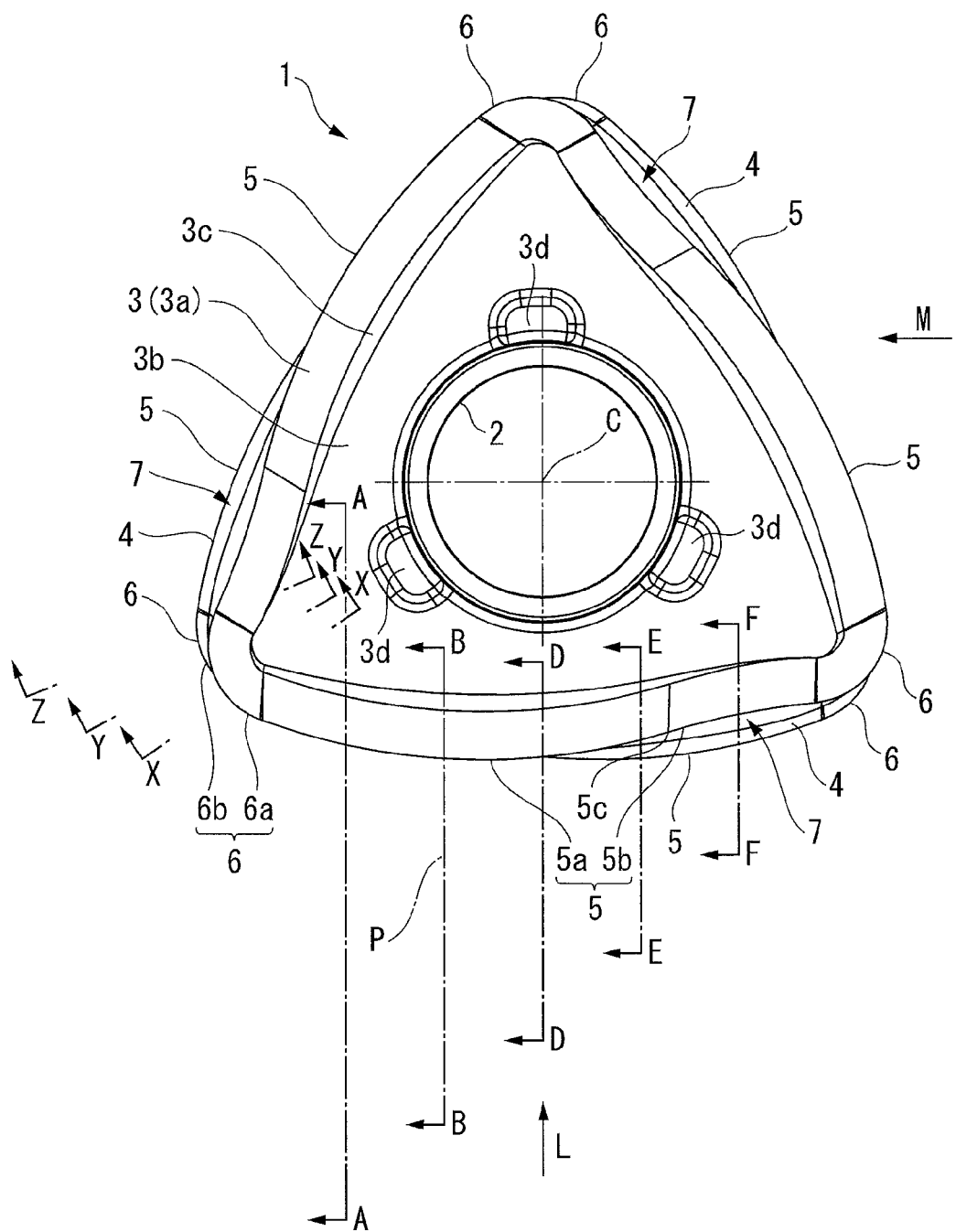
FIG. 13 is a plan view of the embodiment shown in FIG. 12.

A cross-section of a chip created by the main cutting edge 5 during such high-feed cutting is shown by hatching in FIG. 11A, and a cross-section of a chip created when the cutting edge angle of a main cutting edge becomes larger toward an outer peripheral side of an end mill body as a whole, for example, as in an indexable end mill to which the cutting insert described in Patent Citation 2 is attached is shown by hatching in FIG. 11B. Feed rate fz per one edge and cutting depth ap are made equal to each other. Among these, as shown in FIG. 11B, when the cutting edge angle of the main cutting edge 5 becomes gradually larger toward the outer peripheral side, the thickness of the chip also becomes larger toward the outer peripheral side and becomes a thickness t that is maximum at a cutting boundary of the outermost periphery. Therefore, there is a concern that the cutting insert may cause abnormal damage, such as chipping or breakage, at this cutting boundary, and for example, it is necessary to make the feed rate per one edge small.

Meanwhile, in contrast, when the cutting edge angle of the main cutting edge 5 becomes small on the outer peripheral side of the end mill body 11 as described above, as shown in FIG. 11A, the thickness of the chip becomes smaller after becoming larger toward the outer peripheral side, and becomes a thickness t that is maximum at a substantially central portion of an outer peripheral portion of the end mill body 11 from the projecting end of the main cutting edge 5, and this maximum thickness t itself becomes small. For this reason, according to the cutting insert and the indexable cutting tool (end mill) of the above configurations, a cutting load that acts on the main cutting edge 5 during high-feed cutting can be reduced, and a burden on the main cutting edge 5 particularly at the cutting boundary can be reduced. Meanwhile, the cutting edge strength of the main cutting edge 5 in the portion where the chip has the maximum thickness t as described above can be ensured. Accordingly, abnormal damage to the cutting boundary in the main cutting edge 5 can be reliably prevented, and it is possible to further increase the feed rate per one edge to achieve more efficient high-feed cutting.

Moreover, the insert body 1 has the front-and-back inverted symmetrical shape with respect to the imaginary straight lines, the rake faces 3 are formed on the front and back polygonal surfaces, the main cutting edges 5 are formed on the intersecting ridgelines between the rake faces 3 and the flank faces 4 formed on one lateral face, and the main cutting edges 5 have the inverted symmetrical shape with respect to the front and back polygonal surfaces. Thus, in the front and back polygonal surfaces with one lateral face arranged therebetween, the concavely curved other end portion 5b of the main cutting edge 5 on the other polygonal surface side is arranged opposite in a front and back relationship to the convexly curved one end portion 5a of the main cutting edge 5 on one polygonal surface side.

Accordingly, in the polygonal surface opposite to the polygonal surface on which the main cutting edge 5 to be used for cutting is located, the other end portion 5b recessed in a concavely curved shape out of the main cutting edge 5 directed to the tip side of the end mill body 11 is located opposite to the one end portion 5a of this main cutting edge 5 in the insert thickness direction. Thus, a sufficient clearance can be ensured. For this reason, it is unnecessary to set the axial rake angle of the main cutting edge 5 to be used for cutting to a value larger than needed to the negative angle side, and a reduction in cutting resistance and an improvement in chip discharge performance can be achieved by enhancing sharpness of the main cutting edge 5.

Moreover, in addition to the case where the end mill body 11 is fed in the direction orthogonal to the axis O to perform cutting as in the above-described high-feed cutting, even when the ramping of slightly feeding the end mill body 11 to the front end side in the direction of the axis O to drill down a workpiece is performed, the main cutting edge 5 to be used for cutting cuts the workpiece as a whole from one end portion 5a, whereas a large clearance is ensured on a side opposite to the one end portion 5a in a front and back relationship. Therefore, the interference between the insert body 1 and the workpiece can be prevented. Accordingly, the ramping amount and ramping angle during the ramping can be increased, and an improvement in machining efficiency can also be achieved.

Additionally, in the present embodiment, the curvature radius of the concavely curved other end portion 5b is made larger than the curvature radius of the convexly curved shape one end portion 5a out of the main cutting edge 5 having the concavo-convex curve shape in this way. Accordingly, as shown in FIG. 11A, the position where the chip has the maximum thickness t can be a position near a central portion where the one end portions 5a and the other end portion 5b are in contact with each other, in a portion on the outer peripheral side of the end mill body 11 from the projecting end of the main cutting edge 5. For this reason, compared to a case where the chip has the maximum thickness at the position near the portion of the one end portion 5a of the main cutting edge 5 and the other end portion 5b that stretches to the adjacent corner edge 6, it is easy to secure the strength of the main cutting edge 5 with respect to the chip having the maximum thickness t, and this can also prevent chipping or breakage.

Moreover, in the present embodiment, the convex curve formed by the one end portion 5a of the main cutting edge 5 and the concave curve formed by the other end portion 5b are in contact with each other at the contact point 5c, that is, the main cutting edge 5 has a continuous concavo-convex curve that does not has a straight portion or the like.

Accordingly, the fluctuation amount of the thickness of a chip at the inner and outer peripheries of the end mill body 11 also becomes continuous and smooth, and the burden on the main cutting edge 5 can be further reduced by avoiding concentration of cutting load on a specific portion of the main cutting edge 5. However, the convex curve formed by the one end portion 5a and the concave curve formed by the other end portion 5b may be made continuous with an intermediate portion via a tangential line. Additionally, since the convex curve formed by the one end portion 5a of the main cutting edge 5 is made longer than the concave curve formed by the other end portion 5b, during the above-described ramping, more efficient cutting can also be performed by more largely ensuring the ramping amount by the convexly curved one end portion 5a.

Moreover, during this ramping, the negative radial rake angle is given to the main cutting edge 5 at the one end portion 5a of the portion on the inner peripheral side of the end mill body 11 than the projecting end, with respect to the portion on the outer peripheral side of the end mill body 11 than the projecting end of the main cutting edge 5. It is thereby difficult to ensure the relief between the machining surface of a workpiece formed by the main cutting edge 5 and the flank face 4, and there is a concern that interference such that the flank face 4 abrades the machining surface may be caused and wear of the flank face 4 may be promoted or the cutting resistance may be increased. However, in the cutting insert of the above configuration, since the clearance angle β5 of the main cutting edge 5 is made larger on the positive angle side at the one end portion 5a than at the other end portion 5b, such interference can be avoided.

For this reason, even if the axial rake angle of the main cutting edge 5 to be also used for cutting is not made larger on the negative angle side more than needed, increases in wear or the like and cutting resistance caused by the abrasion of the flank face 4 can be prevented. Therefore, a chip created by the main cutting edge 5 can be smoothly discharged and disposed, the cutting resistance can be reduced by enhancing the sharpness of the main cutting edge 5, and more efficient ramping can be achieved. Particularly, in the present embodiment, the positive rake face 3a is formed on the rake face 3 that stretches to the main cutting edge 5, further improvement in sharpness can be achieved.

Additionally, by making the clearance angle β5 larger on the positive angle side at the one end portion 5a of the main cutting edge 5 in this way, even when a workpiece is largely cut even at the portion located further toward the inner peripheral side of the end mill body 11 than the projecting end of the main cutting edge 5 when the feed rate per one edge is made larger as described above in the high-feed cutting, it is possible to prevent the interference between the workpiece and the flank face 4. Meanwhile, since the clearance angle β5 becomes relatively larger on the negative angle side at the other end portion 5b located at the main cutting edge 5 on the outer peripheral side of the end mill body 11 and the wedge angle of the main cutting edge 5 also becomes large, abnormal damage of the main cutting edge 5 at the cutting boundary can be more reliably prevented.

Moreover, in the present embodiment, the clearance angle β5 of the main cutting edge 5 changes continuously on the other end portion 5b side of the one end portion 5a so as to be gradually larger on the positive angle side as moving away from the other end portion 5b. That is, since the clearance angle β5 becomes gradually larger on the positive angle side as moving away from contact point 5c at the portion of the one end portion 5a adjacent to the contact point 5c, a step or the like is not created in the flank face 4 unlike when the clearance angle β5 changes discontinuously, and stable cutting can be performed by preventing breakage from such a step or the like.

Moreover, in the present embodiment, the clearance angle β5 of the main cutting edge 5 is made constant on the side of the one end portion 5a opposite to the other end portion 5b, that is, on the corner edge 6 side (one corner side) of the one end portion 5a that stretches to the one end portion 5a. As a result, it is possible to prevent a situation in which, the clearance angle β5 becomes smaller more than needed, the wedge angle of the main cutting edge 5 becomes small, and the cutting edge strength is impaired, and thereby breakage or chipping is likely to occur. Additionally, in the present embodiment, since the clearance angle β5 is made constant also at the other end portion 5b of the main cutting edge 5 and does not become excessively larger on the negative angle side, the flank face 4 at this other end portion 5b can be prevented from interfering with a workpiece.

It is desirable that the clearance angle β5 at the one end portion 5a of the main cutting edge 5 be a positive angle of 20° or less as in the present embodiment. If this clearance angle is larger on the positive angle side than this value, the wedge angle of the main cutting edge 5 at the one end portion 5a becomes small as described above, and damage, such as breakage or chipping, is likely to occur. Additionally, it is desirable that the clearance angle β5 of the main cutting edge 5 at the other end portion 5b be also 0° or more as in the present embodiment. If the clearance angle is larger on the negative angle side than this value, there is a concern that the flank face 4 of the main cutting edge 5 may interfere with a workpiece at the other end portion 5b particularly during ramping, and therefore, the axial rake angle should be made large.

However, if the clearance angle β5 is desirably within these ranges, the clearance angle may be made gradually larger on the positive angle side as moving away from the other end portion 5b at the whole one end portion 5a of the main cutting edge 5, or may be made gradually larger on the negative angle side as moving away from the one end portion 5a at the whole other end portion 5b.

Moreover, in the present embodiment, the corner edge 6 that has the convexly curved shape when seen from the direction opposing the rake face 3 and stretches to one end portion 5a of the main cutting edge 5 is formed on the corner of the polygonal surface serving as the rake face 3 of the insert body 1, and the clearance angle β6 of the corner edge 6 is made larger on the negative angle side as moving closer to the other end portion 6b of the corner edge 6 opposite to the one end portion 6a from the one end portion 6a of the corner edge 6 that stretches to one end portion 5a of the main cutting edge 5. For this reason, at the one end portion 6a of the corner edge 6, interference with a workpiece can be prevented similar to the one end portion 5a of the main cutting edge 5, and at the other end portion 6b of the corner edge 6 that stretches to the other end portion 5b of the main cutting edge 5 adjacent via the corner edge 6, it is possible to increase the wedge angle to prevent breakage or the like.

Particularly, in the present embodiment, the clearance angles β5 and β6 are made equal to each other in the respective contact points including the contact point between the one end portion 5a of the main cutting edge 5 and the one end portion 6a of the corner edge 6, and the contact point between the other end portion 5b of the main cutting edge 5 and the other end portion 6b of other corner edges 6, and the flank face has the concavo-convex curved surface that is smoothly continuous over the whole circumference of the insert body 1 as described above. For this reason, a step can also be prevented from being created in the flank face 4 as in a case where the clearance angle β5 and the clearance angle β6 change discontinuously at these contact points, and occurrence of breakage from such a step or the like can be prevented.

Meanwhile, in the cutting insert of the first embodiment, the insert body 1 has the equilateral triangular plate shape, the main cutting edges 5 are formed on the respective side ridges of the front and back polygonal surfaces having the equilateral triangular shape. However, the front and back polygonal surfaces are arranged so as to be slightly twisted around the insert centerline C passing through the center thereof, and the insert body 1 has the front-and-back inverted symmetrical shape with respect to the front and back polygonal surfaces.

Such a cutting insert is attached to the insert mounting seat 16 of the end mill body 11 so that a side ridge is inclined so as to give a relatively small cutting edge angle to the main cutting edge 5 to be used for cutting and so that a negative axial rake angle and a negative radial rake angle are given to the main cutting edge 5. Accordingly, the rake face 3 of the other polygonal surface opposite to the one polygonal surface on which the main cutting edge 5 is formed can be located on the rear end side in the direction of the axis O of the end mill body 11 with respect to the main cutting edge 5 to be used for cutting and located further toward the inner peripheral side than the rotation track of the other corner edge 6 that stretches to the main cutting edge 5 on the outer peripheral side of the end mill body 11.

Accordingly, when the main cutting edge 5 formed on the side ridge of the rake face 3 of one polygonal surface directed to the end mill rotational direction T is used for cutting, the main cutting edge 5 or the corner edge 6 of the other polygonal surface does not interfere with a workpiece. After the insert body 1 is rotated by every 120° around the insert centerline C and is attached again to the insert mounting seat 16, and the main cutting edge 5 and the corner edge 6 formed on each of the three side ridges and the three corners of the one polygonal surface is used for cutting, the front and back of the insert body 1 is inverted and the insert body is attached again to the insert mounting seat 16. Accordingly, the rake face 3 serving as the other polygonal surface can be directed to the end mill rotational direction T, and the main cutting edge 5 and the corner edge 6 thereof can be used for cutting. For this reason, when the insert body 1 has the equilateral triangular plate shape as described above, a total of six main cutting edges 5 and a total of six corner edges 6 formed on one insert body 1 can be used, which is more efficient and economical.

Particularly as the insert body 1 has the equilateral triangular plate shape in this way, according to the present embodiment, when performing ramping while one main cutting edge 5 is directed toward the tip side of the end mill body 11, it is possible to prevent the other main cutting edges 5 interfering with a workpiece even if the ramping amount is relatively large, and the six main cutting edges 5 can be more reliably used.

It is noted that, in the present embodiment, the insert body 1 has the equilateral triangular plate shape in this way. However, it is also possible to apply the configuration of the present embodiment to a cutting insert having another regular polygonal plate shaped insert body, for example, a cutting insert having a square plate shaped insert body and a cutting insert having an polygonal plate shaped insert body other than the regular polygonal plate shaped insert body, as in the third and fourth embodiments to be described below. For example, when the invention is applied to a cutting insert having a square plate shaped or oblong plate shaped insert body, in order to prevent the above-described interference, the main cutting edges 5 may be formed only at a pair of opposite sides of a square surface or an oblong surface, though the available number of cutting edges decreases.

In the present embodiment, as described above, a case where the invention is applied to the right-handed cutting insert having the right-handed edges rotated in the counter-clockwise direction when the indexable end mill is seen from the front side has been described. When the invention is applied to a left-handed cutting insert having left-handed edges rotated in the clockwise direction when seen from the front side, the shape of the insert body is a mirror symmetrical shape with respect to the insert body 1 of the embodiment. However, in any case, the one end portion 5a of the main cutting edge 5 to be used for cutting is arranged on the inner peripheral side of the tip of the end mill body 11, the other end portion 5b is arranged on the outer peripheral side, the one end portion 5a of the main cutting edge 5 has the convexly curved shape, and the other end portion 5b has the concavely curved shape.

Next, FIGS. 12 to 17C show a second embodiment of the cutting insert of the invention, and FIGS. 18 to 23 show an indexable end mill as a second embodiment of the indexable cutting tool of the invention to which the cutting insert of the second embodiment is attached. The portions which are common to those of the cutting insert and indexable end mill of the first embodiment shown in FIGS. 1 to 10C will be designated by the same reference numerals, and the description thereof will be simplified. Also in the present embodiment, the insert body 1 has the equilateral triangular plate shape that is a rotational symmetrical shape by every 120° around the insert centerline C, and has the front-and-back inverted symmetrical shape with respect to the imaginary straight lines perpendicular to the insert centerline C and pass through the centers of the three lateral faces, the one end portion 5a of the main cutting edge 5 has the convexly curved shape, and the other end portion 5b has the concavely curved shape. The configuration of the concavo-convex curve formed by the main cutting edge 5 and the configuration of the clearance angles β5 and β6 of the main cutting edge 5 and the corner edge 6 are also the same as those of the first embodiment.

Figure 23:
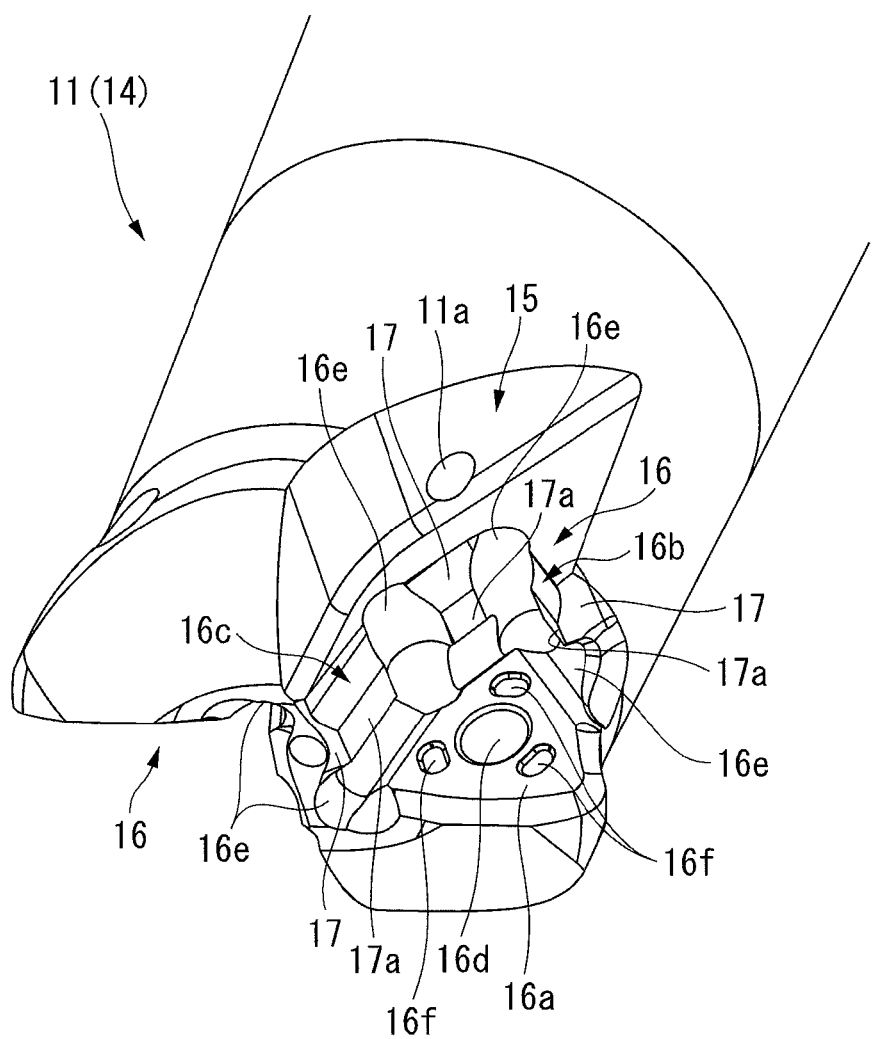
FIG. 23 is an enlarged perspective view of the end mill body tip in a state where the cutting insert is detached, in the indexable end mill shown in FIG. 18.
Figure 24:
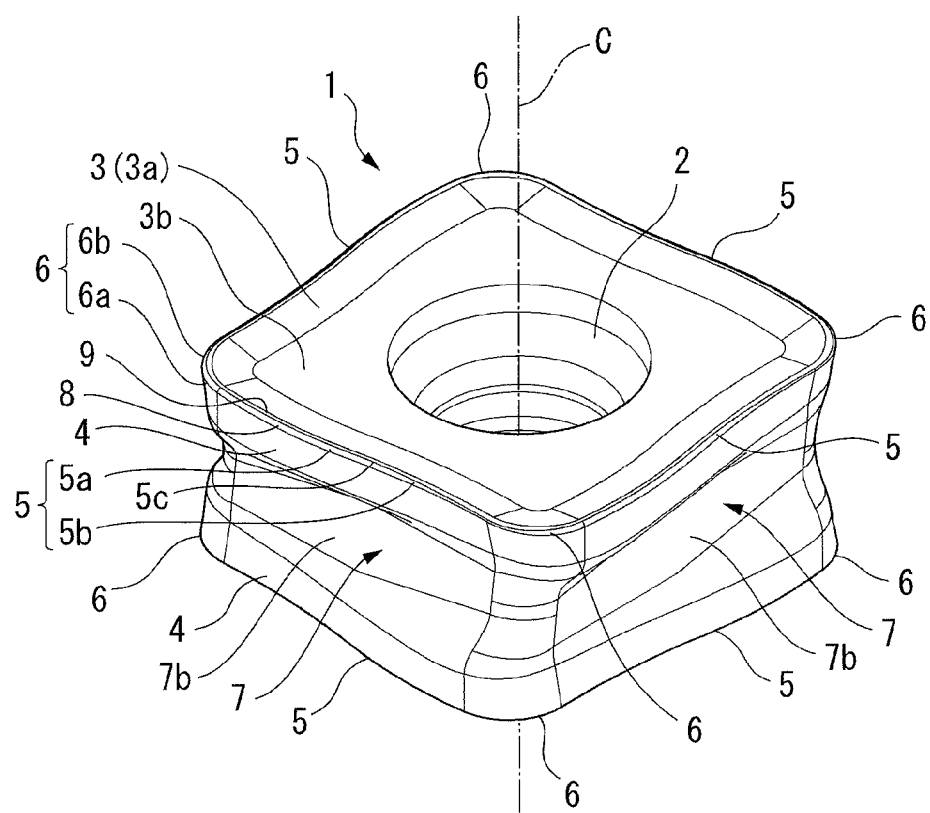
FIG. 24 is a perspective view showing a third embodiment of the cutting insert of the invention.

In the cutting insert of the second embodiment, the recess 7 in the lateral face of the insert body 1 are not formed by the pair of inclined surfaces 7a having the concave V-shaped cross-section unlike the first embodiment, but the bottom surface 7b of the recess 7 that faces the outer peripheral side of the insert body 1 has an eccentric hexagonal shape similar to the first embodiment in the cross-section orthogonal to the insert centerline C, and six surfaces that stretch to the respective sides of the eccentric hexagonal shape have a planar shape parallel to the insert centerline C, and are perpendicular to the binding faces 3b of the pair of polygonal surfaces. In accordance with this, the projecting end surfaces 17a of the projecting strip portions 17 formed on the wall surfaces 16b and 16c of the insert mounting seat 16 in the end mill body 11 of the indexable end mill of the second embodiment also have a planar shape that is perpendicular to the bottom surface 16a as shown in FIG. 23.

Additionally, in the present embodiment, when the insert body 1 is attached to the insert mounting seat 16, the positive rake face 3a of the rake face 3 that stretches to the main cutting edge 5 has a constant axial rake angle over the total length of the main cutting edge 5 to be used for cutting. That is, as shown in FIGS. 13, 16A to 16E, and 19, the inclination angle of the positive rake face 3a with respect to the plane perpendicular to the insert centerline C becomes constant in cross-sections formed by a plane P that passes through the projecting end of the convexly curved one end portion 5a of the main cutting edge 5, is parallel to the axis O of the end mill body 11, and includes the insert centerline C, when seen in the direction of the insert centerline C, and respective planes parallel to the plane P. This inclination angle is 15° in the present embodiment, and when the cutting insert is attached to the insert mounting seat 16 of the end mill body 11, the axial rake angle becomes 5°.

Accordingly, the positive rake face 3a is located on one plane that inclines toward the opposite polygonal surface at the above constant inclination angle as moving closer to the inner side of the polygonal surface on which the rake face 3 is formed, from the main cutting edge 5, with respect to one main cutting edge 5. A step surface 3c, which faces the opposite polygonal surface as moving closer to the inner side of the polygonal surface at a steeper slope than the positive rake face 3a, is formed between the positive rake face 3a and the binding face 3b.

Figure 14:
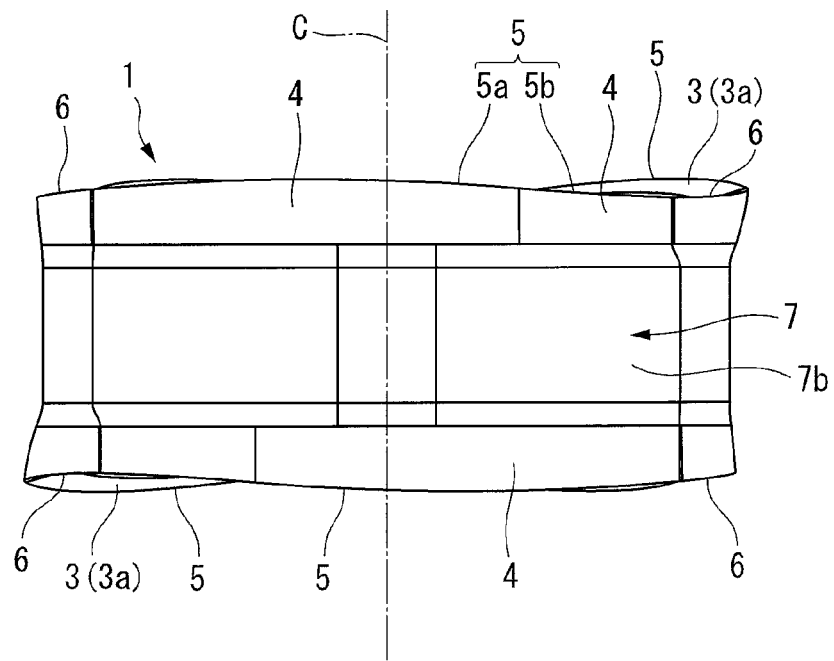
FIG. 14 is a side view as seen in a direction of arrow L in FIG. 13.
Figure 15:
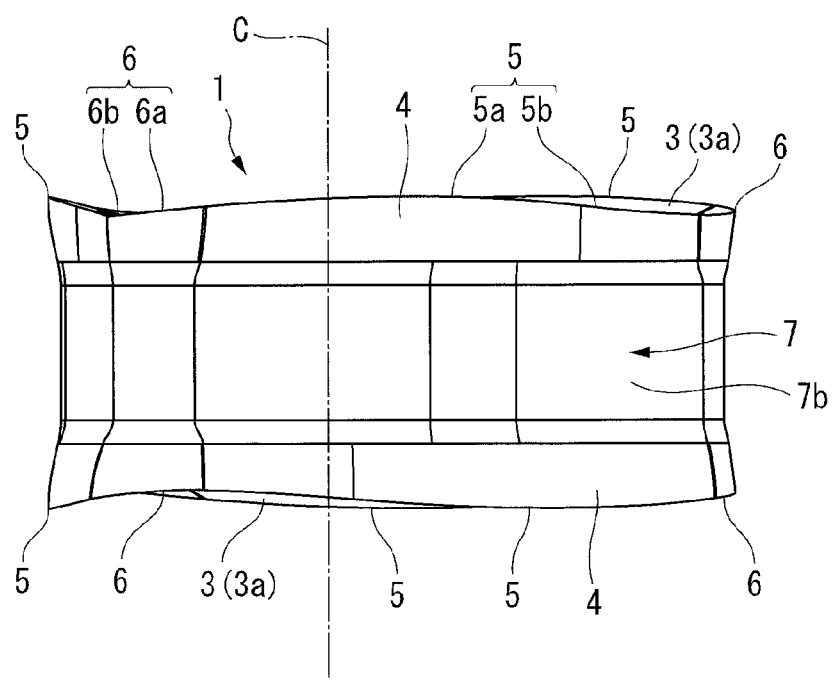
FIG. 15 is a side view as seen in a direction of arrow M in FIG. 13.
Figure 16A:
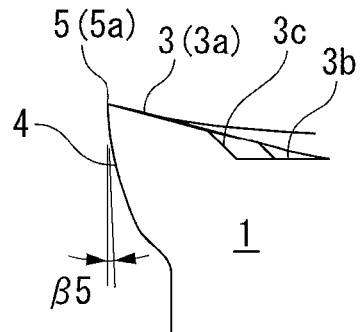
FIG. 16A is an enlarged cross-sectional view along line AA in FIG. 13.
Figure 16B:
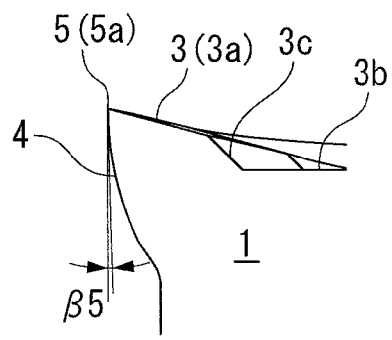
FIG. 16B is an enlarged cross-sectional view along line BB in FIG. 13.
Figure 16C:
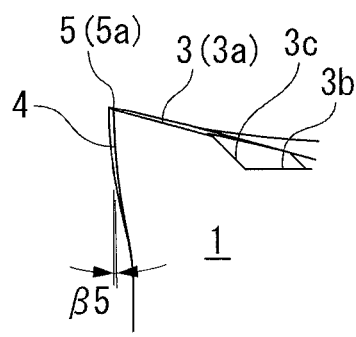
FIG. 16C is an enlarged cross-sectional view along line DD in FIG. 13.
Figure 16D:
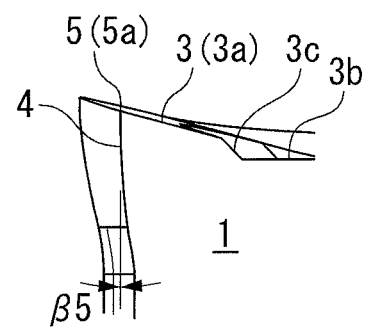
FIG. 16D is an enlarged cross-sectional view along line EE in FIG. 13.
Figure 16E:
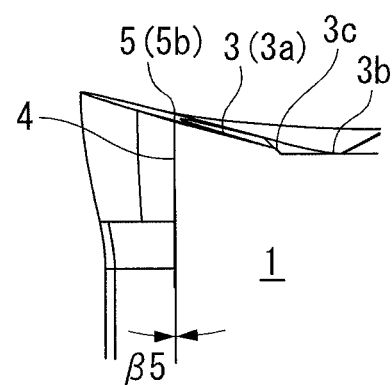
FIG. 16E is an enlarged cross-sectional view along line FF in FIG. 13.
Figure 17A:
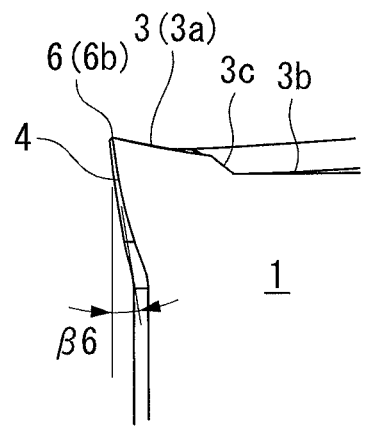
FIG. 17A is an enlarged cross-sectional view along line XX in FIG. 13.
Figure 17B:
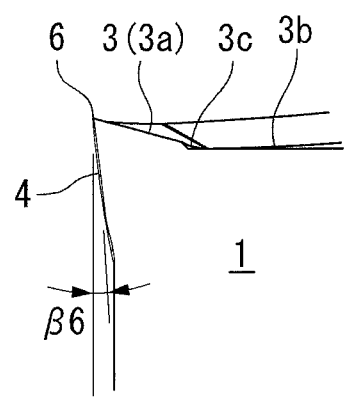
FIG. 17B is an enlarged cross-sectional view along line YY in FIG. 13.
Figure 17C:
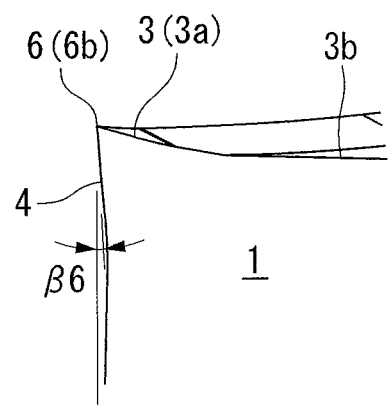
FIG. 17C is an enlarged cross-sectional view along line ZZ in FIG. 13.
Figure 18:
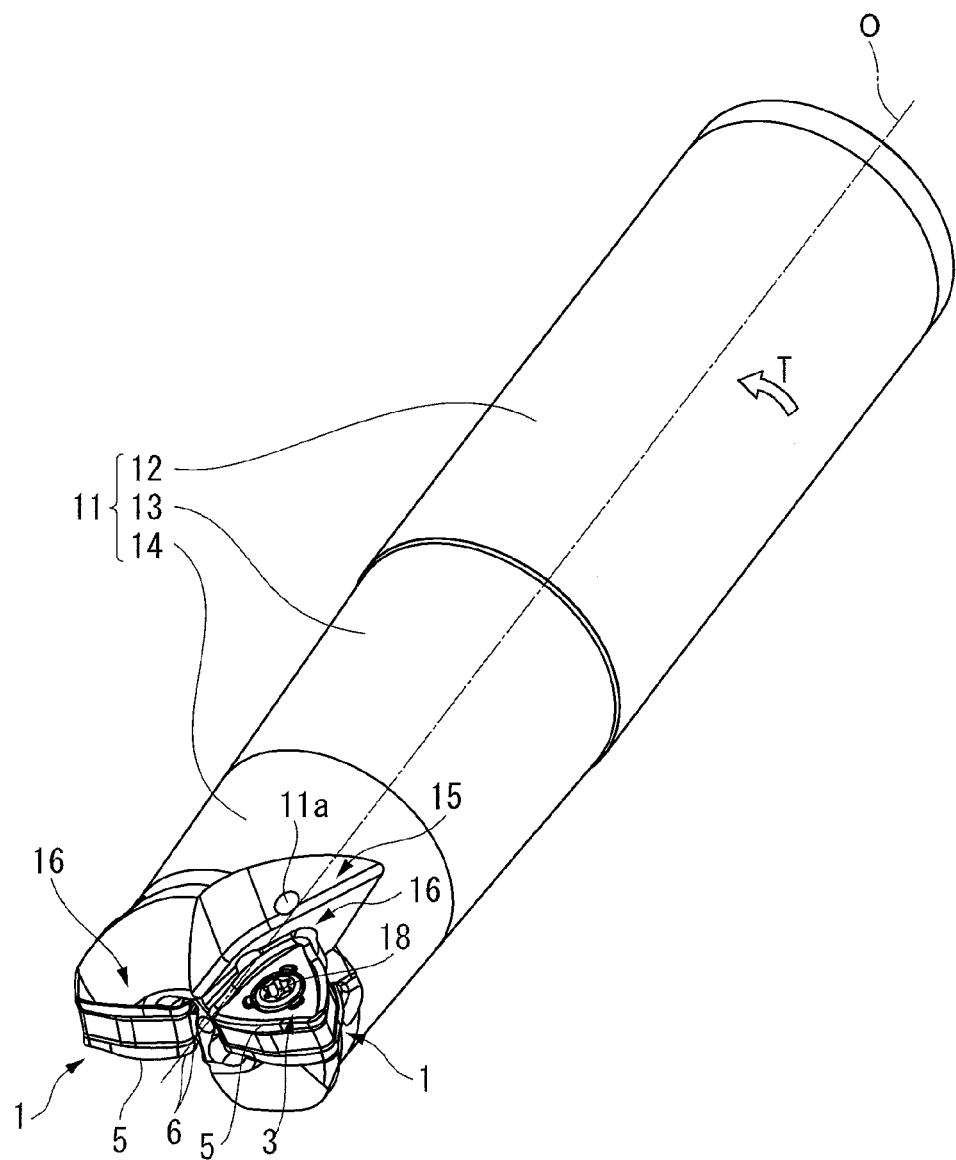
FIG. 18 is a perspective view of an indexable end mill as a second embodiment of the indexable cutting tool of the invention to which the cutting insert of the embodiment shown in FIG. 12 is attached.
Figure 19:
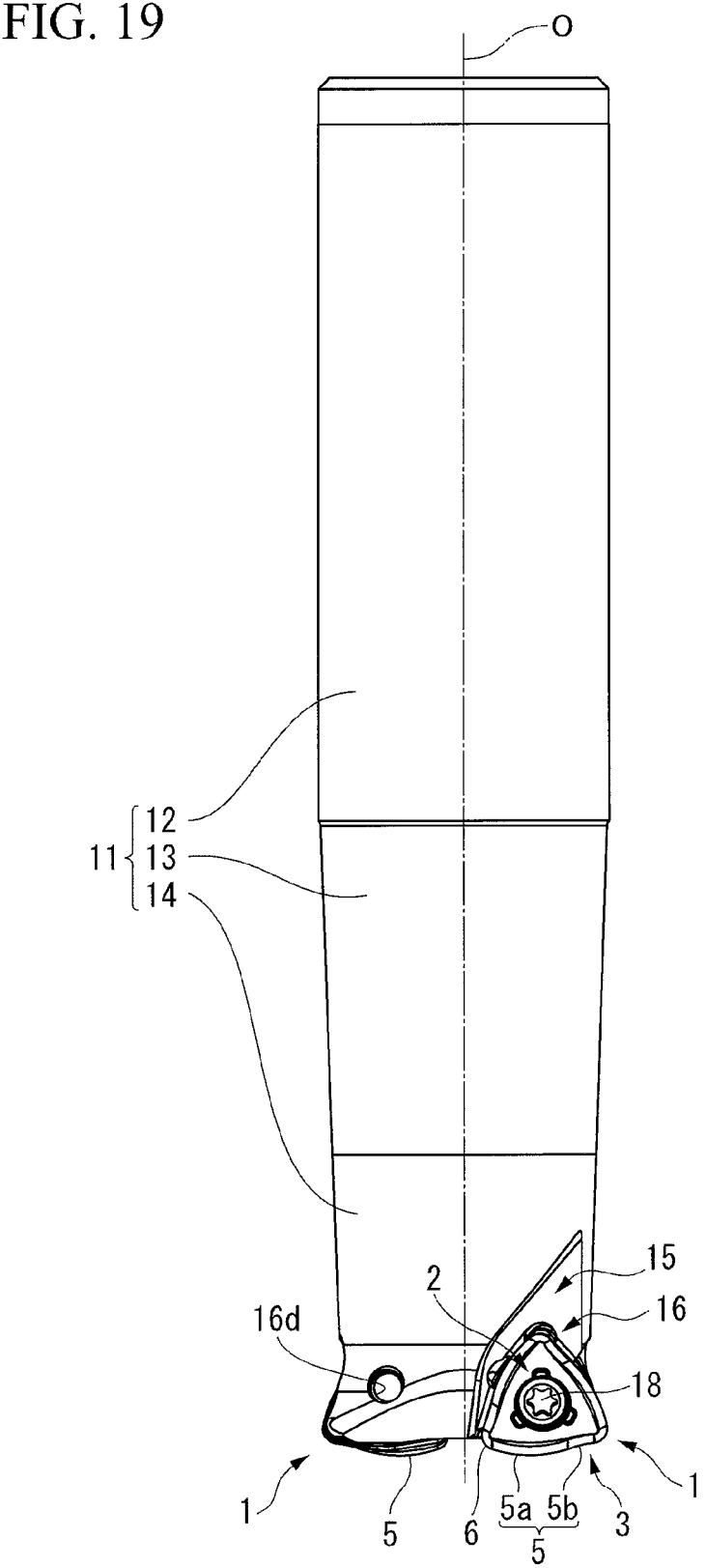
FIG. 19 is a plan view of the indexable end mill shown in FIG. 18.
Figure 20:
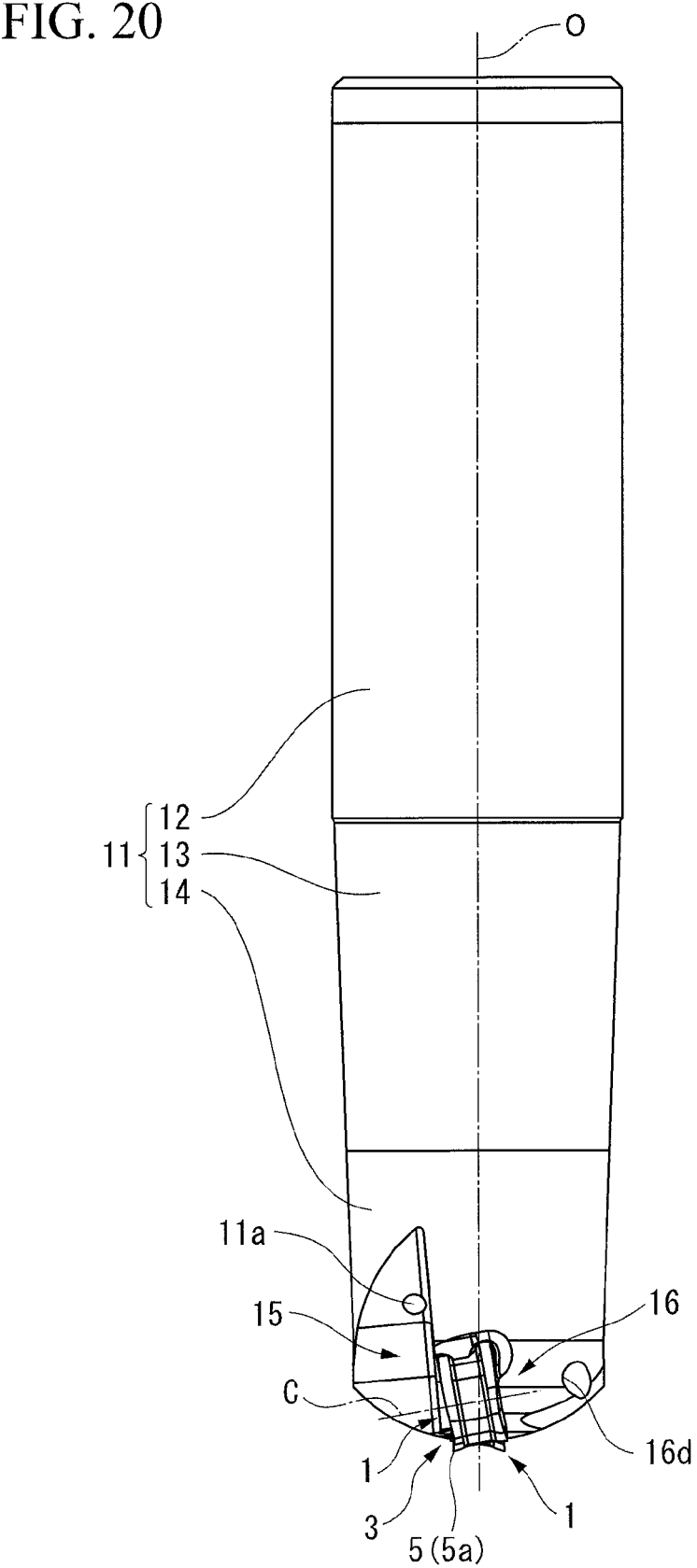
FIG. 20 is a side view of the indexable end mill shown in FIG. 18.
Figure 21:
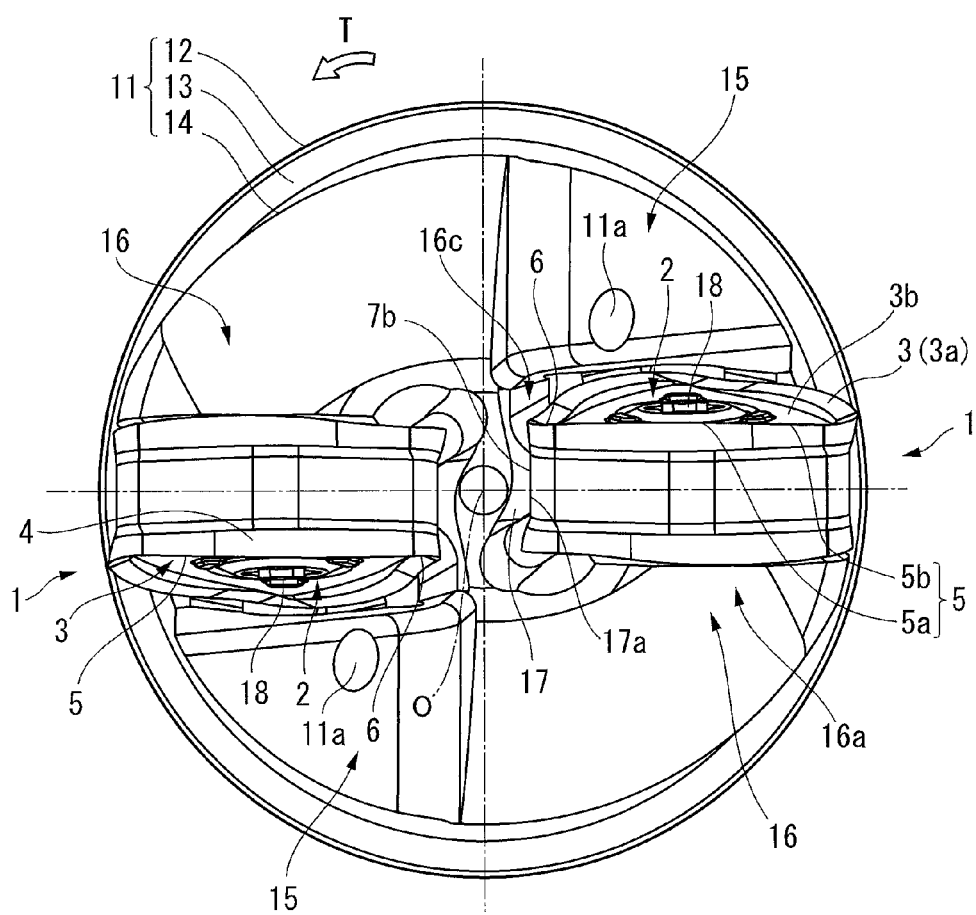
FIG. 21 is an enlarged front view of the indexable end mill shown in FIG. 18.
Figure 22:
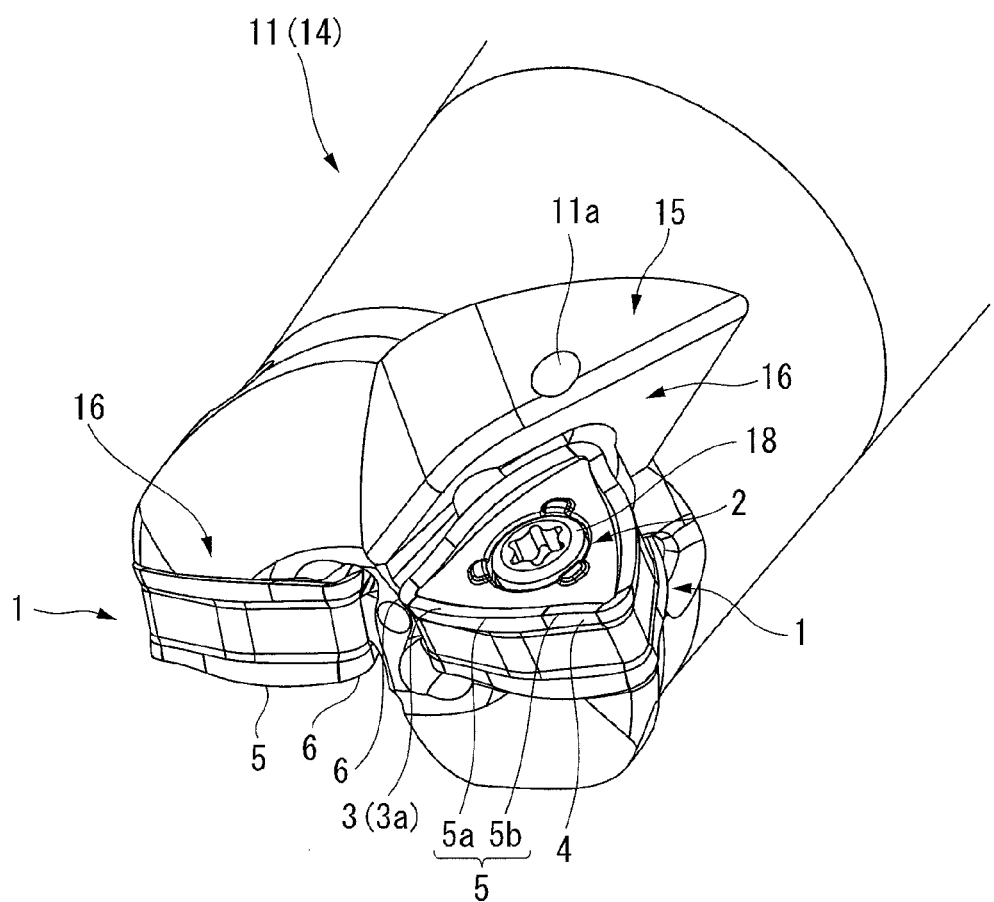
FIG. 22 is an enlarged perspective view of an end mill body tip of the indexable end mill shown in FIG. 18.

Additionally, the positive rake face 3a of the main cutting edge 5 has the planar shape in this way, and the main cutting edge 5 is formed in the shape of a concavo-convex curved surface when seen from a direction opposing the rake face 3 along the direction of the insert centerline C. Accordingly, as for the main cutting edge 5, even in a side view as seen from the direction perpendicular to the insert centerline C as shown in FIGS. 14 and 15, the convexly curved one end portion 5a has a convexly curved shape that becomes convex in the insert thickness direction in which the projecting end when seen in the direction of the insert centerline C protrudes most, and the concavely curved other end portion 5b has a concavely curved shape that is recessed so as to recede in the insert thickness direction gradually as moving away from the one end portion 5a.

In the positive rake face 3a that stretches to the corner edge 6, an inclination angle with respect to the plane perpendicular to the insert centerline C is made constant in a cross-section parallel to the insert centerline C running along a normal line of the corner edge 6 when seen along the direction of the insert centerline C, and this inclination angle is also 15° equal to the inclination angle of the positive rake face 3a that stretches to the main cutting edge 5. Accordingly, the positive rake face 3a of the corner edge 6 has a fan shape when seen in the direction of the insert centerline C and is formed in the shape of a concave truncated cone surface that is concave curved along the corner edge 6, and the positive rake face 3a of the main cutting edge 5 adjacent via the corner edge 6 continues smoothly via the positive rake face 3a of the corner edge 6.

Additionally, in the present embodiment, projections 3d are formed around the opening of the attachment hole 2 in the binding faces 3b of the front and back polygonal surfaces. The projections 3d have a substantially oblong shape when seen in the direction of the insert centerline C, and are formed on straight lines connecting the insert centerline C and the corner edges 6 in each binding face 3b. Three projections 3d are formed on equal intervals in the circumferential direction on one binding face 3b, and the projecting end surfaces, in the direction of the insert centerline C, of the three projections 3d in the one binding face 3b are located on one plane perpendicular to the insert centerline C. In accordance of the formation of such projections 3d, in the end mill body 11 of the indexable end mill of the second embodiment, as shown in FIG. 23, recesses 16f are formed on equal intervals in the circumferential direction around the screw hole 16d in the bottom surface 16a of the insert mounting seat 16.

Also in such a cutting insert and the indexable cutting tool of the second embodiment, the one end portion 5a of the main cutting edge 5 serves as the convexly curved cutting edge having the convexly curved shape and the other end portion 5b serves as the concavely curved cutting edge having the concavely curved shape. Thus, machining can be performed at a higher feed rate with the same effects as the first embodiment. Additionally, the main cutting edges 5 are formed on both the front and back polygonal surface sides of one lateral face of the insert body 1, the insert body 1 has a 180° rotational symmetrical shape with respect to an imaginary straight line passing through the center of the lateral face, that is, the main cutting edges 5 have an inverted symmetrical shape with respect to the front and back polygonal surfaces. Thus, a reduction in cutting resistance and an improvement in chip discharge performance can be achieved, and an improvement in machining efficiency during ramping can also be achieved.

Additionally, in the cutting insert of the second embodiment, the positive rake face 3a that stretches to the main cutting edge 5 is formed so as to be located on one plane. Thus, even if the main cutting edge 5 has the concavo-convex curve as described above when seen from the direction opposing the rake face 3, a chip can be smoothly created and discharged. That is, when the main cutting edge 5 has the concavo-convex curve in this way, for example, if the inclination angle directed to the direction of the normal line of the main cutting edge 5 becomes constant as in the positive rake face 3a that stretches to the corner edge 6 of the present embodiment, a chip is created so as to be compressed in the width direction at the convexly curved one end portion 5a and so as to be elongated at the concavely curved other end portion 5b. Therefore, there is a concern that the load when a chip is created may be large, and an increase in cutting resistance or wear caused by excessive cutting heat may occur. However, by forming the positive rake face 3a of the main cutting edge 5 on one plane as in the present embodiment, a chip creation direction can be made constant along one plane to achieve smooth chip creation, and a reduction in cutting resistance and an improvement in insert service life can be achieved.

Moreover, in the present embodiment, the step surface 3c, which inclines so as to face the opposite polygonal surface as moving closer to the inner side of the polygonal surface at a steeper slope than the positive rake face 3a, is formed between the positive rake face 3a and the binding face 3b. Therefore, separation of a chip from the positive rake face 3a is excellent, and a further reduction in cutting resistance can be achieved.

FIG. 24 to FIGS. 28A to 28C show a third embodiment of the cutting insert of the invention, and FIG. 29 to FIGS. 33A to 33B show a third embodiment of the indexable end mill that is the indexable cutting tool of the invention to which the cutting insert of this embodiment is attached. The portions, which are common to those of the first and second embodiments will also be designated by the same reference numerals. In the cutting insert of the present embodiment, the insert body 1 has a polygonal plate shape, specifically, a regular polygonal plate shape, but is formed in a square plate shape unlike the first and second embodiments, the attachment hole 2 penetrating in the thickness direction of the insert body 1 is open to the center of a pair of front and back square shaped polygonal surfaces of the insert body 1, and a straight line extending in the insert thickness direction through the center (the center of the front and back polygonal surfaces) of the attachment hole 2 serves as the insert centerline C.

Figure 25:
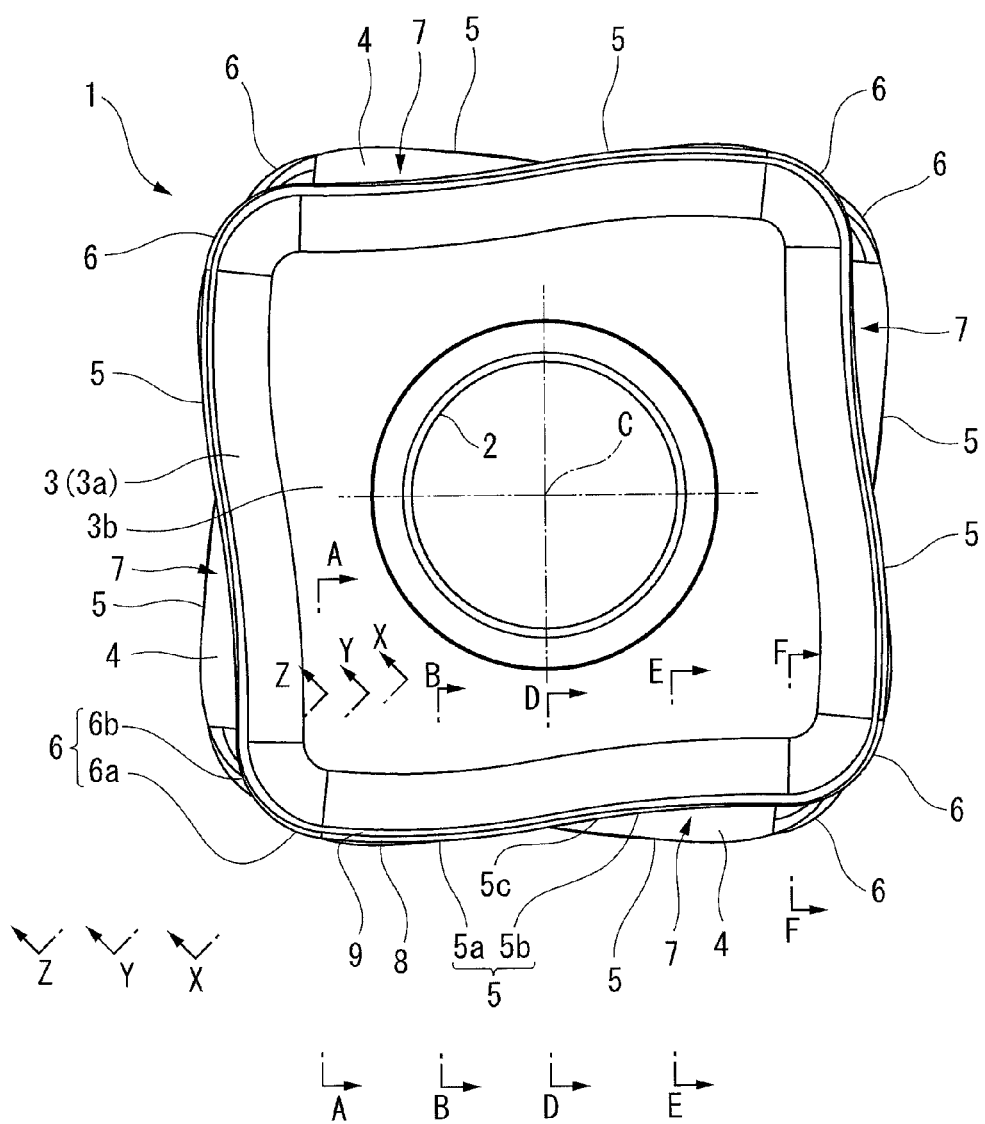
FIG. 25 is a plan view of the embodiment shown in FIG. 24.
Figure 26:
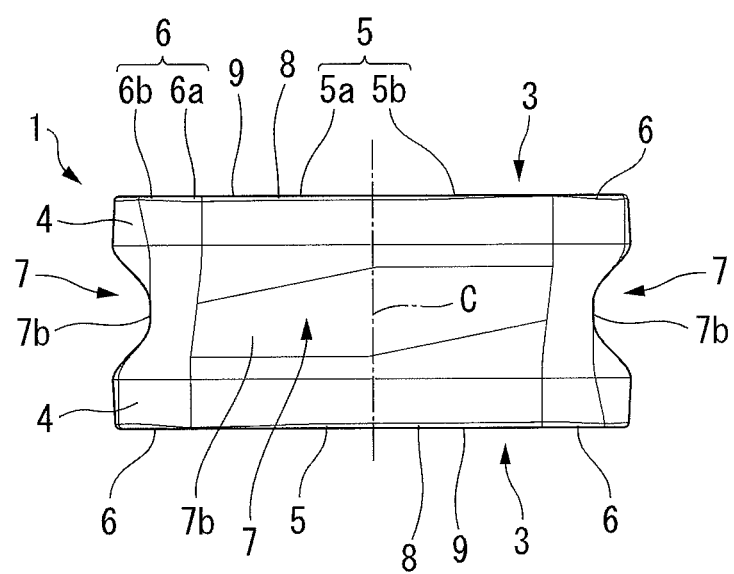
FIG. 26 is a side view of the embodiment shown in FIG. 24.
Figure 27A:
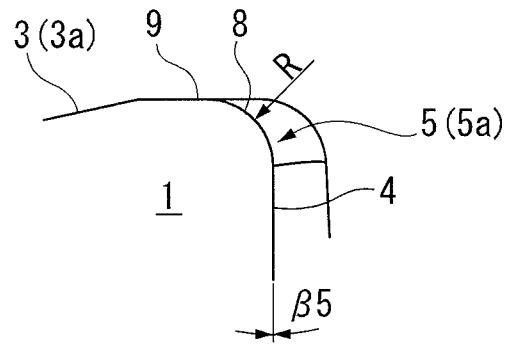
FIG. 27A is an enlarged cross-sectional view along line AA in FIG. 25.
Figure 27B:
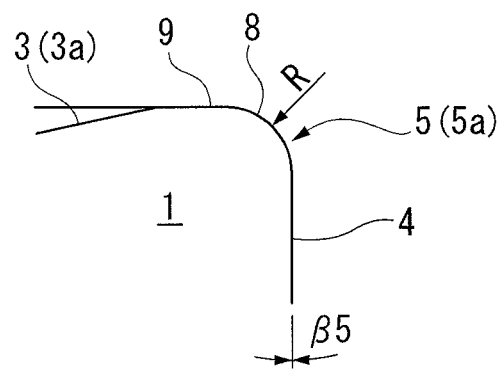
FIG. 27B is an enlarged cross-sectional view along line BB in FIG. 25.
Figure 27C:
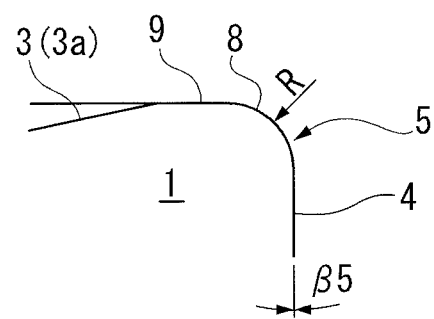
FIG. 27C is an enlarged cross-sectional view along line DD in FIG. 25.
Figure 27D:
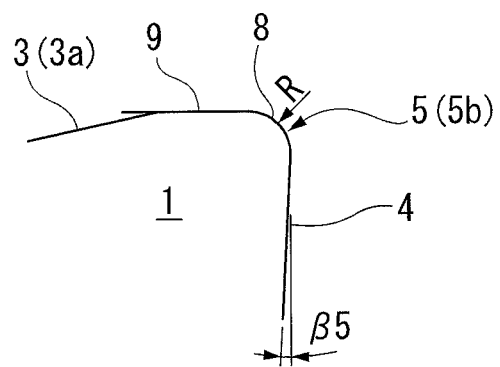
FIG. 27D is an enlarged cross-sectional view along line EE in FIG. 25.
Figure 27E:
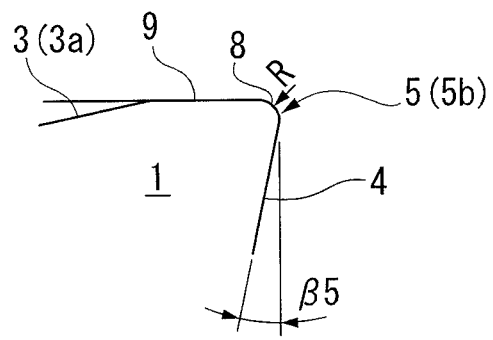
FIG. 27E is an enlarged cross-sectional view along line FF in FIG. 25.

Also in the present embodiment, the one end portion 5a of the main cutting edge 5 serves as the convexly curved cutting edge having the convexly curved shape and the other end portion 5b serves as the concavely curved cutting edge having the concavely curved shape. The configuration of the concavo-convex curve formed by the main cutting edge 5 is the same as that of the first and second embodiments. Additionally, the front and back square shaped surfaces of the insert body 1, as shown in FIG. 25, are arranged so as to be slightly twisted around the insert centerline C. However, the insert body 1 of the present embodiment having the square plate shape has a rotational symmetrical shape at every 90° around the insert centerline C, and has a front-and-back inverted symmetrical shape with respect to bisectors of diagonal lines of the front and back square surfaces that pass through the center in the thickness direction of the insert body 1 perpendicularly to the insert centerline C and is twisted when seen in the direction of the insert centerline C, and the imaginary straight lines passing through the centers of the lateral faces of the insert body 1 arranged around the front and back square surfaces.

The corner edge 6 has a convexly curved shape, such as a ¼ circular arc, when seen from the direction opposing the rake face 3 in the direction of the insert centerline C, and the corner edge 6 and the main cutting edge 5 are located on one plane perpendicular to the insert centerline C. Specifically, in the present embodiment, a land 9 (flat land) with a small width is formed over the whole circumference of the polygonal surface along the main cutting edge 5 and the corner edge 6, at an outer peripheral edge of the positive rake face 3a and the land 9 is located on the plane perpendicular to the insert centerline C. Additionally, the recess 7 of the four lateral faces of the insert body 1 has a square shape in which the bottom surface 7b has a planar shape that extends parallel to the insert centerline C, and the bisectors of the diagonal lines of the front and back quadrangular surfaces are diagonal lines in the cross-section orthogonal to the insert centerline C.

Figure 28A:
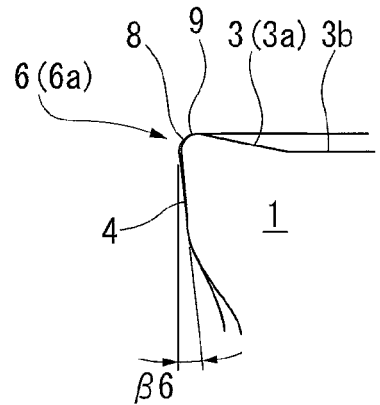
FIG. 28A is an enlarged cross-sectional view along line XX in FIG. 25.
Figure 28B:
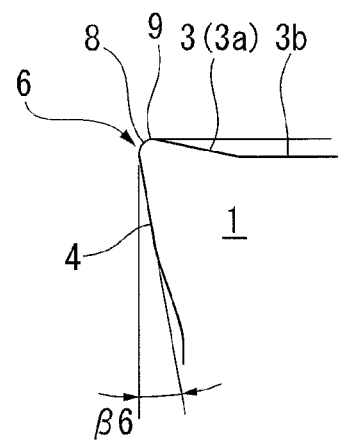
FIG. 28B is an enlarged cross-sectional view along line YY in FIG. 25.
Figure 28C:
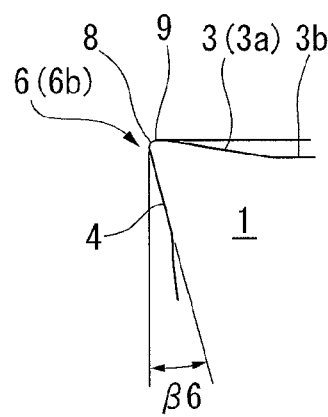
FIG. 28C is an enlarged cross-sectional view along line ZZ in FIG. 25.
Figure 29:
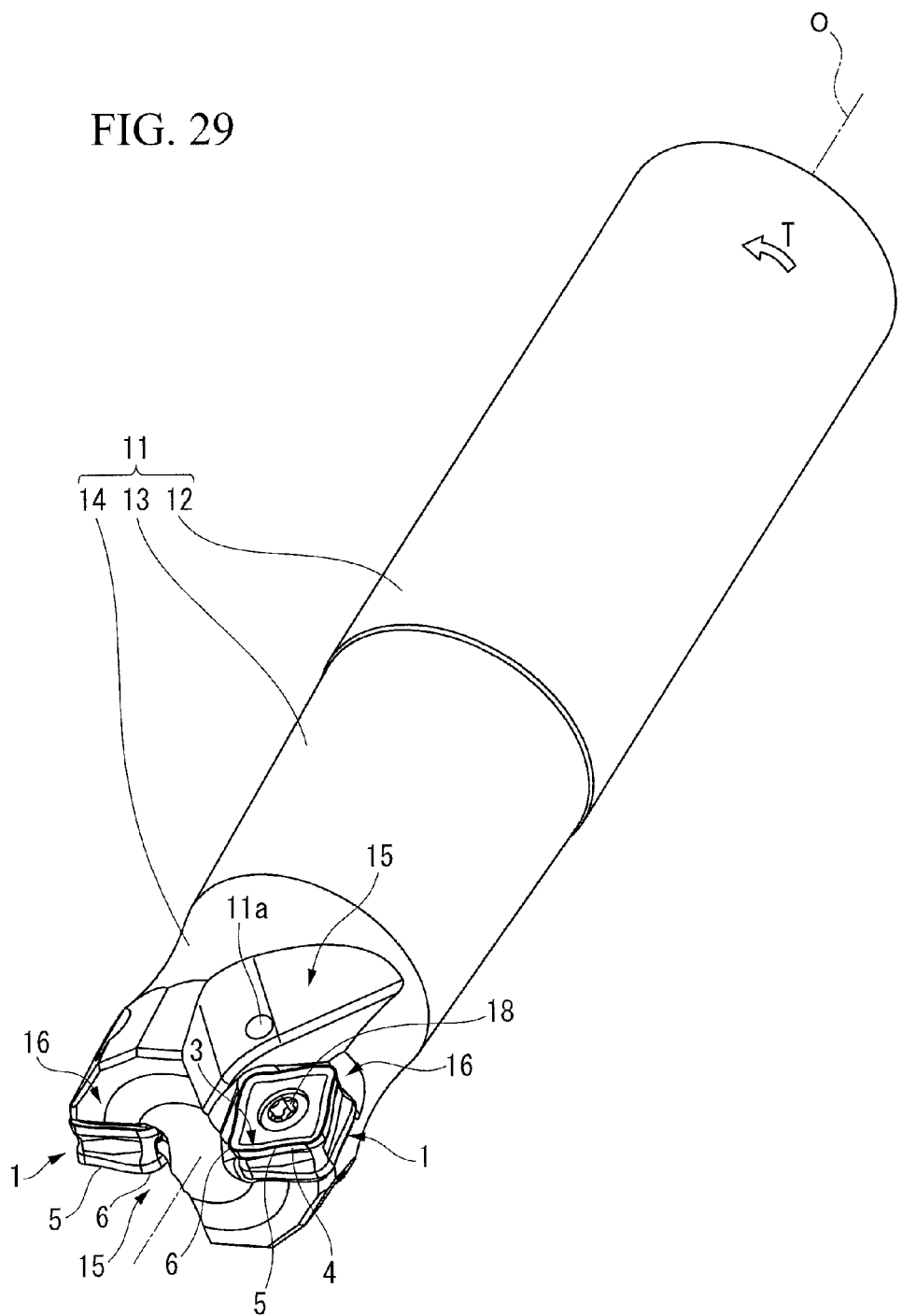
FIG. 29 is a perspective view of an indexable end mill as a third embodiment of the indexable cutting tool of the invention to which the cutting insert of the embodiment shown in FIG. 24 is attached.
Figure 30:
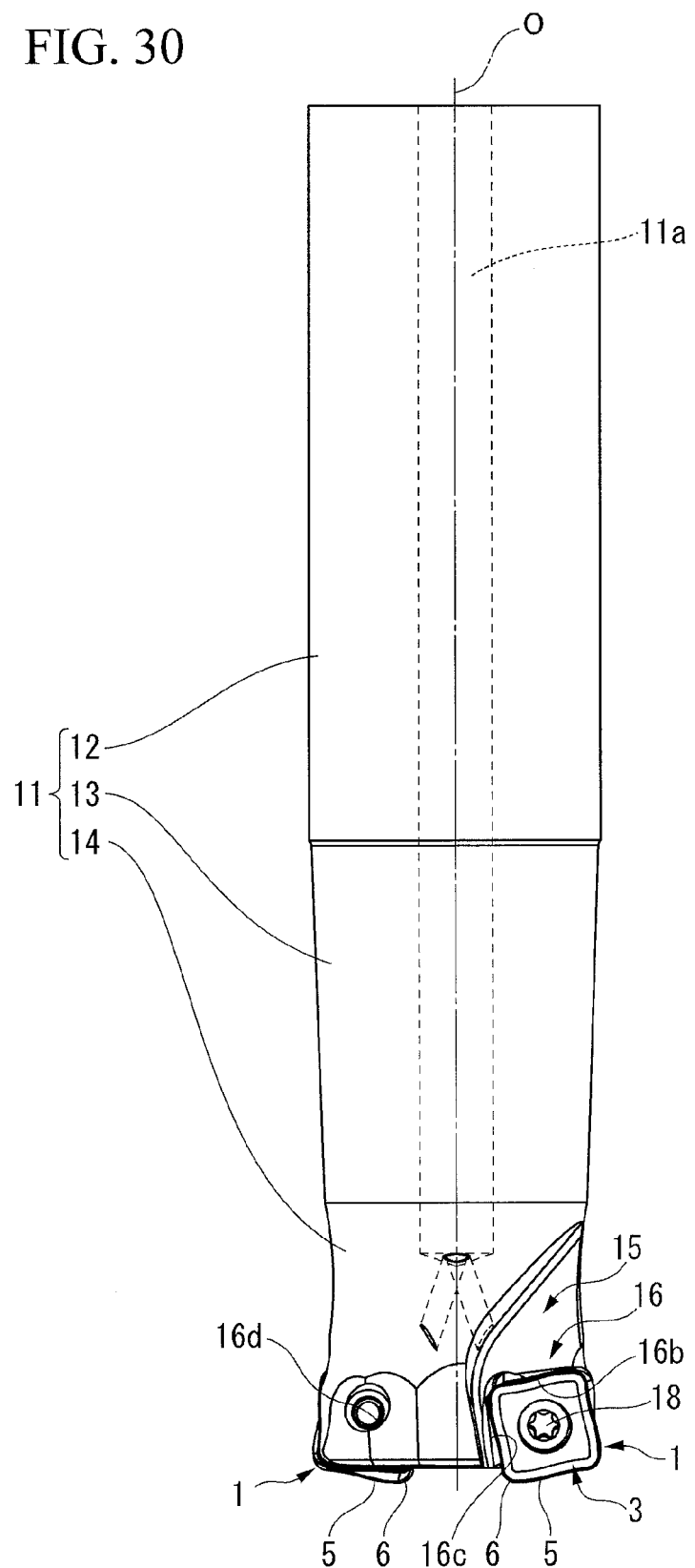
FIG. 30 is a plan view of the indexable end mill shown in FIG. 29.
Figure 31:
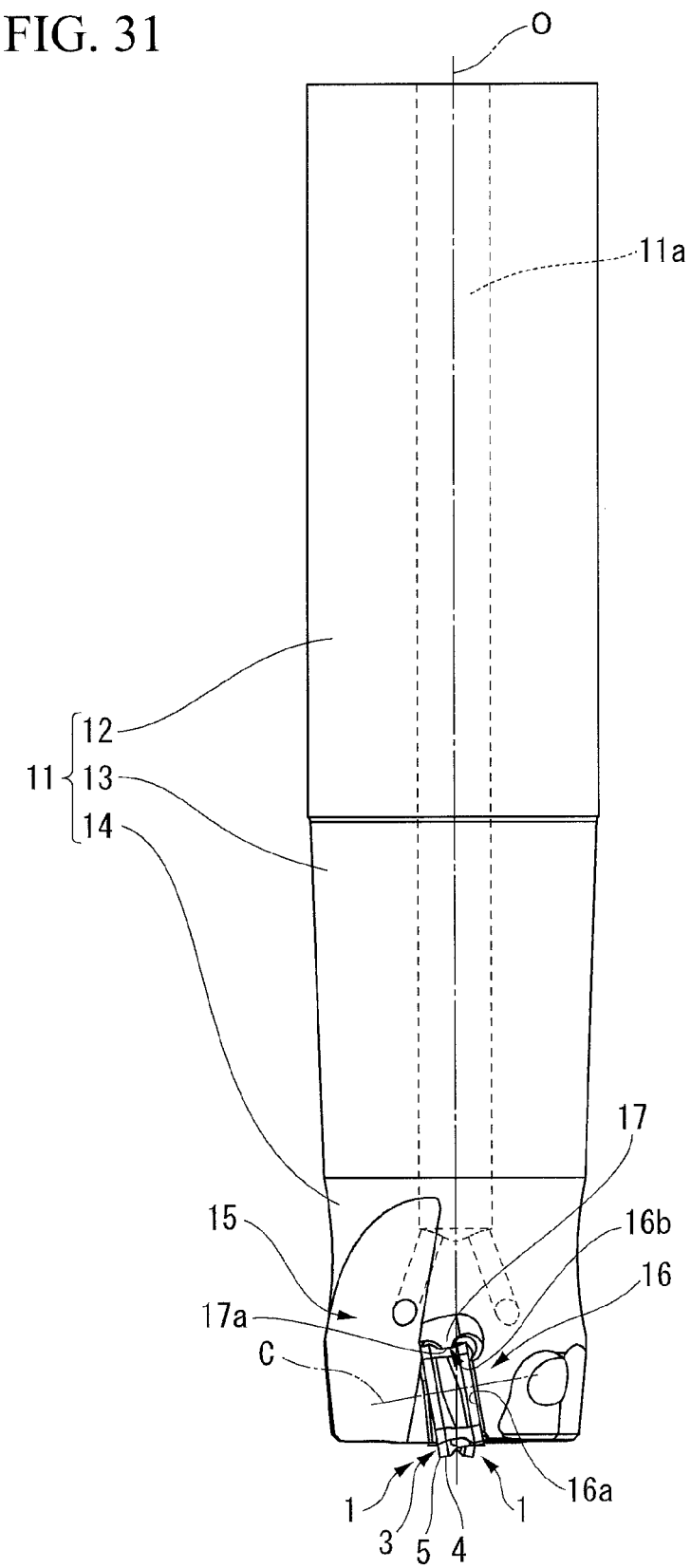
FIG. 31 is a side view of the indexable end mill shown in FIG. 29.
Figure 32:
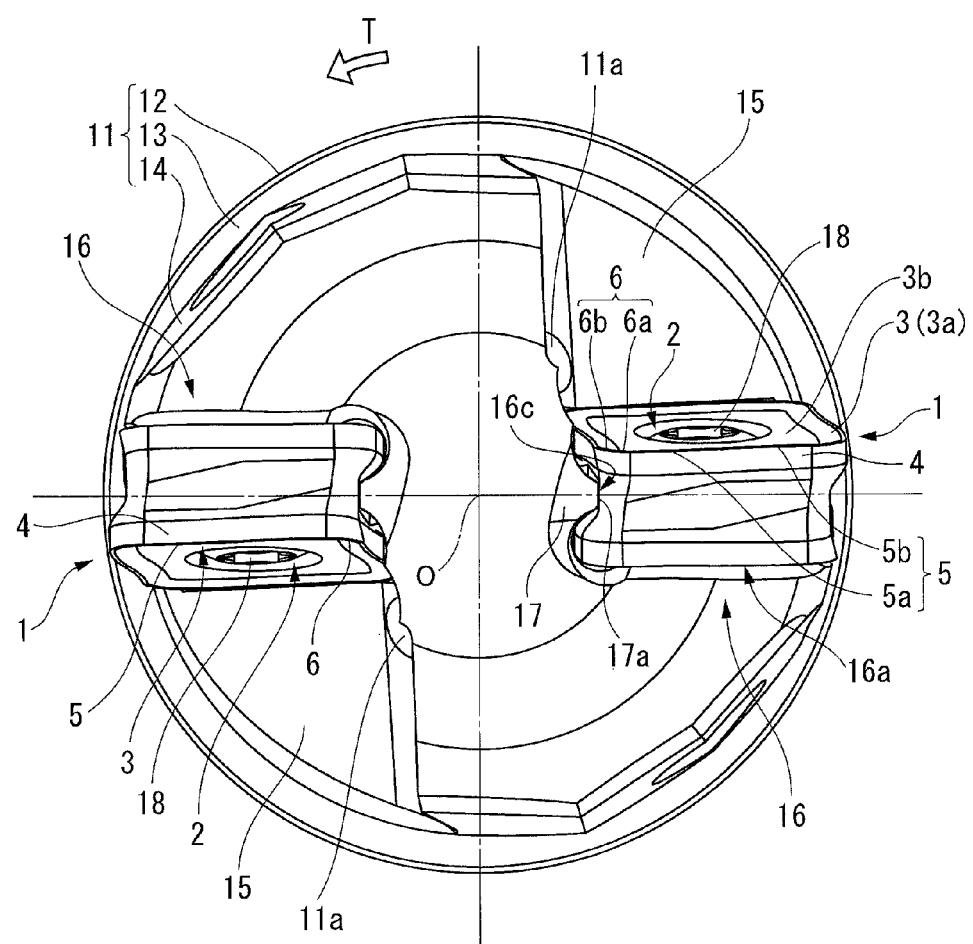
FIG. 32 is an enlarged front view of the indexable end mill shown in FIG. 29.
Figure 33A:
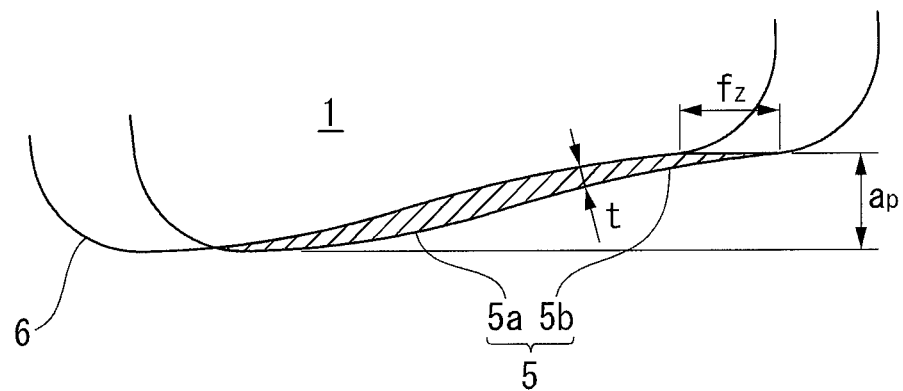
FIG. 33A is a view showing a cross-section of a chip created by the indexable end mill shown in FIG. 29 when high-feed cutting is performed.
Figure 33B:
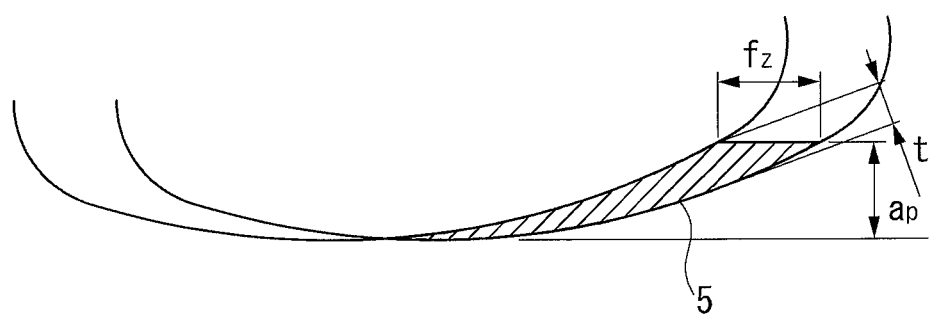
FIG. 33B is a view showing a cross-section of a chip created by an indexable end mill to which a related-art cutting insert is attached.
Figure 34:
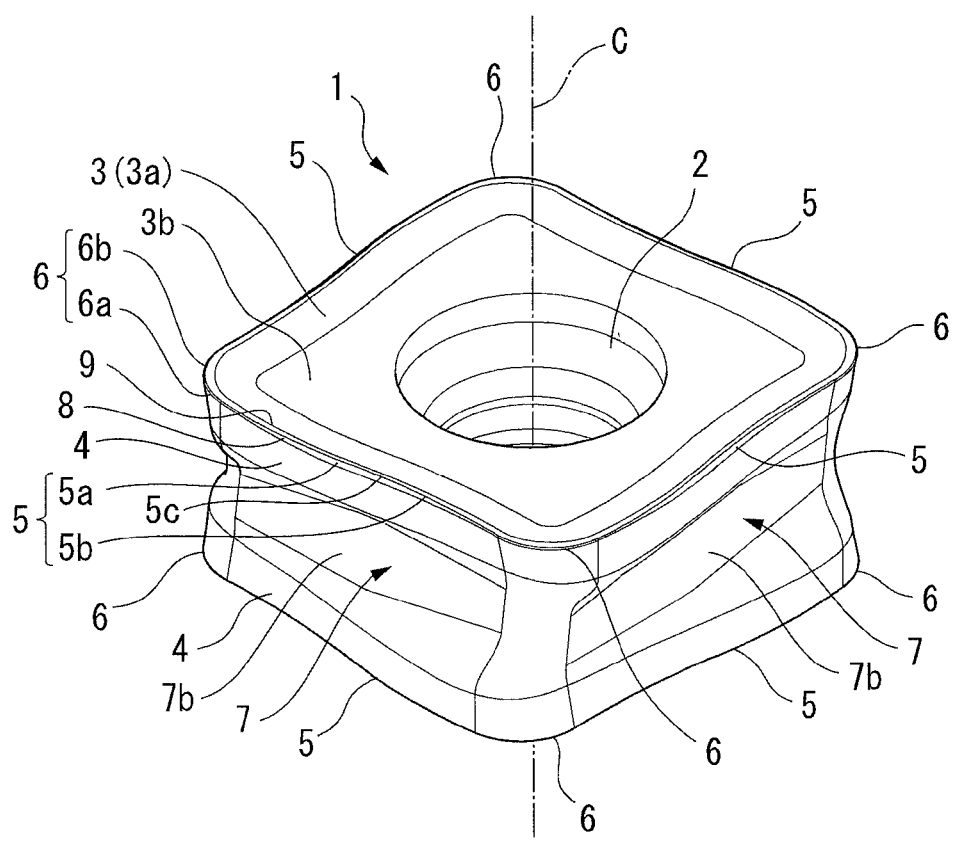
FIG. 34 is a perspective view showing a fourth embodiment of the cutting insert of the invention.
Figure 35:
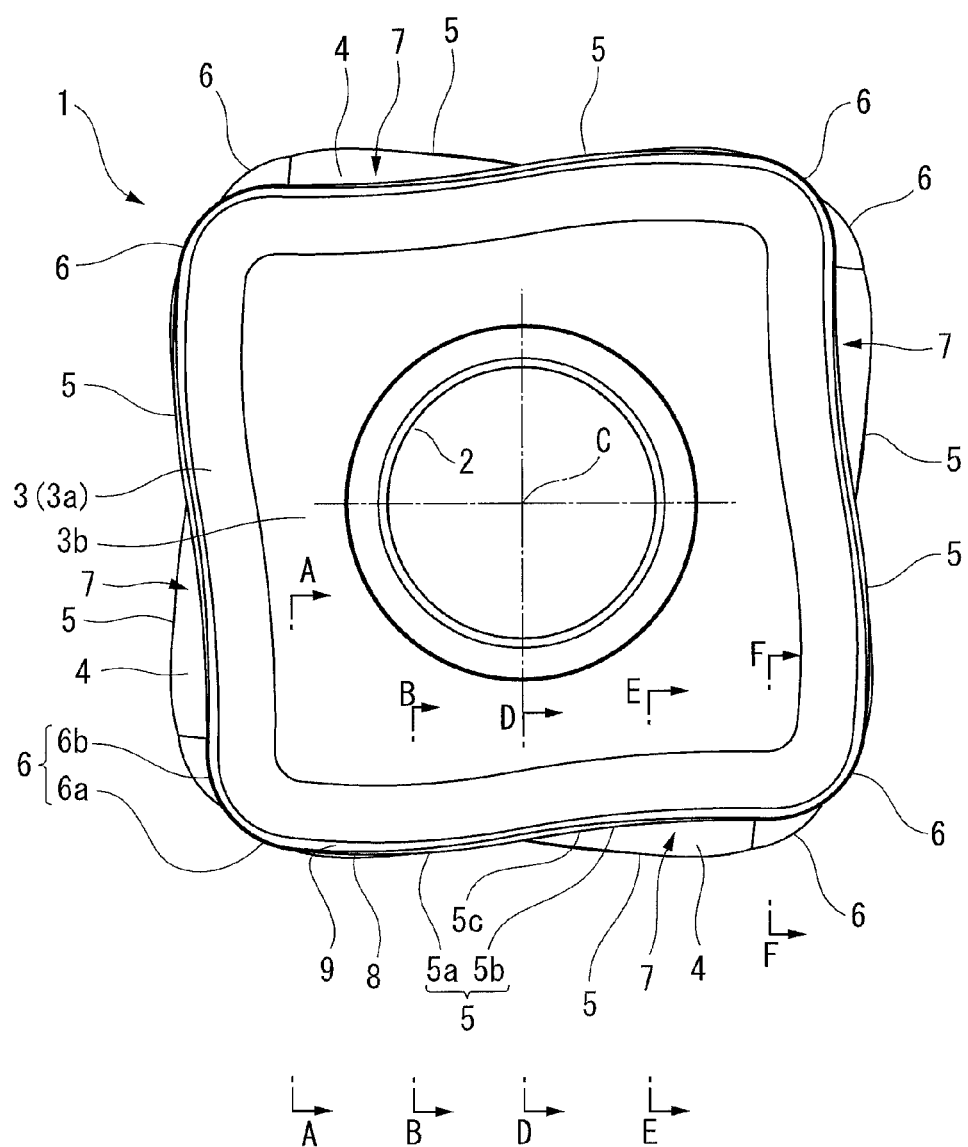
FIG. 35 is a plan view of the embodiment shown in FIG. 34.
Figure 36:
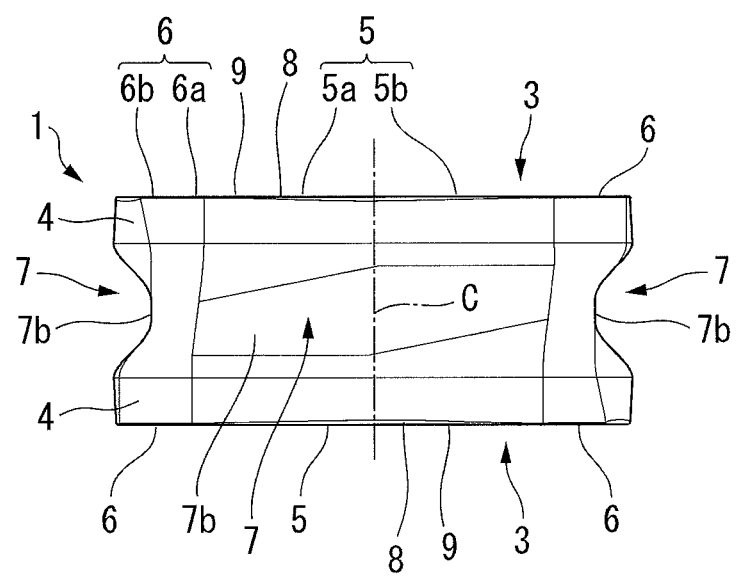
FIG. 36 is a side view of the embodiment shown in FIG. 34.
Figure 37A:
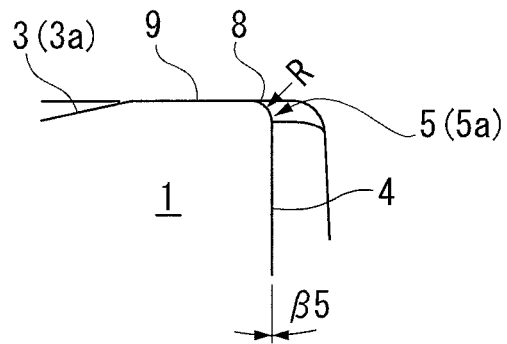
FIG. 37A is an enlarged cross-sectional view along line AA in FIG. 35.
Figure 37B:
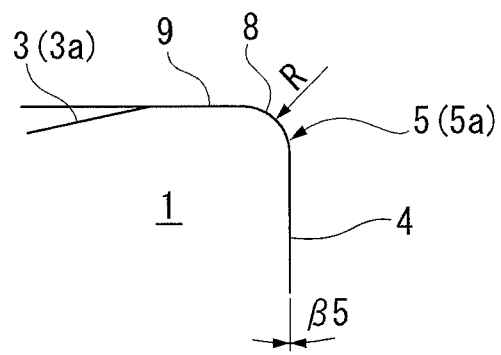
FIG. 37B is an enlarged cross-sectional view along line BB in FIG. 35.
Figure 37C:
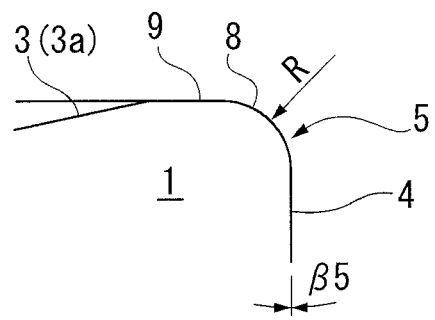
FIG. 37C is an enlarged cross-sectional view along line DD in FIG. 35.
Figure 37D:
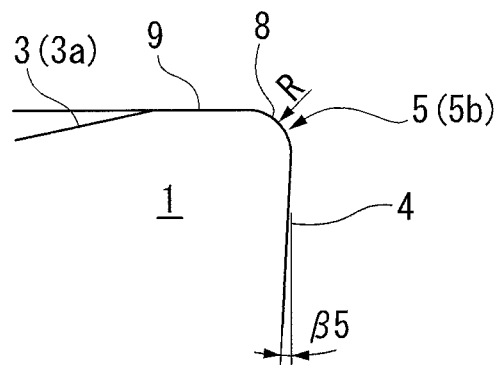
FIG. 37D is an enlarged cross-sectional view along line EE in FIG. 35.
Figure 37E:
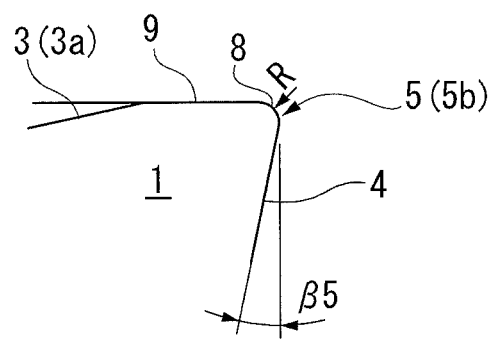
FIG. 37E is an enlarged cross-sectional view along line FF in FIG. 35.

In the third embodiment, contrary to the first and second embodiments, the clearance angle β5 of the main cutting edge 5, as shown in FIGS. 27A to 27E, is made larger on the positive angle side at other end portion 5b of the main cutting edge 5 than at the one end portion 5a of the main cutting edge 5. In other words, the clearance angle β5 is made larger on the negative angle side at the one end portion 5a of the main cutting edge 5 than at the other end portion 5b. Additionally, the clearance angle β6 of the corner edge 6, contrary to the first and second embodiments, as shown in FIGS. 28A to 28C, becomes larger on the positive angle side as moving closer to the other end portion 6b of the corner edge 6 from the one end portion 6a of the corner edge 6 that stretches to the one end portion 5a of the main cutting edge 5. The clearance angle β6 of the corner edge 6 in the present embodiment is 0° at the one end portion 6a of the corner edge 6 and accordingly a positive angle at the other end portion 6b of the corner edge 6, but is made gradually larger on the positive angle side so as to be 20° or less.

Moreover, a honing is formed on the main cutting edge 5 and the corner edge 6 in the third embodiment. The honing in the present embodiment is a round honing 8, and as shown in FIGS. 27A to 27E, the intersecting ridgeline between the land 9 of the outer peripheral edge of the positive rake face 3a and the flank face 4 is formed in the shape of a convex curved surface, such as a convex circular arc in contact with the land 9 and the flank face 4 in a cross-section orthogonal to the intersecting ridgeline. This honing is formed over the whole circumference of the polygonal surface on which the rake face 3 is formed, and the position of a contact point between the land 9 and the round honing 8 serves as a projecting end of the main cutting edge 5 and the corner edge 6 in the thickness direction in the cross-section.

Among these, the size of the honing formed on the main cutting edge 5 is made larger toward the one end portion 5a at the other end portion 5b of the main cutting edge 5. That is, the size of the honing becomes gradually larger toward the contact point 5c from the contact point 5c between the one end portion 5a and the other end portion 5b of the main cutting edge 5 to the contact point between the other end portion 5b and the corner edge 6 that stretches thereto. When the honing is the round honing 8 as in the present embodiment, the size of this honing becomes the radius (curvature radius) R of the round honing 8 on a cross-section (a cross-section orthogonal to a tangential line at each position of the concavo-convex curve formed by the main cutting edge 5) orthogonal to the main cutting edge 5 at each position of the main cutting edge 5 having the concavo-convex curve as described above. However, in FIGS. 27A to 27E, for description, the radius R of this round honing 8 is the radius (curvature radius) of the round honing 8 in a cross-section formed by a plane including the above-described insert centerline C and a straight line passing through the center of a lateral face of the insert body 1 on which the flank face 4 that stretches to the main cutting edge 5 is formed, and in a cross-section parallel to this cross-section.

Additionally, in the present embodiment, the size of the honing in the main cutting edge 5, that is, the radius R of the round honing 8 remains constant as a large radius R from the other end portion 5*b* toward this one end portion 5*a*, at the one end portion 5*a* of the main cutting edge 5. That is, the size of the honing is made constant at a portion serving as the convexly curved cutting edge from the contact point 5*c* between the one end portion 5*a* and the other end portion 5*b* to the contact point between the one end portion 5*a* and the corner edge 6 that stretches thereto. The size of the honing in the corner edge 6, that is, the radius R of the round honing 8 is made equal to the large radius R at the one end portion 5*a* of the main cutting edge 5 at the one end portion 6*a* of the corner edge 6 that stretches to one end portion 5*a* of the main cutting edge 5, is made gradually smaller toward the other end portion 6*b* of the corner edge 6 opposite to this, and is made equal to the radius R of the decreased round honing 8 of the other end portion 5*b* of the other main cutting edge 5 that stretches to the other end portion 6*b* of the corner edge 6.

In the indexable end mill that is the indexable cutting tool of the third embodiment to which the cutting insert of the third embodiment configured in this way is detachably attached, the insert body 1 has the square plate shape and the cross-section of the bottom surface 7*b* of the recess 7 also has the square shape. Accordingly, the projecting strip portions 17, which have the flat projecting end surfaces 17*a* orthogonal to each other when seen from the direction perpendicular to the bottom surface 16*a* and also extend in the direction orthogonal to the bottom surface 16*a*, are formed on the wall surfaces 16*b* and 16*c* of the insert mounting seat 16. By screwing the clamp screw 18 inserted through the attachment hole 2 of the insert body 1 into the screw hole 16*d*, the cutting insert of the present embodiment is fixed and attached to the insert mounting seat 16 such that the binding face 3*b* facing the bottom surface 16*a* is pressed against the bottom surface 16*a*, and the bottom surface 7*b* of the recess 7 of the two lateral faces that face the wall surfaces 16*b* and 16*c* is pressed against the projecting end surfaces 17*a* of the projecting strip portions 17.

In the cutting insert attached in this way, in the present embodiment, the main cutting edge 5 to be used for cutting, which is made to protrude so as to be directed to the tip side of the end mill body 11 of the polygonal surface directed to the end mill rotational direction T, is arranged so as to extend gradually to the rear end side of the end mill body 11 as moving closer to the other end portion 5*b* from the one end portion 5*a*. Additionally, the corner edge 6, which is located on the inner peripheral side of the end mill body 11 and stretches to one end portion 5*a* of the main cutting edge 5, is arranged so as to extend toward the inner peripheral side of the rear end of the end mill body 11 as moving away from the one end portion 5*a* of the main cutting edge 5, and the periphery of the contact point between the one end portion 5*a* of the main cutting edge 5 and the one end portion 6*a* of the corner edge 6 protrudes most to the tip side of the end mill body 11.

Accordingly, also in the cutting insert and the indexable end mill of the third embodiment of such a configuration, the cutting edge angle of the main cutting edge 5 becomes gradually larger at the one end portion 5*a* toward the outer peripheral side of the end mill body 11, whereas the cutting edge angle becomes gradually smaller at the other end portion 5*b*. As a result, as in the cross-section of a chip created by the main cutting edge 5 shown by hatching in FIG. 33A, the thickness of the chip becomes smaller after becoming larger toward outer peripheral side, and becomes the maximum thickness t at the central portion of the main cutting edge 5, and the maximum thickness t itself becomes small. For this reason, the thickness of the chip does not becomes the thickness t that is maximum at the cutting boundary of the outermost periphery unlike a chip shown by hatching in FIG. 33B and obtained by the cutting insert described in Patent Citation 2.

Moreover, in the cutting insert of the third embodiment, at the other end portion 5*b* of the main cutting edge 5 arranged on the outer peripheral side of the end mill body 11, the size of the honing formed on the main cutting edge 5, that is, the radius R of the round honing 8 is made larger toward the one end portion 5*a* of the main cutting edge 5 on the inner peripheral side of the end mill body 11, and the cutting edge strength of the main cutting edge 5 in the portion where the chip has the maximum thickness t as described above can be largely ensured. For this reason, abnormal damage, such as chipping or breakage, of the main cutting edge 5, particularly at the cutting boundary can be more reliably prevented, and it is possible to achieve more efficient high-feed cutting. On the other hand, the size of the honing, that is, the radius R of the round honing 8, becomes smaller toward a direction away from the one end portion 5*a* at the other end portion 5*b* of the main cutting edge 5. Thus, an increase in cutting resistance is not caused.

Additionally, in the above ramping, as described above, the periphery of the one end portion 5*a* of the main cutting edge 5 protruding to the tip side of the end mill body 11 first cuts a workpiece. In contrast, in the cutting insert of the present embodiment, the size of the honing at the one end portion 5*a* of the main cutting edge 5, that is, the radius R of the round honing 8 is made to be a constant radius R while remaining larger toward the one end portion 5*a* from the other end portion 5*b*. For this reason, high cutting edge strength can be ensured at the one end portion 5*a* of the main cutting edge 5 that first cut the workpiece in this way similar to the central portion, and damage can also be prevented from occurring at the one end portion 5*a* of the main cutting edge 5 due to the impact during the cutting of the ramping.

Moreover, in the present embodiment, contrary to the first and second embodiments, the clearance angle β5 of the main cutting edge 5 is made larger on the negative angle side at the one end portion 5*a* than at the other end portion 5*b* and is made to be 0°. Thus, the wedge angle at the one end portion 5*a* can be largely ensured, a further improvement in cutting edge strength can be achieved, and damage to the main cutting edge 5 during ramping can be reliably prevented. In addition, in the ramping according to the present embodiment, the one end portion 6*a* of the corner edge 6 on the inner peripheral side of the end mill body 11 that stretches to one end portion 5*a* of the main cutting edge 5 also cuts a workpiece. However, in the present embodiment, the size of the honing of the corner edge 6, that is, the radius R of the round honing 8, is made larger at the one end portion 6*a* of the corner edge 6 than at the other end portion 6*b*, and the clearance angle β6 of the corner edge 6 is also made larger on the negative angle side, and is made to be particularly 0°. Thus, it is also possible to prevent damage occurring in the corner edge 6.

Incidentally, as described above, in a case where the main cutting edge 5 to be used for cutting is arranged so as to be located further toward the end mill rotational direction T side than a straight line, which is parallel to the main cutting edge 5 and intersects the axis O, when seen from the tip side of the direction of the axis O of the end mill body 11, and a negative radial rake angle is given to the main cutting edge 5, the rotation track of the corner edge 6 around the axis O at the other end portion 6*b* is located on the outer peripheral side of the flank face 4 that stretches to the other end portion 6*b* if the corner edge 6 on the inner peripheral side of the end mill body 11 extends to the other end portion 6*b* at the clearance angle β6 that remains 0° at the one end portion 6*a*. Therefore, there is a concern that the flank face 4 may interfere with a workpiece.

However, in contrast, in the cutting insert of the present embodiment, the clearance angle β6 of the corner edge 6 that stretches to one end portion 5*a* of the main cutting edge 5 to be used for cutting, which is located on the inner peripheral side of the end mill body 11, becomes larger on the positive angle side as moving closer to the other end portion 6*b* from the one end portion 6*a* of the corner edge 6 that stretches to this main cutting edge 5. Thus, the rotation track of the corner edge 6 can be located on the inner peripheral side of the flank face 4 at the other end portion 6*b*, and interference with a workpiece can be avoided. Accordingly, an unused corner edge 6 can be prevented from wearing out due to interference with a workpiece and being unusable, all the main cutting edges 5 and the corner edges 6 formed on one insert body 1 can be uniformly used, and efficient and economical cutting can be achieved.

In the present embodiment, the clearance angle β6 at the one end portion 6*a* of the corner edge 6 is made to be 0° in this way, and the flank face 4 is orthogonal to the plane perpendicular to the insert centerline C. Thus, even if the corner edge 6 side of the rake face 3 serves as the above-described positive rake faces 3*a*, the wedge angle of the corner edge 6 can be increased, and the cutting edge strength can be reliably ensured. On the other hand, also at the other end portion 6*b* of the corner edge 6 where the clearance angle β6 becomes larger on the positive angle side than the one end portion 6*a*, the clearance angle β6 is made to be 20° or less in the present embodiment. Thus, also at the other end portion 6*b*, the cutting edge strength can be prevented from becoming excessive small while preventing interference with a workpiece.

Additionally, in the present embodiment, as described above, the radius R of the round honing 8 at the one end portion 5*a* of the main cutting edge 5 is made to be a radius R that is constant while being not changed from the radius made large on the one end portion 5*a* side of the other end portion 5*b*, the radius of the round honing 8 of the corner edge 6 is also made larger at the one end portion 6*a* than at the other end portion 6*b*, and the clearance angle β5 and β6 are made larger on the negative angle side at the one end portions 5*a* and 6*a* than at the other end portions 5*b* and 6*b*. Thus, at the contact point between the one end portion 5*a* of the main cutting edge 5 and the one end portion 6*a* of the corner edge 6 and the contact point between the other end portion 5*b* of the main cutting edge 5 and the other end portion 6*b* of the other corner edge 6 that stretches thereto, the radius R of the round honing 8 of the main cutting edge 5, the radius of the round honing 8 of the corner edge 6 can be made equal to each other, and the clearance angle β5 of the main cutting edge 5 and the clearance angle β6 of the corner edge 6 can be made equal to each other. For this reason, the round honing 8 and the flank face 4 of the insert body 1 can be made to be smoothly continuous, and it is possible to prevent breakage or the like occurring by a step or the like being formed in the round honing 8 or the flank face 4.

However, instead of making the size of the honing at the one end portion 5*a* of the main cutting edge 5, that is, the radius R of the round honing 8 constant at the other end portion 5*b* while remaining larger toward the one end portion 5*a* in this way, as in a cutting insert of a fourth embodiment of the invention shown in FIGS. 34 to 37E, the size of a honing formed on the main cutting edge 5 may become larger toward the other end portion 5*b* also at the one end portion 5*a* of the main cutting edge 5. Also in the fourth embodiment, the honing is the round honing 8, and the size of the honing is the radius R of the round honing 8. In the fourth embodiment shown in FIGS. 34 to 37E, the portions, which are common to those of the first to third embodiments, will be designated by the same reference numerals, and the description thereof will be simplified.

Also in the cutting insert of such a fourth embodiment, when seen from the direction opposing the rake face 3, the one end portion 5*a* of the main cutting edge 5 located on the inner peripheral side of the end mill body 11 has the convexly curved shape, and the other end portion 5*b* located on the outer peripheral side of the end mill body 11 has the concavely curved shape. Thus, the position where a chip has the maximum thickness t can be located at the central portion of the main cutting edge 5 between the one end portion 5*a* and the other end portion 5*b*, and the maximum thickness t itself can be made small. Since the size of the honing, that is, the radius R of the round honing 8 can be increased at the central portion of the main cutting edge 5 and the cutting edge strength can be ensured, abnormal damage, such as chipping or breakage, can be prevented.

On the other hand, in the present embodiment, the size of the honing in both the ends 5*a* and 5*b* of the main cutting edge 5, that is, the radius R of the round honing 8, becomes smaller as moving away from the central portion of the main cutting edge 5. Thus, an improvement in sharpness can be achieved and the cutting resistance can be reduced. Accordingly, according to the present embodiment, more efficient cutting can be achieved simply by attaching an indexable end mill that feeds the end mill body 11 in the direction orthogonal to the axis O to perform high-feed cutting.

In the present embodiment, the radius R of the round honing of the round honing 8 of the main cutting edge 5 at the contact point between the one end portion 5*a* of the main cutting edge 5 and the one end portion 6*a* of the corner edge 6 that stretches thereto, and the radius R of the round honing 8 of the main cutting edge 5 at the contact point between the other end portion 5*b* of the main cutting edge 5 and the other end portion 6*b* of the other corner edge 6 that stretches thereto are made substantially equal to each other. Additionally, the radius of the round honing 8 in the corner edge 6 is made to have a constant size while remaining equal to the radius R of the round honing 8 of the main cutting edge 5 at these contact points.

Moreover, in the third and fourth embodiments, the honing formed on the main cutting edge 5 is formed as the round honing 8. However, this honing may be a chamfered honing having a straight line in the cross-section orthogonal to the main cutting edge. Additionally, the honing may be a composite honing in which an intersecting portion between a straight line formed by this chamfered honing, and a line formed by the rake face 3 (positive rake face 3*a*), the land 9, or the flank face 4 in the above cross-section is rounded in a convexly curved shape, such as a circular arc. The size of the honing in such a case may be the radius of a circle inscribed on the straight line formed by the chamfered honing or the composite honing in the above cross-section, and the line formed by the rake face 3 (positive rake face 3a), the land 9, or the flank face 4, and this radius may become larger toward the one end portion 5a at the other end portion 5b of the main cutting edge 5.

Additionally, also in the fourth embodiment, similar to the third embodiment, the insert body 1 has the regular polygonal plate shape, the main cutting edges 5 and the corner edges 6 are formed on the respective side ridges and the respective corners of the front and back polygonal surfaces having the regular polygonal shape. However, the front and back polygonal surfaces are arranged so as to be slightly twisted around the insert centerline C passing through the center thereof, and the insert body 1 has the front-and-back inverted symmetrical shape. Such a cutting insert is attached to the insert mounting seat 16 of the end mill body 11 so that a relatively small cutting edge angle is given to one main cutting edge 5 and so that the insert centerline C extends to the rear end side in the direction of the axis O of the end mill body 11 from one polygonal surface serving as a rake face to the other polygonal surface. Accordingly, the other polygonal surface can be located on the rear end side in the direction of the axis O of the end mill body 11 with respect to the main cutting edge 5, to be used for cutting, of the one polygonal surface and located further toward the inner peripheral side than the rotation track of the other corner edge 6 that stretches to the main cutting edge 5 on the outer peripheral side of the end mill body 11.

Accordingly, when the main cutting edge 5 formed on the side ridge of one polygonal surface directed to the end mill rotational direction T is used for cutting, the main cutting edge 5 or the corner edge 6 of the other polygonal surface does not interfere with a workpiece. After the insert body 1 is rotated by every 90° around the insert centerline C and is attached again to the insert mounting seat 16, and the main cutting edge 5 and the corner edge 6 formed on each of the four side ridges and four corners of the one polygonal surface is used for cutting, the front and back of the insert body 1 is inverted and the insert body is attached again to the insert mounting seat 16. Accordingly, the rake face 3 serving as the other polygonal surface can be directed to the end mill rotational direction T, and the main cutting edge 5 and the corner edge 6 thereof can be used for cutting. For this reason, when the insert body 1 has the square plate shape as in the third and fourth embodiments, a total of eight main cutting edges 5 and a total of eight corner edges 6 formed on one insert body 1 can be reliably used, which is more efficient and economical.

It is noted that, in the third and fourth embodiments, the insert body 1 has the square plate shape in this way. However, it is also possible to apply the configurations of the honings of the third and fourth embodiments to the cutting inset having other regular polygonal plate shaped insert body, for example, the cutting insert having the regular triangular shaped insert body, as in the first and second embodiments. Additionally, it is also possible to apply these configurations to a cutting insert having a polygonal plate shaped insert body other than the regular polygonal plate shaped insert body.

Although the embodiments of the invention have been described above, the respective components in the respective embodiments, combinations thereof, or the like are exemplary. Additions, omissions, substitutions, and other modifications of components can be made without departing from the spirit of the invention. Additionally, the cutting insert of the invention is available also in indexable cutting tools other than the indexable end mill. Moreover, the invention is not limited by the embodiments, and is limited only by the appended claims.

INDUSTRIAL APPLICABILITY

As described above, according to the cutting insert and the indexable cutting tool of the invention, in the high-feed cutting, abnormal damage to the main cutting edge can be prevented by preventing a chip from having the largest thickness at the cutting boundary of the main cutting edge and preventing the thickness of a chip itself from becoming excessively large, and the feed rate can be further increased to perform more efficient high-feed cutting. Accordingly, industrial applications are possible.

EXPLANATION OF REFERENCE

1: INSERT BODY
2: ATTACHMENT HOLE
3: RAKE FACE
3a: POSITIVE RAKE FACE
3b: BINDING FACE
4: FLANK FACE
5: MAIN CUTTING EDGE
5a: ONE END PORTION (CONVEXLY CURVED CUTTING EDGE) OF MAIN CUTTING EDGE 5
5b: OTHER END PORTION (CONCAVELY CURVED CUTTING EDGE) OF MAIN CUTTING EDGE 5
5c: CONTACT POINT BETWEEN CONVEXLY CURVED CUTTING EDGE FORMED BY ONE END PORTION 5a OF MAIN CUTTING EDGE 5 AND CONCAVELY CURVED CUTTING EDGE FORMED BY OTHER END PORTION 5b
6: CORNER EDGE
6a: ONE END PORTION OF CORNER EDGE 6
6b: OTHER END PORTION OF CORNER EDGE 6
7: RECESS
7a: INCLINED SURFACE OF RECESS 7
7b: BOTTOM SURFACE OF RECESS 7
8: ROUND HONING (HONING)
9: LAND
11: END MILL BODY (BODY OF TOOL)
14: CUTTING PART
16: INSERT MOUNTING SEAT
17: PROJECTING STRIP PORTION
17a: PROJECTING END SURFACE OF PROJECTING STRIP PORTION 17
18: CLAMP SCREW
C: INSERT CENTERLINE
O: AXIS OF END MILL BODY 11
T: END MILL ROTATIONAL DIRECTION
R: SIZE OF HONING IN MAIN CUTTING EDGE 5 (RADIUS OF ROUND HONING 8)
$\beta 5$: CLEARANCE ANGLE OF MAIN CUTTING EDGE 5
$\beta 6$: CLEARANCE ANGLE OF CORNER EDGE 6

The invention claimed is:

1. A cutting insert capable of being detachably attached to an insert mounting seat of an indexable cutting tool, the cutting insert comprising:
   an insert body having a polygonal plate shape,
   wherein rake faces are formed on polygonal surfaces of the insert body, and flank faces are formed on lateral faces of the insert body arranged around the polygonal surfaces, main cutting edges are formed on side ridges of the polygonal surfaces at intersecting ridgelines between the rake faces and the flank faces, each main cutting edge extends between two corners adjacent to each other in a circumferential direction of the polygonal surface, when seen from a direction opposing the rake face, one end portion of the each main cutting edge that stretches to one corner of the two corners has a convexly curved shape, and the other end portion of the main cutting edge that stretches to the other corner of the two corners has a concavely curved shape, and a clearance angle of the main cutting edge is made larger on a positive angle side at the one end portion of the main cutting edge than at the other end portion of the main cutting edge.

2. The cutting insert according to claim 1,
wherein the rake faces are formed respectively on front and back polygonal surfaces of the insert body,
the main cutting edges are formed respectively on the intersecting ridgelines between the rake faces and the flank face formed on at least one lateral face of the insert body, and
the main cutting edges have an inverted symmetrical shape with respect to the front and back polygonal surfaces.

3. The cutting insert according to claim 1,
wherein the curvature radius of a concave curve formed by the other end portion of the main cutting edge is made larger than the curvature radius of a convex curve formed by the one end portion of the main cutting edge.

4. The cutting insert according to claim 1,
wherein a convex curve formed by the one end portion of the main cutting edge and a concave curve formed by the other end portion of the main cutting edge are in contact with each other.

5. The cutting insert according to claim 1,
wherein a convex curve formed by the one end portion of the main cutting edge is made longer than a concave curve formed by the other end portion of the main cutting edge.

6. The cutting insert according to claim 1,
wherein the insert body has a regular polygonal plate shape, the main cutting edges are formed on respective side ridges of the front and back polygonal surfaces having a regular polygonal shape, the front and back polygonal surfaces are arranged so as to be twisted around an insert centerline passing through the centers of the polygonal surfaces, and the insert body has a front-and-back inverted symmetrical shape with respect to the front and back polygonal surfaces.

7. The cutting insert according to claim 1,
wherein the clearance angle of the main cutting edge is made gradually larger on the positive angle side as moving away from the other end portion of the main cutting edge at the one end portion of the main cutting edge on the other end portion side of the main cutting edge.

8. The cutting insert according to claim 1,
wherein the clearance angle of the main cutting edge is made constant at the portion in a part of the one end portion of the main cutting edge opposite to the other end portion of the main cutting edge.

9. The cutting insert according to claim 1,
wherein the clearance angle of the main cutting edge is a positive angle of 20° or less at the one end portion of the main cutting edge.

10. The cutting insert according to claim 1,
wherein the clearance angle of the main cutting edge is made constant at the other end portion of the main cutting edge.

11. The cutting insert according to claim 1,
wherein the clearance angle of the main cutting edge is 0° or more at the other end portion of the main cutting edge.

12. The cutting insert according to claim 1,
wherein a corner edge stretching to the one end portion of the main cutting edge and having a convexly curved shape when seen from the direction opposing the rake face is formed on the one corner of the polygonal surface, and the clearance angle of the corner edge is made larger on a negative angle side as moving closer to the other end portion of the corner edge from the one end portion of the corner edge that stretches to the one end portion of the main cutting edge.

13. The cutting insert according to claim 1,
wherein the insert body has an equilateral triangular plate shape, main cutting edges are formed on respective side ridges of front and back polygonal surfaces having an equilateral triangular shape, the front and back polygonal surfaces are arranged so as to be twisted around an insert centerline passing through the centers of the polygonal surfaces, and the insert body has a front-and-back inverted symmetrical shape with respect to the front and back polygonal surfaces.

14. The cutting insert according to claim 1,
wherein a honing is formed on the main cutting edge, and the size of the honing is made larger toward the one end portion of the main cutting edge at the other end portion of the main cutting edge.

15. The cutting insert according to claim 14,
wherein the size of the honing is constant at the one end portion of the main cutting edge.

16. The cutting insert according to claim 14,
wherein the size of the honing is made larger toward the other end portion of the main cutting edge at the one end portion of the main cutting edge.

17. The cutting insert according to claim 14,
wherein the honing is a round honing, and the size of the honing is the radius of the round honing.

18. The cutting insert according to claim 14,
wherein the clearance angle of the main cutting edge is made larger on a negative angle side at the one end portion of the main cutting edge than at the other end portion of the main cutting edge.

19. An indexable cutting tool comprising:
a tool body that can be rotated in a tool rotational direction around an axis; and
a cutting insert that is detachably attached to a tip of the tool body,
the cutting insert comprising;
an insert body having a polygonal plate shape,
wherein rake faces are formed on polygonal surfaces of the insert body, and flank faces are formed on lateral faces of the insert body arranged around the polygonal surfaces,
main cutting edges are formed on side ridges of the polygonal surfaces at intersecting ridgelines between the rake faces and the flank faces,
each main cutting edge extends between two corners adjacent to each other in a circumferential direction of the polygonal surface,
when seen from a direction opposing the rake face, one end portion of the each main cutting edge that stretches to one corner of the two corners has a convexly curved shape, and the other end portion of the main cutting edge that stretches to the other corner of the two corners has a concavely curved shape, wherein one or two or more insert mounting seats to which the cutting insert is attached are formed on the tool body, and the cutting insert is attached to the insert mounting seat so that the rake face faces the tool rotational direction, the main cutting edge extends beyond a tip end of the tool body in a direction of the axis, the one end portion of the main cutting edge is located closer to the axis than the other end portion of the main cutting edge, and the other end portion of the main cutting edge extends gradually toward a rear end side of the tool body as it moves closer to an outer peripheral side of the tool body.

* * * * *